US006248416B1

(12) United States Patent
Lambeth et al.

(10) Patent No.: US 6,248,416 B1
(45) Date of Patent: *Jun. 19, 2001

(54) HIGHLY ORIENTED MAGNETIC THIN FILMS, RECORDING MEDIA, TRANSDUCERS, DEVICES MADE THEREFROM AND METHODS OF MAKING

(75) Inventors: David N. Lambeth; David E. Laughlin; Wei Yang; Heng Gong; Jie Ziou, all of Pittsburgh, PA (US)

(73) Assignee: Carnegie Mellon University, Pittsburgh, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,669

(22) Filed: Nov. 10, 1997

(51) Int. Cl.$^7$ ...................................................... G11B 5/66
(52) U.S. Cl. ........................ 428/65.3; 428/336; 428/632; 428/634 TS; 428/634 TF; 428/634 TM; 428/634 MT; 428/300; 427/128; 427/123; 427/130; 360/103; 360/135
(58) Field of Search ............................. 428/632, 634 TS, 428/634 MT, 634 TF, 634 TM, 300, 336, 65.3; 427/128–130; 360/103, 135

(56) References Cited

U.S. PATENT DOCUMENTS

| 5,582,857 | * 12/1996 | Kaneko | 428/141 |
|---|---|---|---|
| 5,582,897 | 12/1996 | Kaneko et al. | 428/141 |
| 5,616,218 | 4/1997 | Alex | 204/192.15 |
| 5,693,426 | * 12/1997 | Lee | 428/611 |
| 5,800,931 | * 9/1998 | Lee | 428/611 |

FOREIGN PATENT DOCUMENTS

| 0526044A1 | * 3/1993 | (EP). |
|---|---|---|
| 0 553 390 | 8/1993 | (EP). |
| 0 772 188 | 5/1997 | (EP). |

OTHER PUBLICATIONS

PCT International Search Report dated Apr. 8, 1999.

(List continued on next page.)

Primary Examiner—Leszek Kiliman
(74) Attorney, Agent, or Firm—Kirkpatrick & Lockhart LLP

(57) ABSTRACT

The present invention provides for magnetic and magneto-optic recording media, transducers and data storage devices constructed therefrom that have highly oriented films having long range order in the crystal structure of the film. The recording medium includes a magnetic recording layer comprised of Co-based material, such as Co or one or more Co alloys having a ($10\bar{1}0$) crystal texture, a substrate, a first underlayer having a fcc structure and a (110) crystal texture disposed between the substrate and the magnetic recording layer. A second underlayer having a bcc structure and a (112) crystal texture is also disposed between the magnetic recording layer and the first underlayer. In particular, if a (110) Si single crystal substrate is non-oxidized certain metals having fcc structures, such as Ag, Cu, Al, and Au and fcc derivative structures, such L1$_0$ and L1$_2$ structures, can be epitaxially grown on the Si surface. While the one unit cell to one unit cell lattice match between fcc Ag and A4 (diamond) Si is quite poor, multiples of the Ag unit cell distance fit very well on the Si surface. The long range order of the Si surface induces the epitaxial growth of the Ag fcc structure. Upon this fcc structure, a bcc structure, such as Cr, or a bcc derivative, such as B2, DO3 and/or L2$_1$ can be epitaxially grown.

70 Claims, 34 Drawing Sheets

OTHER PUBLICATIONS

Patent Abstracts of Japan, Publication No. 08315326, Publication Date Nov. 29, 1996.

Atsushi Nakamura and Masaaki Futamoto, "Epitaxial Growth of Co/Cr Bilayer Films on MgO Single Crystal Substrates", Jpn. J. Appl. Phys. vol. 32 (1993) Pt. 2, No. 10A, pp. L1410–L1413.

G. Bochi et al., "Magnetic Anisotropy in Epitaxial Ni/Cu (100) Thin Films", Mat. Res. Soc. Symp. Proc. vol. 313, pp. 309–314, 1993.

* cited by examiner

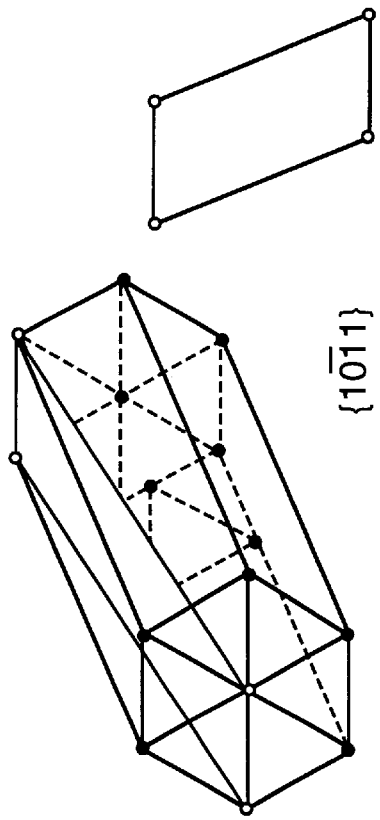
FIG. 3(b) {1 0̄ 1 1}
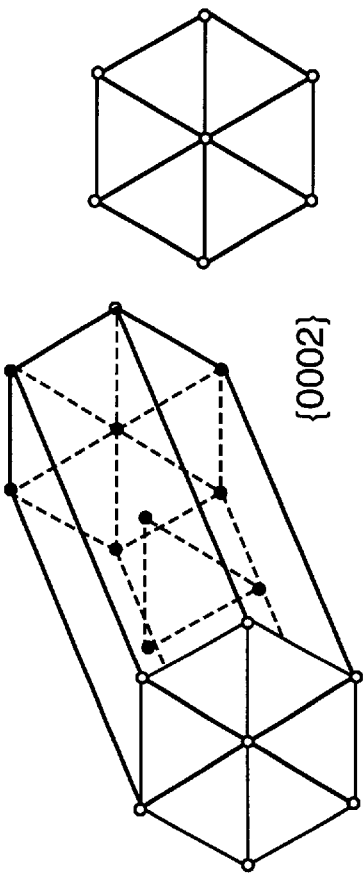
FIG. 3(d) {0 0 0 2}
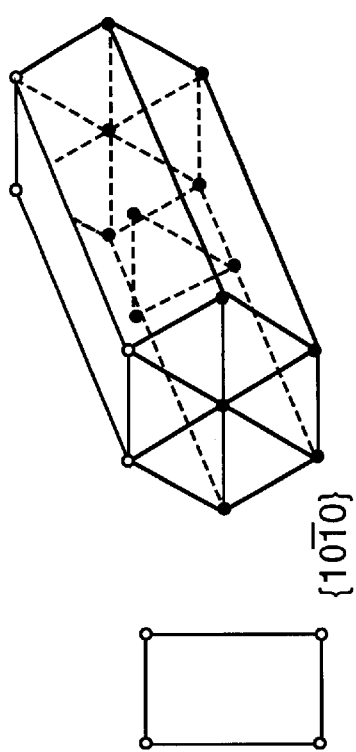
FIG. 3(a) {1 0̄ 1 0}
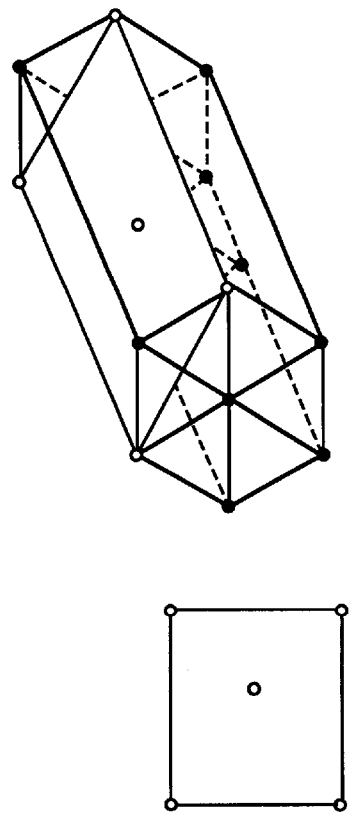
FIG. 3(c) {1 1 2̄ 0}

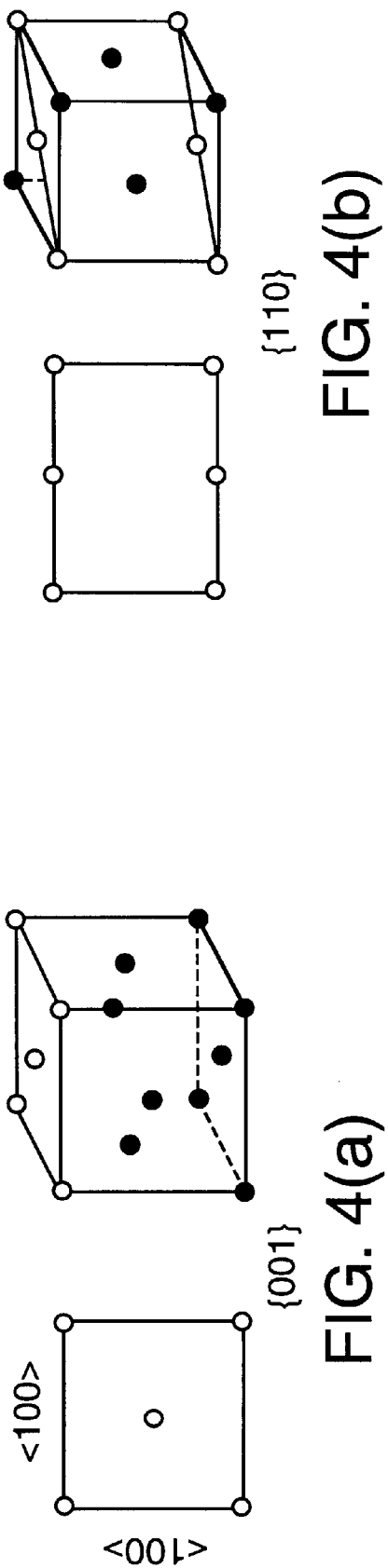
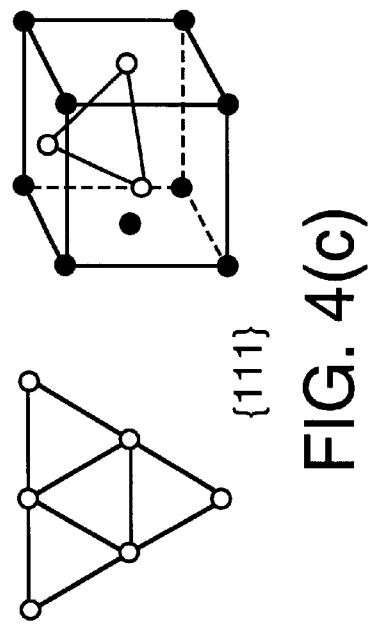
FIG. 4(a) {001}
FIG. 4(b) {110}
FIG. 4(c) {111}

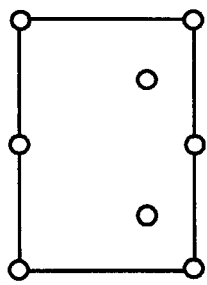
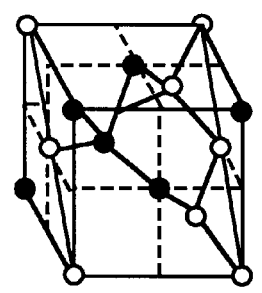
FIG. 5(b) {110}
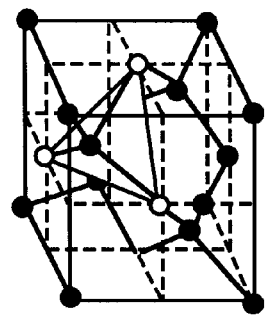
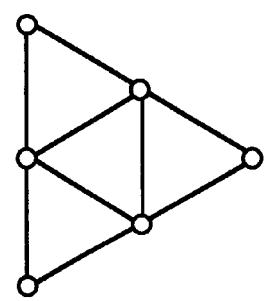
FIG. 5(c) {111}
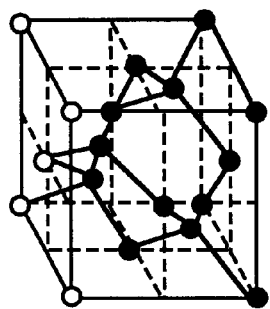
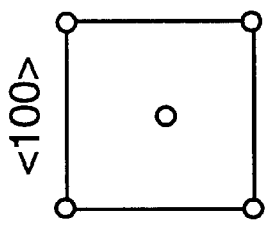
FIG. 5(a) {001}
<100>
<100>

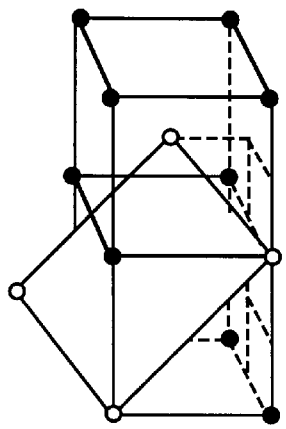
FIG. 6(b) {110}
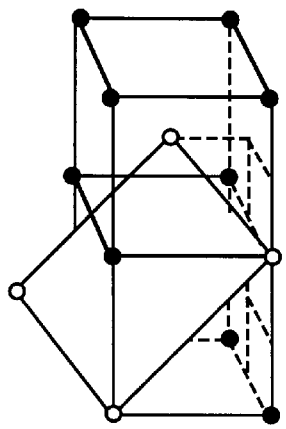
FIG. 6(d) {112}
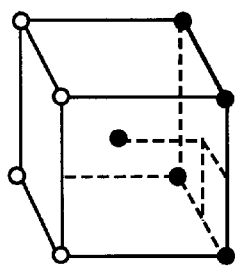
FIG. 6(a) {001}
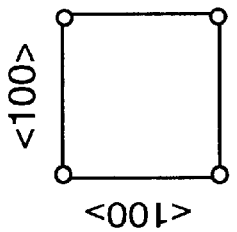
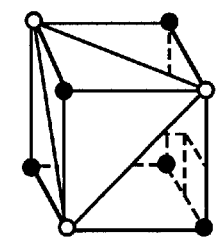
FIG. 6(c) {111}
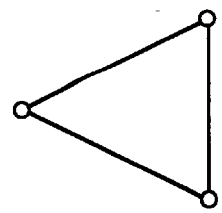

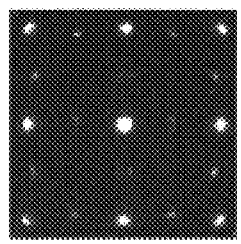
FIG. 11(a)
FIG. 11(b)
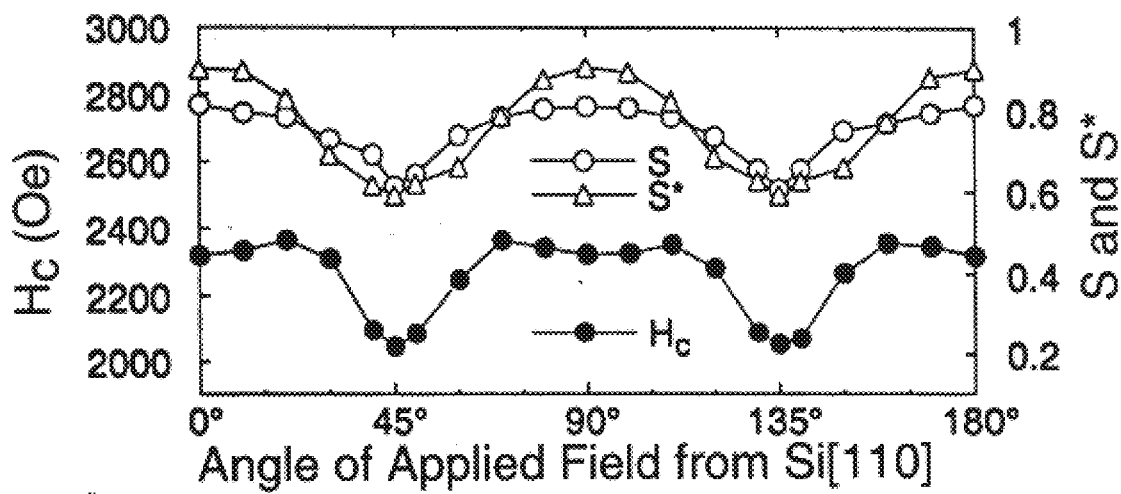
FIG. 11c
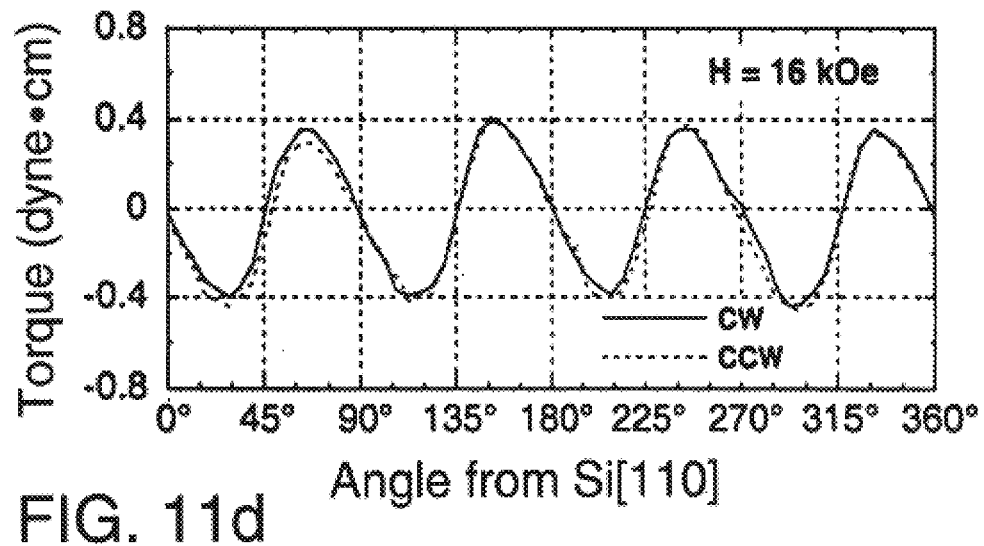
FIG. 11d

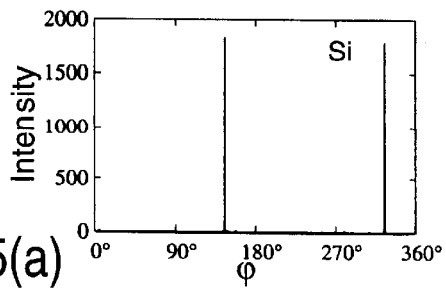
FIG. 15(a)
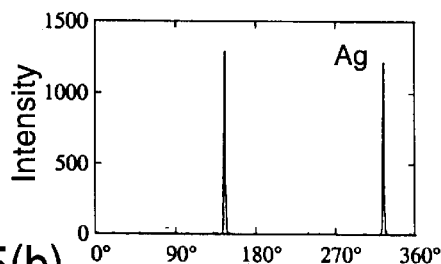
FIG. 15(b)
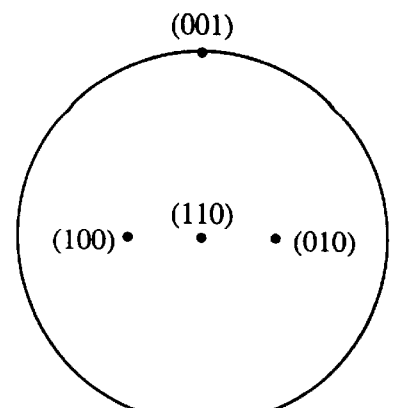
FIG. 15(a',b')
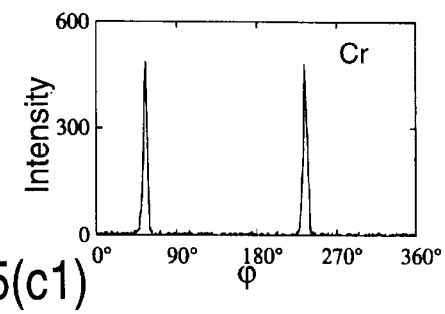
FIG. 15(c1)
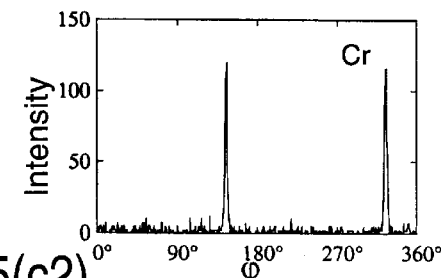
FIG. 15(c2)
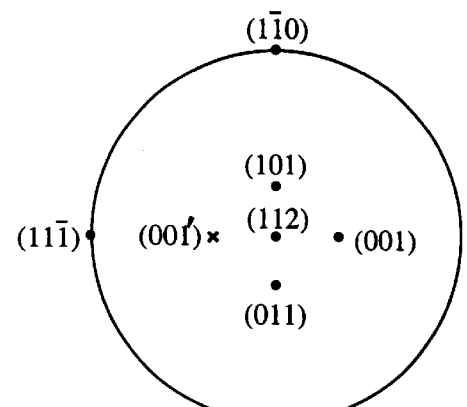
FIG. 15(c')
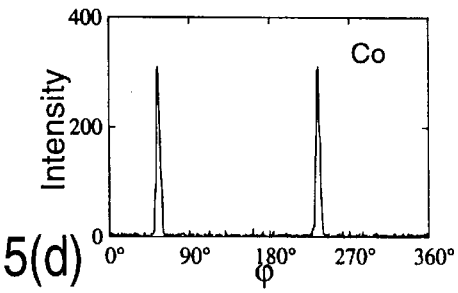
FIG. 15(d)
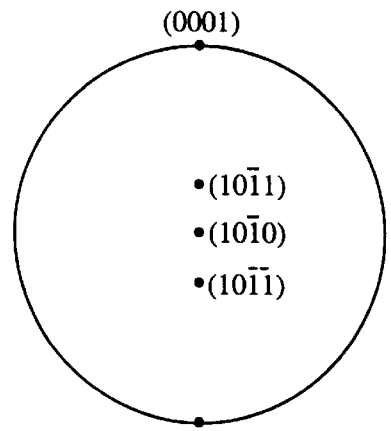
FIG. 15(d')

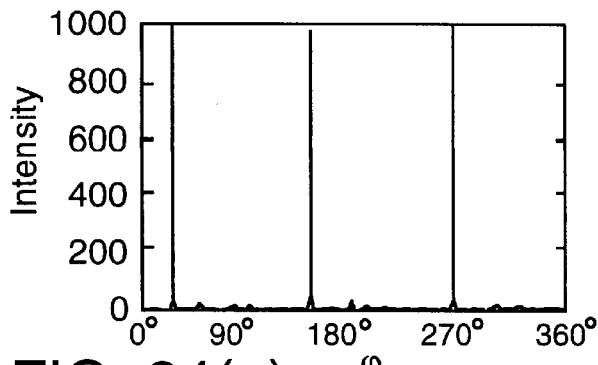
FIG. 24(a)
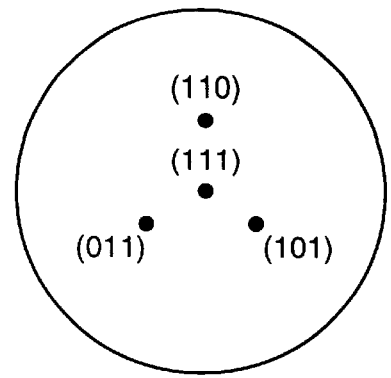
FIG. 24(a')
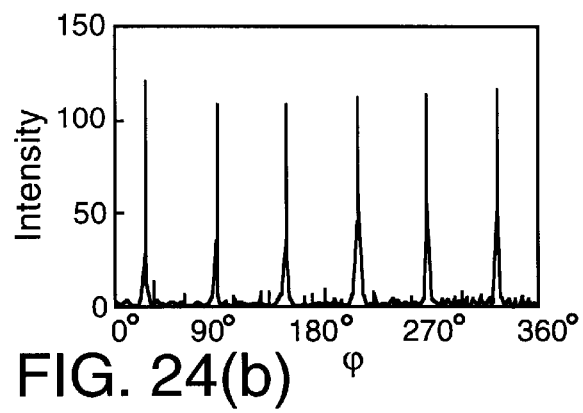
FIG. 24(b)
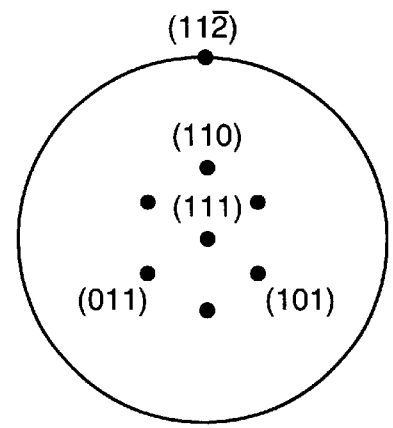
FIG. 24(b')
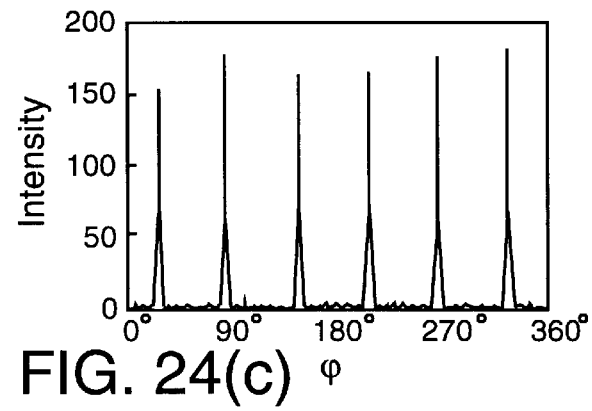
FIG. 24(c)
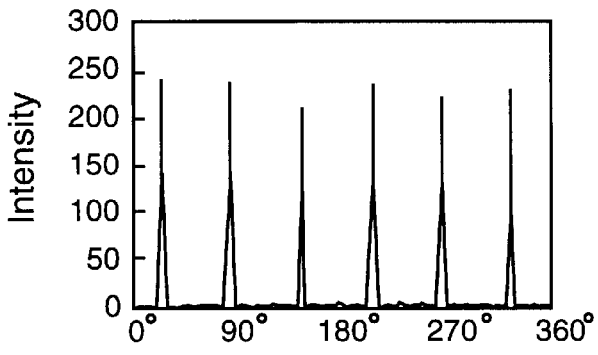
FIG. 24(d)
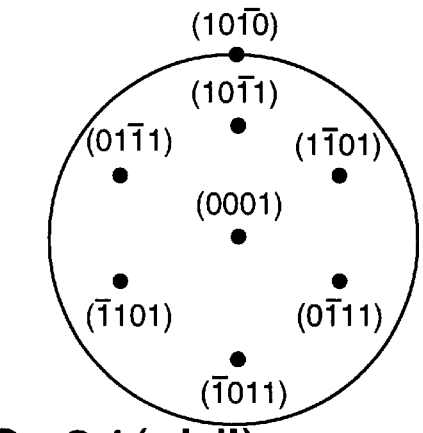
FIG. 24(c'd')

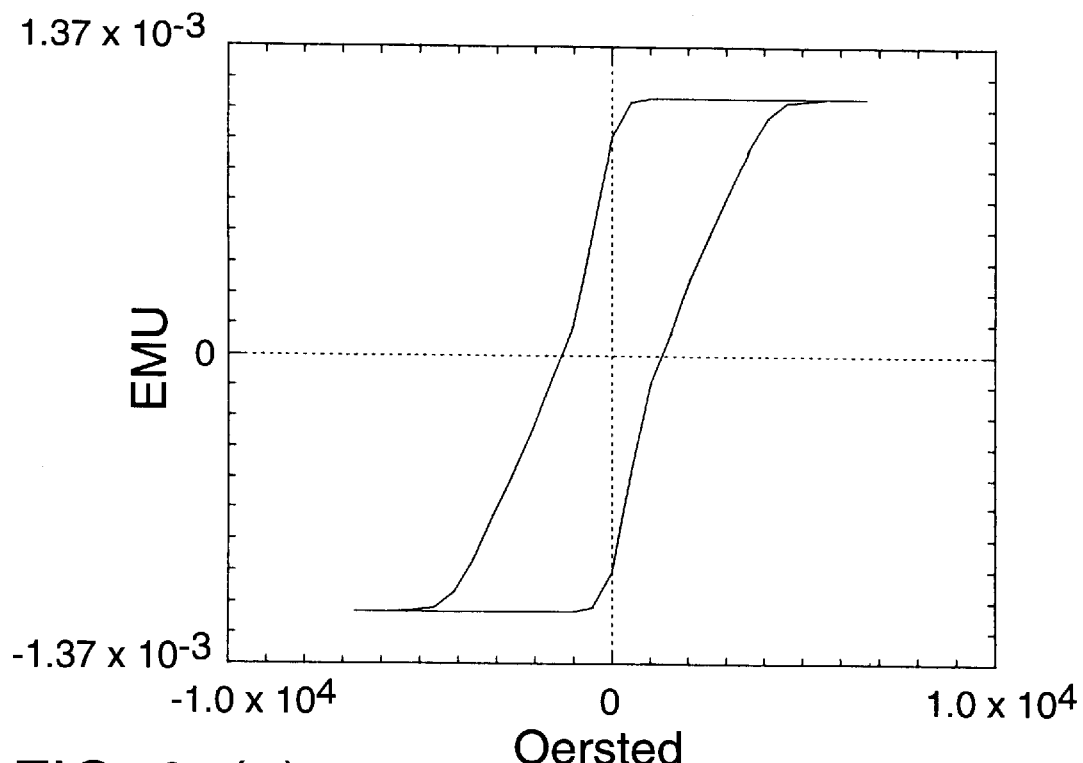
FIG. 25(a)
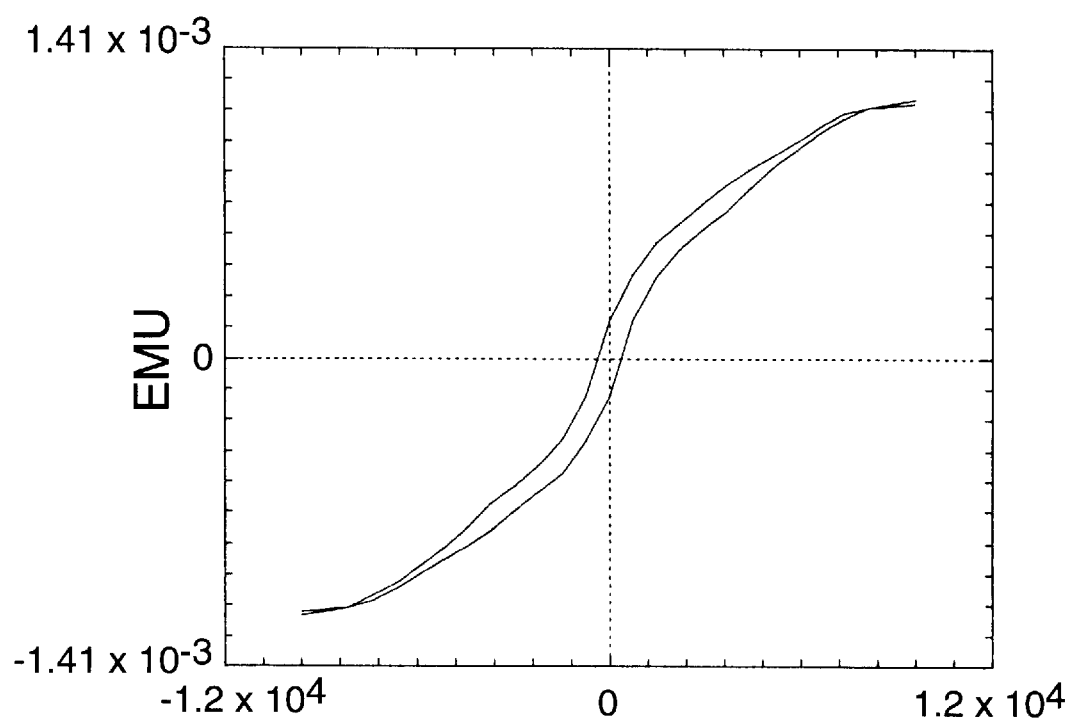
FIG. 25(a')

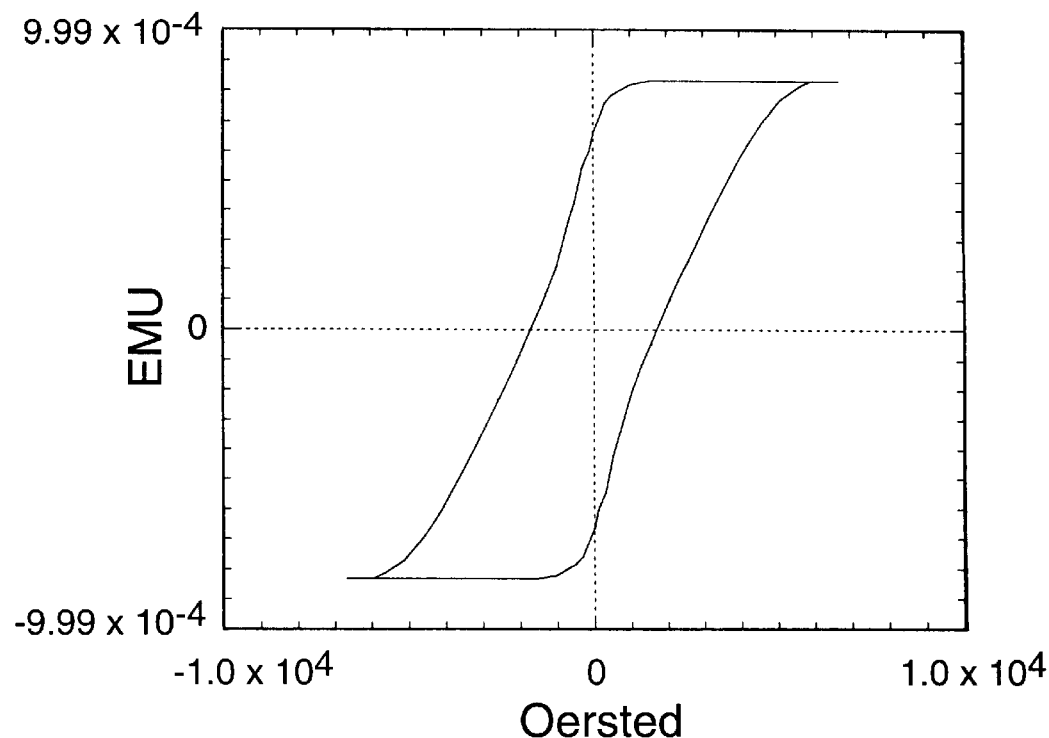
FIG. 25(b)
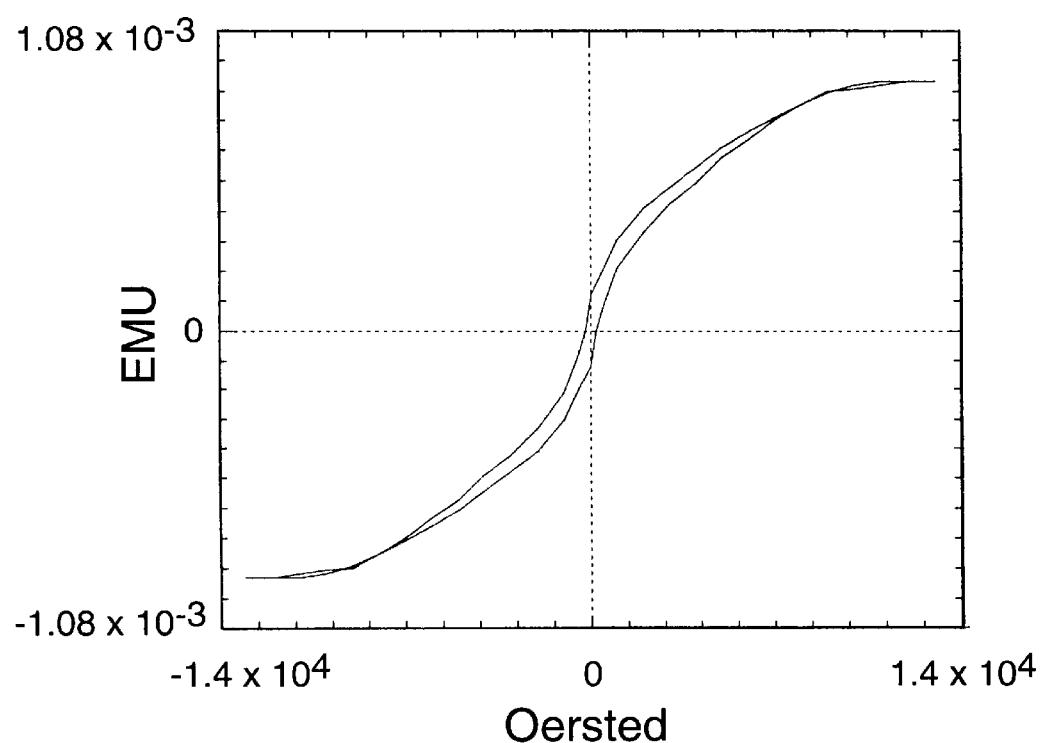
FIG. 25(b')

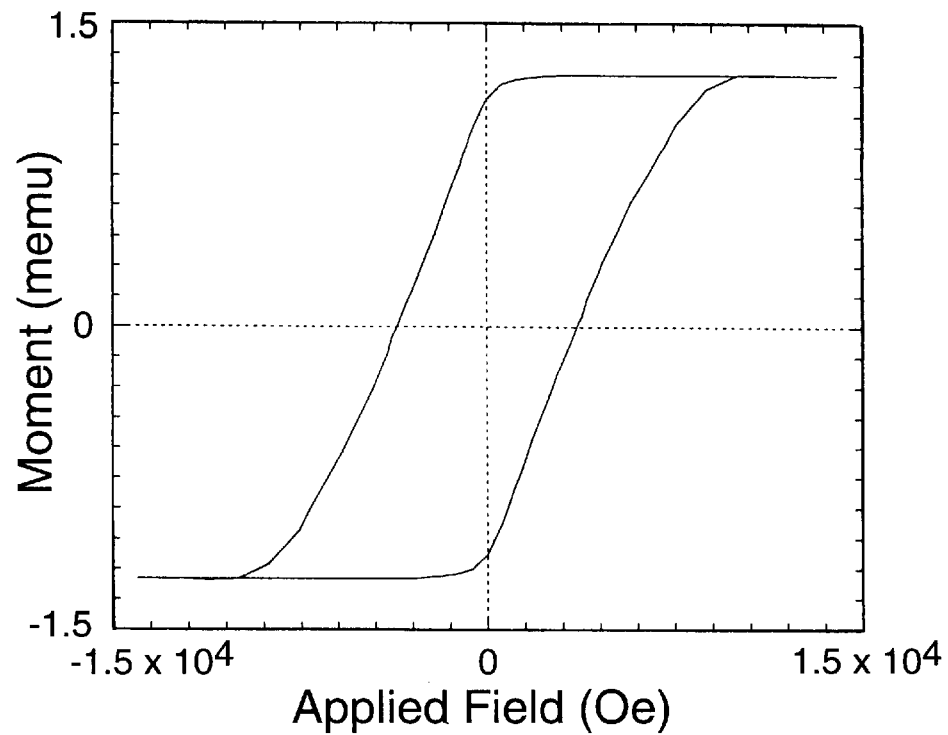
FIG. 25(c)   Easy Axis Loop
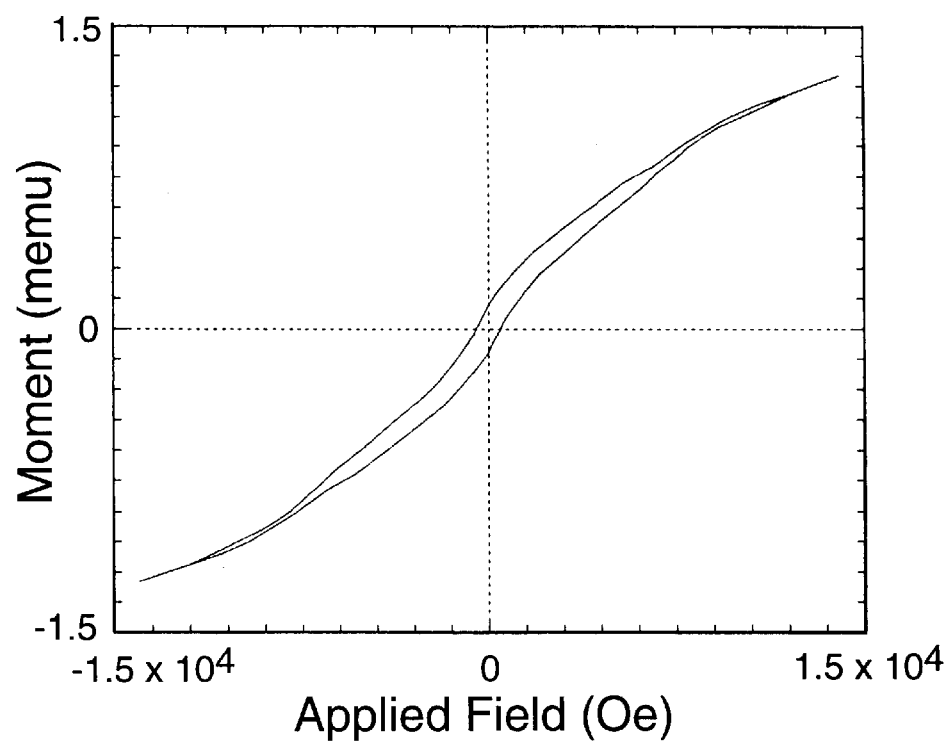
FIG. 25(c')   Hard Axis Loop

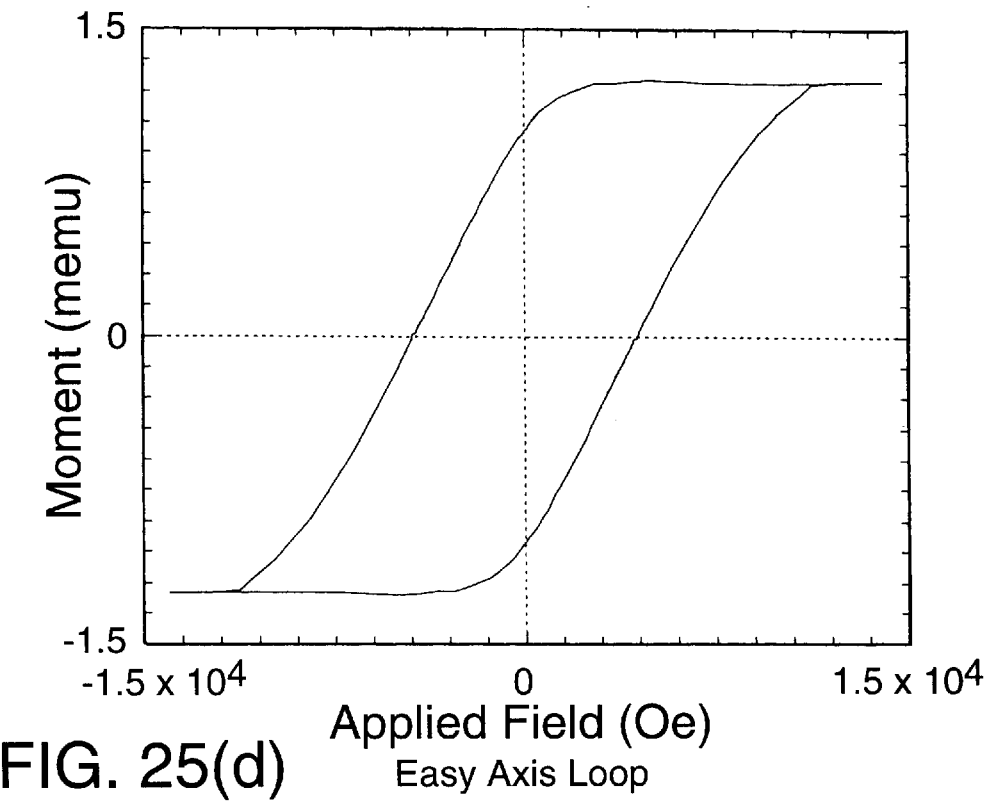
FIG. 25(d) Easy Axis Loop
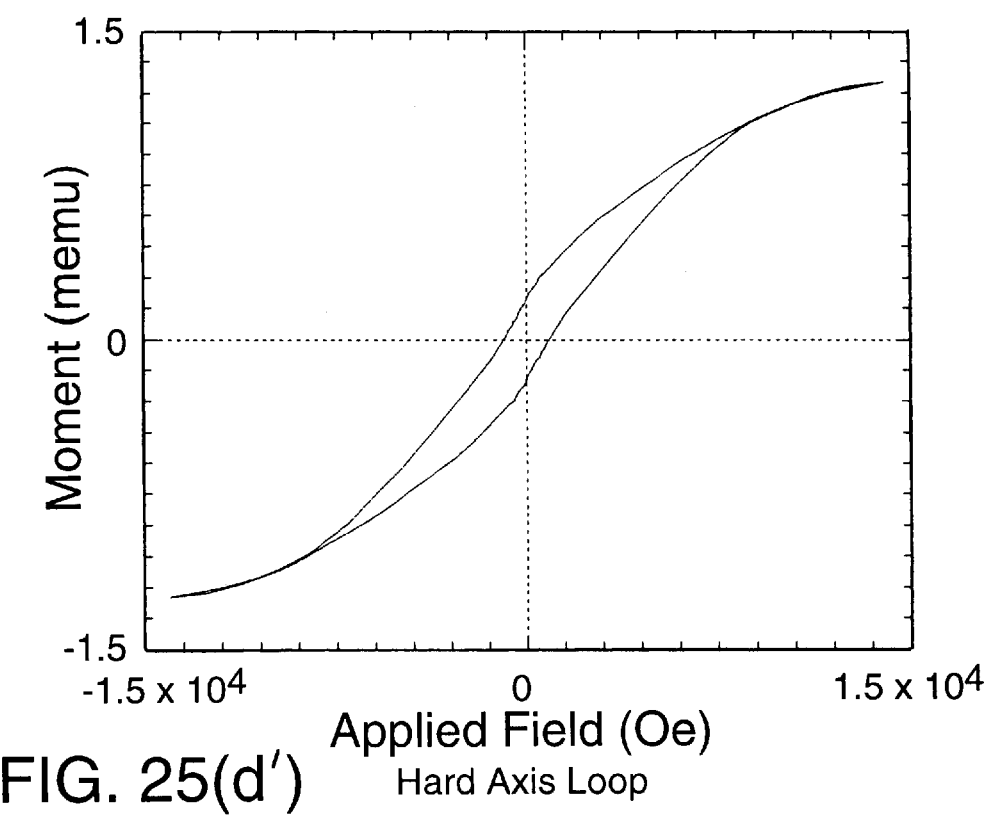
FIG. 25(d′) Hard Axis Loop

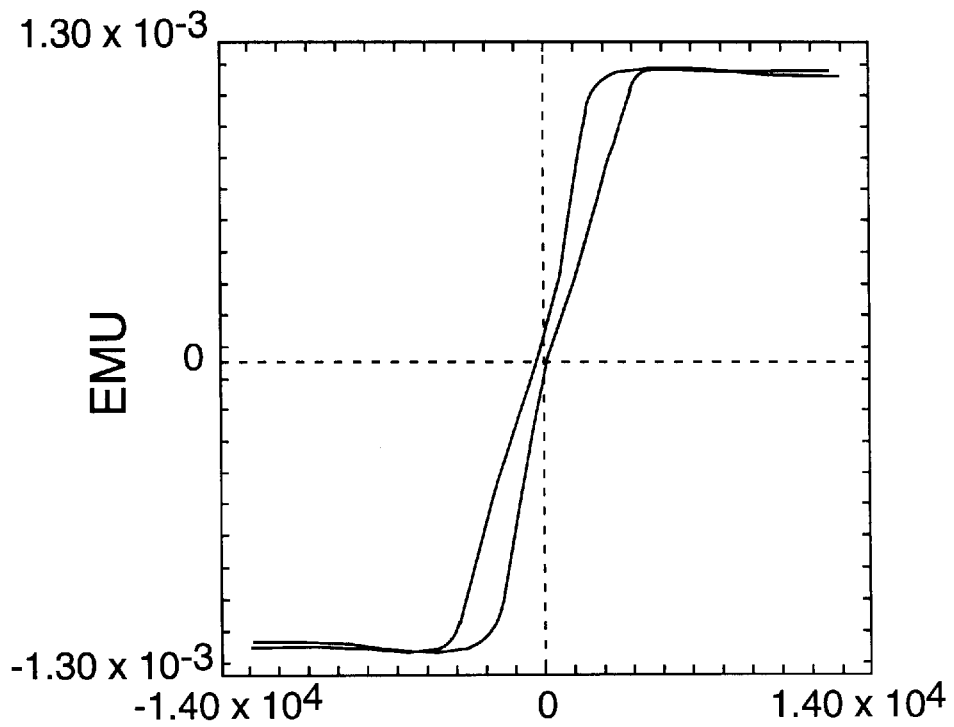
FIG. 25(e)
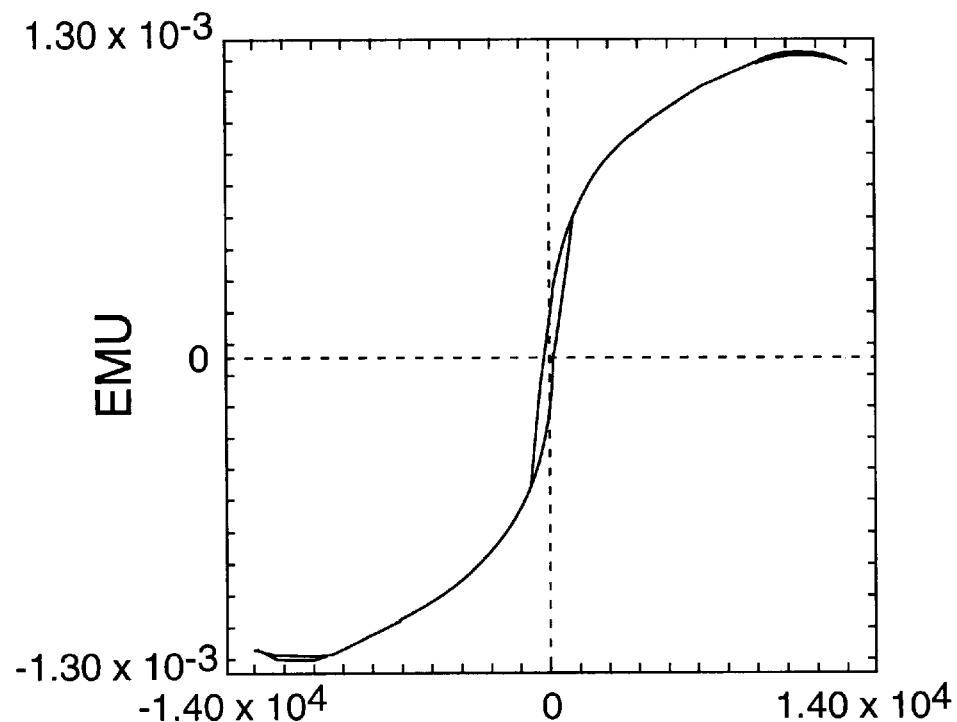
FIG. 25(e′)

HIGHLY ORIENTED MAGNETIC THIN FILMS, RECORDING MEDIA, TRANSDUCERS, DEVICES MADE THEREFROM AND METHODS OF MAKING

STATEMENT REGARDING FEDERALLY SPONSORED RESEARCH OR DEVELOPMENT

This work was supported in part under a National Science Foundation Grant No. ECD-8907068. The government has certain rights to this invention.

CROSS-REFERENCE TO RELATED APPLICATIONS

Not Applicable

BACKGROUND OF THE INVENTION

The present invention is directed generally to thin films, magnetic recording media, transducers and devices incorporating the films and, more particularly, to thin films promoting highly oriented cobalt or cobalt alloy magnetic layers for use in magnetic recording media and transducers.

There is an ever increasing demand for magnetic recording media with higher storage capacity, lower noise and lower costs. To meet this demand, recording media have been developed with increased recording densities and more well-defined grain structures that have substantially increased the storage capacity, while lowering the associated noise of the recording media. However, the rapid increases in recording densities over the last two decades, combined with the proliferation of personal computers have only served to fuel the demand for even higher storage capacity recording media having lower noise and cost.

Computational and data manipulation devices are being used in a rapidly expanding number of applications. Examples of these include supercomputers, personal desk top and portable laptop computers, file servers, personal data assistants, data collection devices, article tracking systems, video recorders, digital audio recorders, and even telephone answering machines. A common architectural feature is that they all have a central processing unit, input-output interfaces, various levels of temporary memory, and usually some form of permanent data storage device. The distinguishing characteristic of the permanent data storage device is that the information remains intact even if the electrical power is lost or removed. Data are stored on permanent data storage devices either optically or magnetically. The more commonly used data storage devices are based upon magnetic materials which are erasable and re-recordable. Common to all magnetic data storage devices are record and read transducers, a magnetic medium upon which to store the data, and a mechanism to position the medium or the transducers relative to one another.

Some of the more common permanent data storage devices include the floppy disk drive, the hard disk drive, and the magneto-optic disk drive in which data are stored in magnetic bits in segmented circular tracks. The magnetic medium is rotated and the transducers are stationary or moved radially to read or write data at a location on the medium.

Likewise, the magnetic medium is sometimes constructed as a tape or a sheet and is transported linearly while the transducers may be stationary, moved transversely across the moving medium, or even moved in a helical arc relative to the medium. Also, in the future it is conceived that very large amounts of data may be stored on physically very small formats where the medium or the transducers are moved in two dimensional Cartesian coordinates or arc motions relative to each other to access the data.

Historically, the transducers for many of the non-optical magnetic data storage systems have been inductive magnetic heads used for recording data by magnetizing the medium in a particular direction and for reading the data by detecting the direction of the magnetized medium. More recently, an inductive magnetic head is used for recording the data pattern while a magnetoresistive sensor is used for reading the data. In many of the magneto-optical storage devices an integral part of the record transducer is a component which generates a magnetic field at the medium surface while the surface is heated by using an optical source. The medium magnetization then assumes the magnetic orientation of the field generated by the record transducer when the medium cools. In some systems this orienting field is provided by an adjacent magnetic material.

Due to the physical size, efficiency and orientation of the record and read transducers the magnetic medium is generally magnetized in a preferred orientation. Hence, in almost all magnetic data storage media it is desired to orient the magnetic media in a direction to match the operational orientation of the recording and playback transducer. In addition, magnetic materials generally will magnetize more easily in a preferred orientation or orientations, along what are known as a magnetically easy axis or axes.

Magnetic properties, such as coercivity ($H_c$), remanant magnetization ($M_r$) and coercive squareness ($S^*$), are crucial to the recording performance of the medium. These magnetic properties are primarily dependent on the microstructure of the film for a fixed composition. For thin film longitudinal magnetic recording media, the magnetized layer preferably has uniaxial crystalline anisotropy and a magnetization easy axis directed along the c-axis and predominately in the plane of the film (i.e, in-plane). The predominate crystallographic orientation of a layer is known as the crystallographic texture, or texture, as used herein, as opposed to the use of the term "texture" to describe the mechanical roughness of a surface. That is, a crystal having a surface and a crystallographic plane parallel to the surface would be said to have a texture described by a direction vector orthogonal to the surface. Usually, the better the in-plane c-axis orientation, the higher the coercivity of the magnetic layer used for longitudinal recording. High coercivity is required to achieve a high remanence. Likewise, for perpendicular magnetic recording media, the desired crystalline structure of the Co alloys is hexagonal close packed ("hcp") with the uniaxial anisotropy and crystalline c-axis perpendicular to the film plane.

It is generally desirable to align the magnetically easy orientation of the medium with the orientation of the transducers. By aligning the orientations of the medium and the transducers, a data bit can be recorded with a lower energy transducer field and the ability to more easily magnetize the medium provides for a more strongly magnetized portion of the medium. The combination of these two effects allows a data bit to be recorded to and read from a more localized, yet more highly magnetized, portion of the medium. In other words, by aligning the relative magnetic orientations of the transducers and the medium, increased recording densities and storage capacities can be achieved. This results in a higher performance data storage device by allowing more data to be stored in a smaller area on the media. It also results in a lower cost per data bit and possibly lower cost storage devices, as fewer components are required to build an equivalent or larger capacity storage device. In many cases it also results in a decreased access time to reach a particular piece of stored data since the physical size of the storage system is smaller.

In the rotating storage devices it is desirable that the orientation of the medium be either random parallel to or constant in relation to the circumferential direction in the plane of the medium or that the orientation be perpendicular to the medium surface. In each of these orientations the relative orientations of the magnetic medium and the transducers does not vary as the medium is rotated relative to the transducers. Variations in the relative orientations of the medium and the transducers results in variations in the recording and reading of signals, which is known as signal modulation.

For floppy disks and most hard disks the orientation is nearly random in the plane of the medium. However, rotating magnetic media often have some small degree of orientation along the record track direction due to the mechanical roughness of the substrate surface. For perpendicular magnetic media, the orientation must be well oriented perpendicular to the media plane to match the field orientation of the record and read transducers. In magneto-optical recording, the magneto-optical Faraday effect, or Kerr effect, is far larger when the light propagates parallel to the magnetization direction. Because the light is usually delivered perpendicular to the medium surface, it is desired that the magnetic orientation of the medium be the same. Likewise, for tape and sheet magnetic recording systems the preferred magnetic orientation of the media is parallel to the field orientation of the transducers.

Modern high performance magnetic media generally consist of one or more thin magnetic films supported on a substrate. The thin films are generally vacuum deposited on the substrate by various techniques such as thermal or electron beam evaporation, RF or DC diode or magnetron sputtering, ion beam deposition, laser ablation, or chemical vapor phase deposition. However, films have also been prepared by electrochemical deposition. In most magnetic recording media, such as used in hard disks, the thin film layers are polycrystalline. In most commercial magneto-optical recording media the magnetic thin film layers are composed of amorphous rare earth-transition metal alloys, but polycrystalline superlattices have also been used.

In hard disk applications, the substrate can be made from a glass, a glass ceramic, or ceramic, but is more commonly an AlMg alloy with a NiP layer which is electrolessly plated on the surface. Typically one or more non-magnetic underlayers, such as Cr, Cr with an additional alloy element X (X=C, Mg, Al, Si, Ti, V, Co, Ni, Cu, Zr, Nb, Mo, La, Ce, Mn, Nd, Gd, Tb, Dy, Er, Ta, and W), Ti, W, Mo, NiP and B2-ordered lattice structures, such as NiAl and FeAl, are deposited on the substrate prior to depositing the magnetic layers to promote a particular orientation and/or to control the grain size of the magnetic layers, which are typically composed of Co alloys.

Another factor that affects the recording performance is the grain size and grain separation in the magnetic layer. The size and separation of the individual grains not only affects the media noise and recording density achievable on the layer, but the separation also affects the achievable separation of the recorded data transitions, or signal, the degree of overlap of which induces additional media noise in the signal.

Cobalt-based alloys as opposed to pure cobalt are commonly used in longitudinal and perpendicular magnetic media for a variety of reasons. For example, non-magnetic elements such as Cr are commonly bulk doped into the magnetic film to lower the magnetization. This is especially important in perpendicular media where the demagnetization energy associated with the magnetic moment of the alloy must be less than the magneto-crystalline anisotropy energy in order for the magnetization to be oriented perpendicular to the media film plane. The same technique is used in longitudinal magnetic media to lower the flux transition demagnetization energy, resulting in a shorter flux transition length and, hence, higher recording densities. Even more importantly, however, non-magnetic elements are introduced into the Co-alloy to provide grain to grain isolation via non-ferromagnetic material diffusion to limit the magnetic exchange coupling between cobalt grains.

Generally, for very small grain sizes, the coercivity increases with increased grain size. Large grains, however, results in greater noise. There is a need to achieve high coercivities without the increase in noise associated with large grains. To achieve a low noise magnetic medium, the Co alloy thin film should have uniformly sized, small grains with grain boundaries which can magnetically isolate neighboring grains. This kind of microstructure, orientation, and crystallographic texture is normally achieved by manipulating the deposition process, by grooving the substrate surface, by varying the cobalt alloy composition or by the proper use of underlayers.

Separation of the grains of the magnetic layer and the resulting improvement in the signal to noise ratio of a recorded signal is promoted by inducing epitaxial crystalline growth of the magnetic layer grains. The grain size and orientation quality of the magnetic thin film layers are largely determined by the grain size and texture quality of the layer upon which the layer is being deposited. The degree to which a prior layer can be made to induce a texture in a second layer depends, in part, upon the relative size, or lattice spacing and the crystal structure, of the material in each layer. As might be expected, if there is a substantial variation between the crystal sizes and structure of layers the crystallographic texture will not be replicated and the layer will be deposited with either an amorphous structure and/or in an orientation of the crystal structure independent of the underlayer and representative of the lowest energy state, i.e. closest packed structure, depending upon the material.

For Co based magnetic media it has been found that Cr provides a good crystallographic texture for Co alloys, as Co grains tend to replicate the Cr grain size and the orientation is somewhat set by the underlayer quasi-epitaxial growth of the Co on the Cr crystallites. Depending upon the particular Co alloy being used as the magnetic layer, the underlayer alloy composition can be chosen to vary the atomic crystalline lattice parameter to better match the lattice spacing of the Co alloy. For example, U.S. Pat. No. 4,652,499 discloses efforts to improve the underlayer of longitudinal magnetic media by adding vanadium (V) to Cr to change its lattice constant and thereby to promote better lattice matching between the hcp Co alloys, such as CoPt or CoPtCr, and the body centered cubic ("bcc") CrV underlayer. Others have discussed similar results by additions of other similarly soluble large atomic radii materials, such as Ti and Mo, in the bcc structure of Cr. The lattice matching promotes the growth of the Co alloy into a hcp structure as opposed to a face centered cubic ("fcc") structure.

The hcp Co alloys have a high uniaxial anisotropy constant, along the hcp c-axis, which is necessary to achieve a high coercivity in the magnetic media. In rotating media applications, the Co alloy is epitaxially grown upon a random in the plane orientation of bcc Cr crystallites to prevent signal modulation. That is, the Co should be oriented with a preferred set of crystal planes parallel to the substrate surface plane. Several Cr textures are suitable to grow Co with its magnetic easy axis in or near the film plane. For example, K. Hono, B. Wong, and D. E. Laughlin, "Crystallography of Co/Cr bilayer magnetic thin films", Journal of Applied Physics 68 (9) p. 4734 (1990) describe bcc Cr underlayers that promote grain-to-grain epitaxial growth of hcp Co alloy thin films deposited on these underlayers and the orientation of the Co alloy [0002] c-axis, and, hence, the magnetic easy axis, is directly related to the crystallographic texture of the Cr alloy underlayer. The most common of these texture relationships between the Cr alloy and the Co alloy are summarized as:

quad-Crystal: Co(10$\bar{1}$1)[$\bar{1}$2$\bar{1}$0] ∥ Cr(110)[1$\bar{1}$0] or Co(10$\bar{1}$1)[$\bar{1}$2$\bar{1}$0] ∥ Cr(110)[$\bar{1}$10]

bi-Crystal: Co(11$\bar{2}$0)[0001] ∥ Cr(002)[110] or Co(11$\bar{2}$0)[0001] ∥ Cr(002)[1$\bar{1}$0]

uni-Crystal: Co(10$\bar{1}$0)[0001]∥ Cr(112)[1$\bar{1}$0]

While the Cr (001) (bi-crystal) and Cr (112) (uni-crystal) textures induce the Co alloy c-axis, [0002], into the film plane, the most easily formed Cr (110) texture results in the c-axis being inclined at ±28 degrees with respect to the surface. Hence, a lower coercivity results from the Co grown on the (110) Cr texture as the c-axes are not parallel to the recording plane. Also there are multiple directions that the Co c-axes can be placed upon the Cr (002) and the Cr (110) textures. Hence, upon a single (002) textured Cr grain 2 possible c-axis orientations can grow (bi-crystal) while upon a single (110) textured Cr grain 4 possible c-axis orientations of Cr can grow (quad-crystal). If these variants do coexist on single Cr alloy grains, the bi-crystals and quad-crystals then can never have all of the c-axes simultaneously parallel to the applied field and the coercivities of the grains will be decreased. On the other hand, the very uncommon uni-crystal Co(10$\underline{1}$0)//Cr(112) texture relationship only allows a single orientation upon a Cr grain and results in a higher coercivity whether the Cr grains are randomly oriented in the film plane or oriented parallel to the recording field direction.

At room temperature, or if a negative voltage bias is applied to the substrate during sputter deposition, it has been experimentally found that the Cr(110) texture tends to develop and assuming a reasonable lattice match exist between the Cr alloy and the Co alloy crystals the quad-crystal hcp Co tends to grow. Likewise, it has also been found that when the Cr is deposited at elevated temperatures a limited degree of Cr(002) is observed by x-ray diffraction and to a degree the Co bi-crystal tends to grow. However, in each of these cases there is considerable dispersion and variation in the texture of the Cr and in the resulting orientation of these magnetic easy axes of the Co magnetic layers. The desirable Cr (112) texture, which is required to obtain the uni-crystal, is not often seen except when Cr is made unsuitably thick for media and at which point the Cr crystallites are growing in all directions and the film is usually showing multiple textures similar to a polycrystalline powder.

Applicants have previously found that well textured Cr layers having a (002) orientation can be produced using a polycrystalline MgO seed layer as described in U.S. Pat. No. 5,800,931, which is incorporated herein by reference. In addition, Applicants have also shown that Cr (112) can be produced if the Cr is epitaxially grown on a (112) oriented B2 body centered cubic derivative material, such as NiAl and FeAl, as described in U.S. Pat. No. 5,693,426, which is incorporated herein by reference. It is also noted that Nakamura et al. have produced (002) and (112) Cr during crystal studies on single crystal MgO, NaCl structure (Jpn. J. Applied Physics, Vol. 32, part 2, No. 10A, L1410 (October, 1993) and Jpn. J. Appl. Phys. Vol. 34(1995) pp. 2307–2311).

Additional improvements in the structure of the magnetic layer have been found by incorporating intermediate layers between the underlayer and the magnetic layer. Also, seed layers can be incorporated between the underlayer and the substrate to provide additional control of the structure of the underlayer, control the roughness of the films, and to prevent contamination of the underlayer by the substrate contaminants. The multiple seed layers, multiple underlayers, and intermediate layers are collectively referred to herein as the underlayer structure. In addition, multiple magnetic layers that may or may not be separated by a non-ferromagnetic inner layer such as Cr or Cr alloys are sometimes employed to produce variations in the magnetic properties of the resulting film. The magnetic layers and intervening inner layers are collectively referred to herein as the magnetic layer structure. The use of multi-layered underlayer and magnetic layer structures can provide for increased control over the grain size, the grain to grain isolation and epitaxial growth of subsequent layers and the surface roughness of the magnetic layers. However, the use of additional layers will also increase the overall cost and complexity of the manufacturing process.

For perpendicular recording it is desired that the Co alloy c-axis be perpendicular to the substrate plane. This means that the Co alloy has a (0002) texture and the [0002] crystal direction is perpendicular to the film plane. It has been found that if Co is grown fairly thick that this texture naturally develops as the (0002) plane of atoms are closest packed. However, this is unsuitable for media as a large dispersion in this orientation results and the first portion of these films have random or extremely poor orientation.

Some degree of perpendicular orientation of the Co c-axis with respect to the film plane has been obtained by grain-to-grain quasi-epitaxial growth of the hcp Co alloy thin film to an oriented hcp underlayer of (0002) crystalline texture or a fcc underlayer. Ti and $Ti_{90}Cr_{10at\%}$ are often cited as the best seed layers or underlayers for this purpose, although other seed layers, such as Pt, CoO and thick non-magnetic hcp $CoCr_{35at\%}$ have been used to induce this structure. See "Compositional separation of CoCrPt/Cr films for longitudinal recording and CoCr/Ti films for perpendicular recording" IEEE Trans. Magn., Vol. 27, no. 6, part 2, pp. 4718–4720 (1991); and, IEEE Trans. Magn. Vol. 30, no. 6, pp. 4020–4022 (November 1994).

The degree of orientation must be exceptionally good for perpendicular recording as the perpendicular head field patterns have low field gradients because there is no return path for the field flux. To date there has been no commercially viable products using perpendicular thin film recording media that are comparable in terms of longitudinal thin film recording products.

Many attempts have been made to solve the difficulty of the poor perpendicular head field gradients by producing media that have a soft magnetic "keeper" layer, such as permalloy or CoZr alloys, deposited under the recording media. The soft layer is used to provide a high permeability magnetic flux return path to sharpen the perpendicular pole-head field gradients, which sharpens the data transitions in the recorded patterns. However, the soft magnetic layers add complexity to the media and commonly increase the media noise due to their imperfect or lack of quality and the resulting domain wall motion Barkhausen phenomena.

Magnetic recording and playback transducers are composed of soft magnetic materials such as CoZr, $FeN_x$, FeAlN$_x$, FeTaN$_x$, FeSi alloys, NiFe alloys or FeCo alloys. Analogous to the media in order to produce high performance transducers it is necessary to control the crystallographic orientation, magnetic anisotropy magnitude and orientation, and grain size, as well as, magnetostrictive and magnetoelastic properties, and localized stresses in the material. Without control of these attributes and factors the transducer may have undesirably large hysteretic properties, remain magnetized even after the drive signal has been removed, exhibit Barkhausen phenomena or time delayed noise spikes, or exhibit non-linear response to field signals.

In order to produce more uniform response in fcc Ni alloy soft materials, vacuum deposited seed layers are sometimes employed to induce the fcc Ni alloy to have a (111) texture. For materials such as NiFe alloys the easy magnetic axes lie along the <111> directions so if a (111) texture is induced the easy axes to lie only 19° from the film plane. The quality of this orientation plays a significant role in determining the uniformity of the magnetic spin rotation or the magnetic domain wall motion in these layers.

Likewise, in magnetoresistive or spin valve sensors it is common to use hard magnetic materials, very similar to those used in magnetic recording media, to provide magnetic biasing to the soft magnetic materials. For example U.S. Pat. No. 4,902,583 describes the use of CoPt for this purpose. As with magnetic media it is desirable to control the texture quality in order to improve the anisotropy and the coercivity of these device elements. In order to improve the performance of magnetic data storage transducers there is considerable need to develop methods, materials and thin film device structures which will yield a high degree of orientation and uniformity of the magnetic film properties.

As is obvious from the preceding discussions, there is a continuing need for lighter, smaller and better performing and less costly memory devices. In order to meet to this need, the underlayers must exhibit an unusually high degree of crystallographic orientation, which will then result in high degree of magnetic orientation. These devices must provide greater storage density and higher recording and reading quality and efficiency for use in today's hard disk drives, for transducers with other magnetic storage devices, and other applications.

BRIEF SUMMARY OF THE INVENTION

The present invention is directed to thin films, magnetic and magneto-optic recording media, transducers and devices incorporating the films. The thin film material structures generally include a substrate, an underlayer structure which includes an underlayer and may include one or more additional underlayers, seed and/or wetting layers, and intermediate layers, and a magnetic layer structure, which includes a magnetic layer and may include one or more additional magnetic layers and inner nonmagnetic layers disposed between the magnetic layers.

In one aspect, the recording medium includes a magnetic recording layer comprised of Co-based material, such as Co or one or more Co alloys having a (10$\bar{1}$0) crystal texture, a substrate, a first underlayer having a fcc structure and a (110) crystal texture disposed between the substrate and the magnetic recording layer. A second underlayer having a bcc structure and a (112) crystal texture is also disposed between the magnetic recording layer and the first underlayer. In a preferred embodiment, the first and second underlayers are comprised of Ag and Cr, respectively, and the substrate is a single crystal Si substrate having a (110) orientation. Also, a conventional substrate having a polycrystalline fcc structure seed layer or underlayer, deposited on the substrate with a (110) crystal texture can be used.

Applicants have found that by using Si single crystal substrates multiple material layer structures can be epitaxially grown upon the extremely well atomic ordered substrate and upon one another to produce highly oriented magnetic crystallites having long range atomic order. This high degree of order and single texture of the films result in magnetic films with superior orientational properties. This degree of orientation and uniformity of properties over long distances improves the magnetic properties, such as remnance, coercivity, S, and S*.

In particular, it has been found that certain metals having fcc structures, such as Ag, Cu, Al, and Au and fcc derivative structures, such as L1$_0$ and L1$_2$ structures, can be epitaxially grown on the non-oxidized Si surfaces. While the one unit cell to one unit cell lattice match between fcc Ag and A4(diamond) Si is quite poor, multiples of the Ag unit cell distance fit very well on the Si surface. Hence, because of the very long range order of the single crystal surface of the Si epitaxial growth of the Ag occurs. Bcc structure, such as Cr, or a bcc derivative, such as NiAl, FeAl (B2), or Fe$_3$Al, AlNi$_2$Ta, AlNi$_2$Nb (DO3), AlNi$_2$Ti (DO3 +B2) or L2$_1$ structures can be epitaxially grown upon the fcc structure.

In another aspect, the recording medium includes a magnetic recording layer comprised of Co-based material, such as Co or one or more Co alloys having a (11$\bar{2}$0) crystal texture, a substrate, a first underlayer having a fcc structure and a (001) crystal texture disposed between the substrate and the magnetic recording layer. A second underlayer having a bcc structure and a (001) crystal texture is also disposed between the magnetic recording layer and the first underlayer. In a preferred embodiment, the first and second underlayers are comprised of Ag and Cr, respectively, and the substrate is a single crystal Si substrate having a (001) crystal texture or a conventional substrate having a polycrystalline seed layer, such as MgO, having a (001) crystal texture.

In another aspect, the recording media includes a magnetic recording layer comprised of Co-based material, such as Co or one or more Co alloys having a (10$\bar{1}$1) crystal texture, a substrate, a first underlayer having a fcc structure and a (111) crystal texture disposed between the substrate and the magnetic recording layer. A second underlayer having a bcc structure and a (110) crystal texture is also disposed between the magnetic recording layer and the first underlayer. In a preferred embodiment, the first and second underlayers are comprised of Ag and Cr, respectively, and the substrate is a single crystal Si substrate having a (111) orientation or a conventional substrate having a polycrystalline bcc structure seed layer or underlayer, deposited on the substrate with a (110) crystal texture.

In a further aspect, perpendicular recording media and transducers include a hard magnetic layer, such as a Co-based material, having a (0002) crystal texture deposited on hcp (0002) template, such as Ti, or a compatibly matched fcc (111) structure, such as Cu, which may be further deposited on a Ag (111) layer. A Si (111) substrate can used to provide the template for the growth of the fcc (111) structure or a conventional substrate having a polycrystalline bcc structure seed layer or underlayer, deposited on the substrate with a (110) crystal texture.

In addition, the perpendicular media and transducers can be constructed using soft magnetic material, such as NiFe alloys, deposited with a (111) on one or more fcc (111) structures, preferably Cu (111) on Ag (111). The oriented soft magnetic layer can be incorporated into transducers and recording media in the presence or absence of hard magnetic layers depending upon the particular application.

Accordingly, the present invention provides for highly oriented magnetic recording media, transducers and data storage devices incorporating recording media and transducers having high coercivity and lower noise and cost for use in hard disk drives and other applications. These advantages and others will become apparent from the following detailed description.

BRIEF DESCRIPTION OF THE DRAWINGS

The advantages of the present invention can be better understood by reference to the drawings in which:

FIG. 3 shows four crystallographic planes in a hexagonal close packed structure;

FIG. 4 shows three crystallographic planes in a face centered cubic structure;

FIG. 5 shows three crystallographic planes in a diamond cubic structure;

FIG. 6 shows four crystallographic planes in a body centered cubic structure;

FIGS. 11(a–c) show (a) Cr[001] zone axis electron diffraction pattern of a CoCrTa/Cr film grown on a 500 Å Ag template, and (b) simulated Co[11$\bar{2}$0]/Cr[001] zone axis electron diffraction pattern of bicrystal Co/Cr bilayer. (c) In-plane angular variation of the magnetic properties, and (d) in-plane torque curve of a CoCrTa(200 Å)/Cr(300 Å)/Ag (500 Å)/HF-Si film;

FIGS. 15(a–d) and (a'–d') show φ-scan results and stereographic projections for Si, Ag, Cr, and Co, respectively;

FIGS. 24(a–d) and (a'–d') show φ-scan results and stereographic projections for Si, Ag, Ti, and Co, respectively;

FIGS. 25(a–e) and (a'–e') show hysteresis curves for magnetic easy and hard axes, respectively, of Samples A–E in Table II;

DETAILED DESCRIPTION OF THE INVENTION

The material structures of the invention can be embodied in recording media and transducers used to record and read data on the recording media. The recording media can be used in rotating, translating, or stationary data storage devices, such as a rigid magnetic hard disc incorporated into a disc drive of a computer(not shown).

Figure 1:
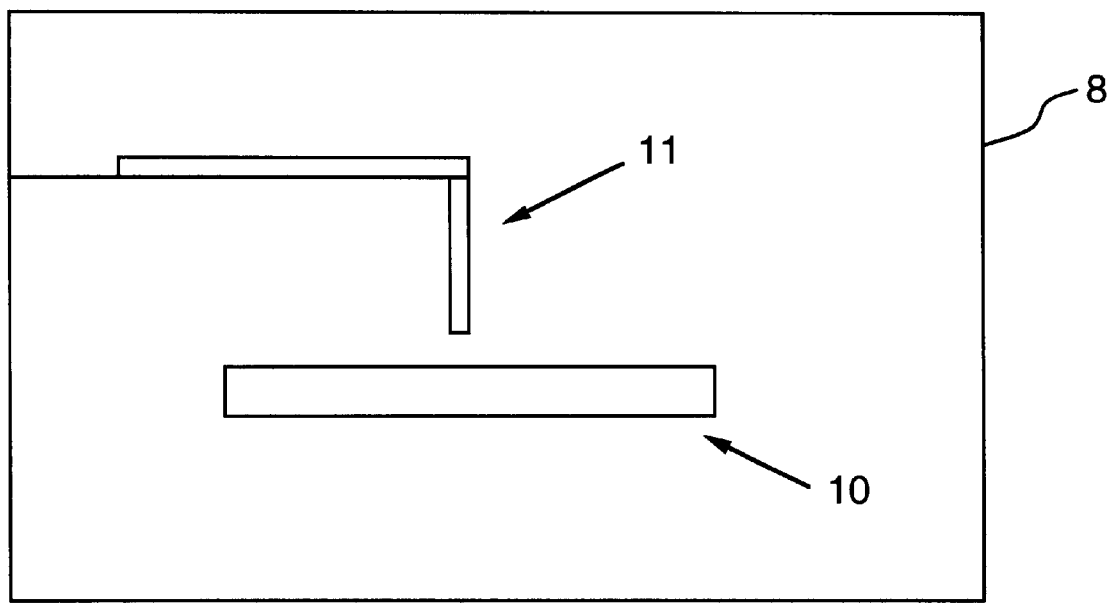
FIG. 1 shows a data storage device including a transducer and a recording medium.

Typically, data storage devices 8 include a recording medium 10 and a transducer 11 in a head, or slider, that is either stationary or supported on a movable arm in a suspension assembly used for moving the head over the surface of the medium 10, as shown in FIG. 1. The transducer 11 is maintained in a closely spaced, parallel relationship relative to the surface of the medium 10 during normal operation. A typical distance between the head and the medium is 10 μin or less. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference.

In more fully describing the present invention, the material structure of the recording medium 10 and transducer 11 will have the nomenclature described below. Referring to FIG. 2(a), the material structure in the recording medium 10 and transducer 11 of the present invention is comprised of a substrate 12, an underlayer 14, and a magnetic layer 16. The material structure might include a plurality of underlayers and/or magnetic layers that define an underlayer structure and magnetic layer structure, respectively. As shown in FIG. 2(b), the underlayer structure may also include a seed layer and/or a wetting layer 18 disposed on the substrate 12 or elsewhere within the underlayer structure, additional underlayers 20 and an intermediate layer 22 disposed on the underlayer 14 adjacent to the magnetic layer structure. The magnetic layer 16 may be covered with an overlayer structure including an overlayer 24 followed by an overcoat 26 and an organic lubricant 28. The wetting layer 18 can be an amorphous material or a film too thin to have developed a crystalline structure, or a film whose texture provides a gross lattice mismatch for the ensuing layer.

Figure 2C:
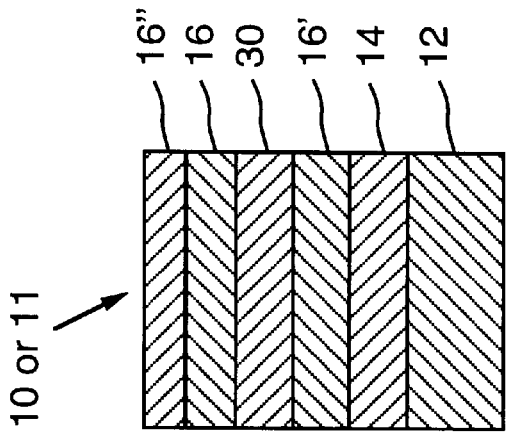
FIGS. 2(a–c) shows thin film material structures of the present invention.
Figure 2B:
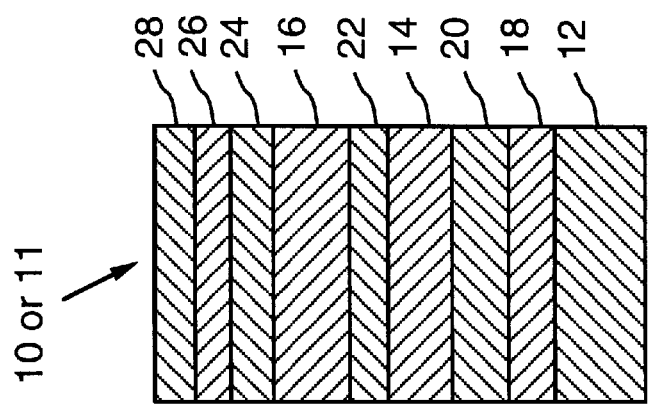
Figure 2A:
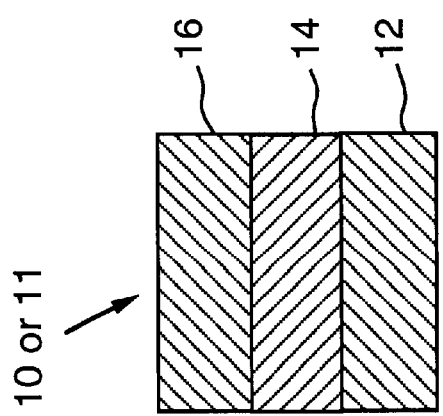

In another embodiment, shown in FIG. 2(c), the magnetic layer structure may include additional magnetic layers, 16' and 16", that may be separated by one or more inner layers 30. In perpendicular recording applications, the additional magnetic layers 16' and 16" may be soft magnetic keeper layers surrounding the magnetic layer 16 which may a magnetically hard material. In transducer applications, the magnetic layer 16 in FIG. 2(a) may be a magnetically hard or soft material depending on the function of the layer in the transducer 11 being used to read or record data on the medium 10.

Generally, the substrate 12 is formed of a nonmagnetic material, such as glass, silicon or an aluminum alloy coated with NiP, glass ceramic, ceramic, or SiC. However, in the present invention it may be desirable to use a single crystal having a preferred crystal orientation or texture, such as Si, depending upon the desired characteristics in the medium 10.

For longitudinal media, the magnetic layers, 16, 16', and 16", are deposited with the longitudinal magnetic easy axis thereof substantially parallel to the plane of such magnetic layer. The magnetically hard materials used in the magnetic layers 16 of the present invention are preferably a Co or Co alloy film, such as CoCr, CoSm, CoPr, CoP, CoNi, CoPt, CoNiCr, CoNiZr, CoPtNi, CoCrTa, CoCrPt, CoCrP, CoCrTaSi, CoCrPtSi, CoCrPtB, CoCrPtTa, CoCrPtTaB, CoCrPtTaNb or other known Co alloy magnetic films. For longitudinal recording media application the magnetic layers 16 are each about 2.5–60 nm (25–600 Å) thick. The magnetic layers 16 may also include soft magnetic materials, such NiFe alloys, particularly in perpendicular recording applications as further discussed within.

The wetting and/or seed layer 18 can be disposed between various layers in the medium 10 to either destroy the texture of the prior film or to provide a different texture upon which subsequent layer will be epitaxially grown depending upon whether a wetting or seed layer is used, respectively. The underlayers 14 and 20 are generally comprised of a material suitable for producing epitaxial growth of the magnetic layer 16 as will be discussed further below.

The overlayer 24 may be provided adjacent to and preferably in contact with the magnetic layer 16 or 16". The overlayer 24 is preferably 1–10 nm (10–100 Å) thick and may be made of W, Ta, Zr, Ti, Y, Pt, Cr, Mn, Mn alloy or any combination thereof.

The overcoat 26 may be provided external to the overlayer 24, so that the overlayer 24 is positioned between the magnetic layer 16 or 16" and the overcoat 24, as shown in FIGS. 1(b) and (c). The overcoat 26 provides a mechanical wear layer and is 2.5–30 nm (25–300 Å) thick. It is preferably made of a ceramic material or diamond-like carbon, such as $SiO_2$, SiC, $CH_x$ or $CN_x$ (where x<1), $ZrO_2$, or C. The organic lubricant 28 may be disposed on the overcoat 26. The lubricant 28 is 1 nm to 10 nm (10 to 100 Å) thick and is preferably a fluoro-chlorocarbon or a perfluoroether. Examples include $CCl_2FCClF_2$, $CF_3 (CF_2)_4CF_3$, $CF_3(CF_2)_5 CF_3$, $CF_3(CF_2)_{10}CF_3$, and $CF_3(CF_2)_{16}CF_3$.

Co-based alloy polycrystalline thin film magnetic layers having a random magnetic orientation in the film plane formed on Cr-based underlayers are currently the most popular structures for thin-film longitudinal recording media. These structures have a sufficiently high coercivity to meet the current industry recording density demands. An important parameter for assessing the achievable coercivity of a material is the anisotropy field constant $H_K$, which is defined as $2K_1/M_s$, where $K_1$ is the uniaxial anisotropy constant and $M_s$ is the saturation magnetization, both of which are intrinsic material properties.

In an ideal non-oriented polycrystalline Co thin film consisting of isolated, non-interacting single domain grains with a in-plane 2D random easy axis distribution, the highest coercivity, $H_c$, that can conceptually be realized, as determined by the Stoner-Wohlfarth model of rotation magnetization, is 0.51 $H_K$. However, if the single domain grains are randomly oriented in 3 dimensions the maximum achievable coercivity is considerably less than 0.51 $H_K$. Current industry efforts are being devoted to trying to approach this ideal $H_C$ for two dimensional random polycrystalline Co films.

While polycrystalline Co structures having a random in the plane orientation have proven suitable by today's standard, the maximum coercivity achievable with these structures will soon render them unsuitable to meet the ever-increasing areal recording density demands of industry and consumers. Therefore, it is necessary to envision the increased coercivities required for future high density recording and move beyond the current industry efforts to develop a more thorough understanding of the magnetocrystalline anisotropy of magnetic materials, and especially Co-based materials. For example, in a magnetic material having a single uniaxial magnetic easy axis orientation, such as in perpendicular media, the $H_c$ can conceptually reach 1.0 $H_K$, which means the potential achievable coercivities of magnetic media can be doubled.

In furtherance of this development, Applicants have found that materials having a hexagonal close packed ("hcp") structure can be grown with a ($11\overline{2}0$) crystal texture (FIG. 3) on a first underlayer having a face centered cubic structure and a (001) crystal texture (FIG. 4) and compatible atomic lattice spacings. As used and further explained herein, a compatible atomic lattice structure represents structures having atomic spacings along the various crystalline directions that are comparable or differ by integer multiples to allow either one to one unit cell alignment or alignment over a repeatable mesh of unit cells.

One skilled in the art will appreciate that the face centered cubic structure shown in FIG. 4 encompasses pure elements having a fcc structure, as well as solid solutions of those pure elements and alloys having derivative structures, such as $L1_0$ and $L1_2$, that have a unit cell analogous to the fcc unit cell. As such, the use of the terms "fcc" and "fcc structure" herein should be understood to include those compositions that have a face centered cubic structure or face centered cubic derivative structure, unless otherwise stated. Other compositions have different unit cell structures that are based on the fcc Bravais lattice, such as diamond (FIG. 5) and NaCl. While these compositions are not fcc structures, the compositions are said to have a Bravais lattice that is fcc and reference to these structures will be made in terms of the fcc Bravais lattice compositions.

In the present invention, Ag or an Ag alloy is generally preferred as the fcc structured underlayer, but other suitable material having a fcc structure include Ag, Cu, Al, Au and solid solution and alloy combinations thereof. One will also appreciate that the precise choice of the fcc structure underlayer material depends upon the desired composition and orientation of the magnetic layer as will become further evident within.

In addition, the first underlayer, which has a face centered cubic crystal structure and a (001) orientation, can be used to induce epitaxial growth of a second underlayer a body centered cubic structure (FIG. 6) and a (001) crystal texture and a compatible atomic spacing, which, in turn, can induce the growth of a material having a hcp structure in a (11$\bar{2}$0) crystal orientation.

One will further appreciate that the body centered cubic structure shown in FIG. 6 encompasses pure elements having a bcc structure, as well as solid solutions of those pure elements and alloys having derivative structures, such as B2, DO3 and L2$_1$, that have a unit cell analogous to the bcc unit cell. As such, the use of the term "bcc structure" and "bcc" herein should be understood to include those compositions that have a body centered cubic structure or a body centered cubic derivative structure.

Suitable underlayer materials having a bcc structure include Cr, and Cr alloys having an A2 structure, such as CrV, CrTi, CrMo, CrW, and CrMn and B2-ordered structure materials, such as NiAl and FeAl. Other phases having a B2-ordered structure and lattice constants that are comparable to that of NiAl (a=0.2887 nm), FeAl (a=0.291 nm) and Cr (a=0.2884 nm) are also considered to be good candidates, for the bcc underlayer of the present invention. The materials are AlCo (a=0.286 nm), FeTi (a=0.298 nm), CoFe (a=0.285 nm), CoTi (a=0.299 nm), CoHf (a=0.316 nm), CoZr (a=0.319 nm), NiTi (a=0.301 nm), CuBe (a=0.270 nm), CuZn (a=0.295 nm), AlMn (a=0.297 nm), AlRe (a=0.288 nm), AgMg (a=0.328 nm), Al$_2$FeMn$_2$ (a=0.296 nm), Fe$_3$Al, AlNi$_2$Ta, AlNi$_2$Nb, AlNi$_2$Ti and combinations thereof. The underlayers may also be comprised of two or more layers of different materials within the foregoing list. Various combinations of material can be used to produce the multiple layers, wherein each layer is one of the aforementioned underlayer materials as discussed above.

In the case of Co-based alloys, the (11$\bar{2}$0) texture has a bicrystal microstructure, in which magnetic easy axes (i.e., c axes, or [0001] directions) of two crystallographically orthogonal variants of Co grains lie along either the [110] or [1$\bar{1}$0] directions of the underlayers. If the volume fractions of the two variants are equal, a four-fold symmetry is expected in the in-plane angular dependence of the magnetic properties and torque curves. Two effective easy axes emerge along the [100] and [010] directions yielding higher values of coercivity (H$_C$), remanence squareness (S), and coercivity squareness (S*), while the [110] and [1$\bar{1}$0] directions become effective hard axes with lower H$_C$, S and S*.

In particular, Applicants have found that a fcc Ag underlayer in a (001) crystal orientation will induce the growth of a hcp Co-based magnetic recording layer directly, or a bcc Cr underlayer having a (001) crystal orientation that will further induce a hcp Co-based magnetic recording layer to grow with a (11$\bar{2}$0) crystal orientation. The crystallographic structures and lattice constants of the layers are: Ag (fcc, a=4.09 Å), Cr (bcc, a=2.88 Å), and Co (hcp, a=2.507 Å, c=4.07 Å; fcc, a=3.544). The unit cell of the Co tends to epitaxially grow with a (11$\bar{2}$0) texture when deposited using the Ag (001) underlayer texture as a template, because the atomic spacings of Ag (001) and Co (11$\bar{2}$0) are compatible and the atoms in each structure are similarly located in the respective crystal planes.

In contrast, the lattice constants for the unit cell of Cr do not match well with the lattice constants for Ag. However, when the Cr is in the (001) orientation the unit cell can be rotated and the diagonal lattice dimension of the Cr (001) face is 4.08, which matches extremely well with the lattice constants of Ag. As such, the (001) Cr tends to epitaxially grow in a rotated (001) orientation when deposited using the Ag (001) oriented structure as a template. Likewise, the unit cell of the Co tends to epitaxially grow in a (11$\bar{2}$0) orientation when deposited using the rotated Cr (001) oriented structure as a template. It should be noted that the Co unit cell will be rotated from the Cr unit cell and aligned with the Ag unit cell.

One skilled in the art will appreciate that the lattice spacings of the Ag, Cr, and Co layers can be varied by forming solid solutions or alloys. For example, Cr is often used in a solid solution with Co to decrease the magnetization of the Co layer and to provide for better separation of the grains in the Co-based layer. Also, Ta and Pt are often alloyed with Co to form Co alloy magnetic layers that have larger atomic lattice spacings than pure Co. Similarly, V can be added to Cr to vary the atomic lattice spacing of the Cr/V solid solution.

Applicants have also found that nearly ideal crystal of fcc (001) oriented Ag layers can be grown on diamond structure (001) oriented Si single crystal wafers. The near ideal crystal (001) oriented fcc structure of the Ag is present despite a mismatch in the atomic lattice spacings and unit cell structures Ag and Si. The misfit between the lattice constants of Ag (fcc, a=4.09 Å) and Si (diamond cubic, a=5.43 Å) is −24.7%. However, a 4×4 mesh of Ag unit cells geometrically aligns with a 3×3 mesh of Si unit cells, with a mismatch of only 0.4%. The use of Si substrates is of interest because the wafers are readily available and inexpensive, which makes the wafer ideal for use as a substrate material for magnetic media applications.

Figure 7:
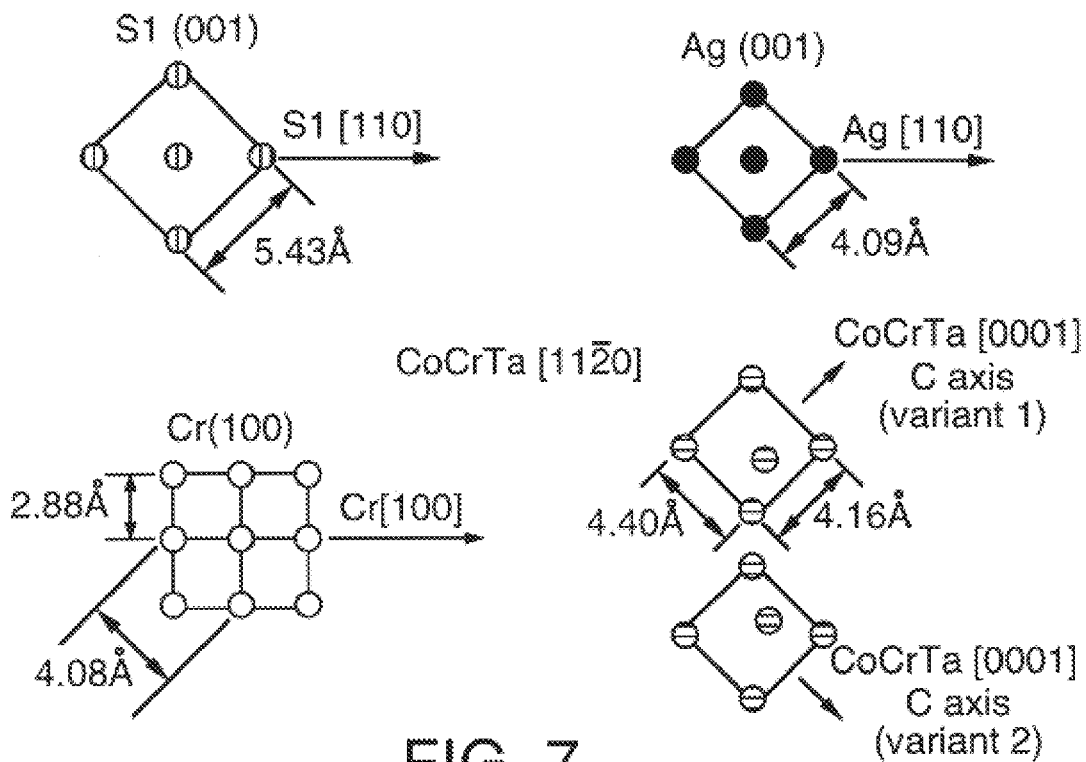
FIG. 7 shows the orientation and interatomic spacing relationships between Si(001), Ag(001), Cr(001) and bicrystal CoCrTa(11$\bar{2}$0) lattices.

Tests were performed in which Ag, Cr, and CO$_{84}$Cr$_{13}$Ta$_3$ (hcp, a=2.54 Å, c=4.16 Å) thin films were deposited sequentially by rf diode sputtering in a Leybold-Heraeus Z-400 sputtering system on a Si(001) single crystal wafer. The lattice mismatch at each of these interfaces can be calculated from the interatomic spacings shown: Cr to Ag=−0.2%, CO$_{84}$Cr$_{13}$Ta$_3$ to Cr=7.8% (perpendicular to the Co c axis) and 2.0% (along the Co c axis). Based on the preceding discussion, the expected orientation is the (11$\bar{2}$0) bicrystal CoCrTa on Cr(001)[100] ∥ Ag(001)[110], as shown in FIG. 7, in which the Si[110] and Si[1$\bar{1}$0] become the directions of the effective hard axes, and Si[100] and Si[010] the effective easy axes.

The Si substrate was etched in hydrofluoric acid prior to deposition of the films to strip away the SiO$_2$ film typically covering the substrate surface and to present a hydrogen-terminated surface without reconstruction as discussed by D. B. Fenner, D. K. Biegelson, and R. D. Bringans, J. Appl. Phys. 66, 419(1989). Specifically, the Si(001) wafers were prepared by first ultrasonically cleaned in organic solvents and rinsed in deionized water. The clean wafers were then immersed in 49% HF for three minutes to remove the native SiO$_2$ and obtain a hydrogen-terminated surface and then were blown dry with N$_2$ gas. Alternatively, the SiO$_2$ film may be removed by annealing, boiling in a vacuum, or by other conventional methods, such as described by P. Xu, P. Miller, and J. Silcox, Mater. Res. Soc. Symp. Proc. 202, 19 (1991), for depositing (001) oriented Ag on a (001) oriented Si layer The HF-etched Si wafer was then placed into the sputtering system, and heated to about 250° C. under vacuum prior to deposition. The base pressure was about 5×10⁻⁷ Torr. The Ar sputtering gas pressure was fixed at 10 mTorr and the sputtering power density was about 2.3 W/cm². No bias was applied during the Ag or Cr deposition, but a substrate bias of −170V was applied during the deposition of CoCrTa films, according to the procedure described by Y. Deng, D. N. Lambeth, X. Sui, L.-L. Lee, and D. E. Laughlin, J. Appl. Phys. 73, 5557(1993).

The microstructure of the films were investigated by a Rigaku x-ray diffractometer with a Cu Kα radiation and a Philips EM420T transmission electron microscope. The x-ray diffractometer scans were all taken on a Rigaku Theta/Theta Diffractometer operating at 35 kV and 20 ma with the Cu K alpha radiation from a target vacuum tube. The scans were taken in 0.05 degree steps, at two seconds per step. A series of slits were used to insure a parallel beam: the divergence and scatter slits used were one degree, and the receiving slit was 0.3 mm. A curved graphite monochrometer was used (radius of curvature: 224 mm) diffracting from the (0002) planes. A NaI scintillation detector operating at 760 Volt bias with the pulse height analyzer settings of 54 Volts for the baseline and 102 Volts for the window. The cross section of the x-ray beam is approximately 32 mm². This procedure will be referred to herein as the thin film XRD method.

The surfaces of the Ag thin films were examined with a Dimension 3000 atomic force microscope (AFM). The magnetic measurements were performed on a Digital Measurement Systems vibrating sample/torque magnetometer.

Figure 8A:
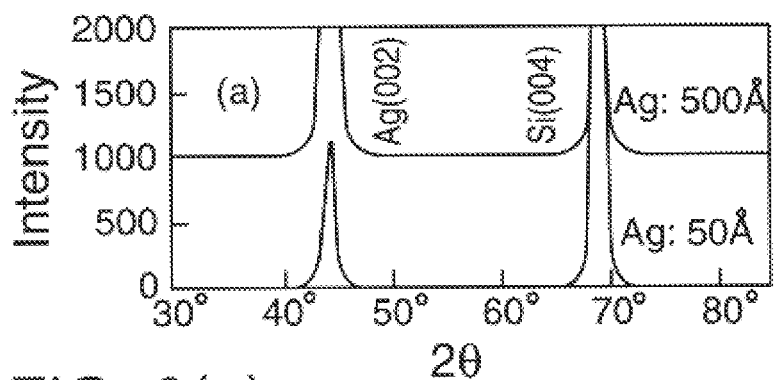
FIGS. 8(a–c) shows(a) XRD spectra of two Ag/HF-Si films, (b) Si[001] zone axis electron diffraction pattern of a Ag(500 Å)/HF-Si film, and (c) simulated Si[001] zone axis electron diffraction pattern of Ag(001)[110] ∥ Si(001)[110] bilayer.
Figure 8B:
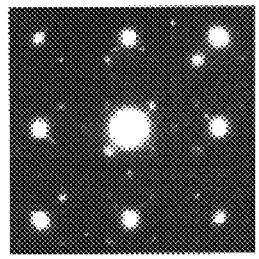
Figure 8C:
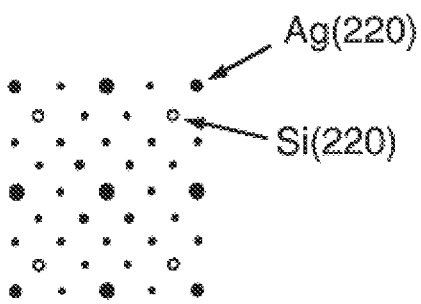

The x-ray diffraction (XRD) spectra for two representative Ag/HF-Si(001) samples are shown in FIG. 8(a). Only strong (002) diffraction peaks are observed for the Ag films. The epitaxy implied in the XRD spectra is confirmed in the Si[001] zone axis electron diffraction pattern (FIG. 8(b)), which agrees well with the simulated pattern shown in FIG. 8(c). The complex yet regular distribution of the low intensity double diffraction spots in FIG. 8(b) is most likely due to the nearly 25% lattice misfit between the Ag and Si lattice constants and is characteristic of the overlapping bilayer structure with a fixed orientation relationship. X-ray diffraction also shows that, throughout the thickness range of 50–1500 Å being studied, Ag films only exhibit strong (002) peaks, leading to the belief that a good epitaxy with the Si(001) is established in very thin films and continues as the films grow thicker.

Figure 9A:
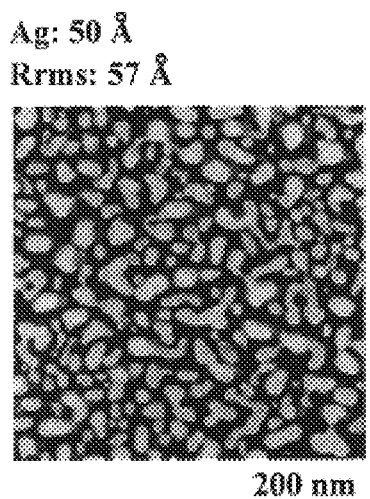
FIGS. 9(a–b) show (a) XRD spectra of two CoCrTa/Cr/Ag/HF-Si films, and (b) coercivity dependence on the Ag template thickness along Si[110] and Si[100] directions of the CoCrTa/Cr films. CoCrTa and Cr thicknesses are fixed at 200 and 300 Å, respectively.
Figure 9B:
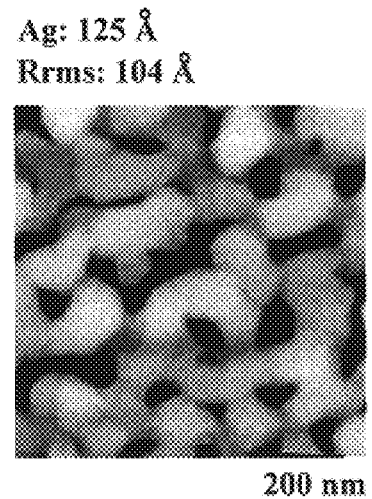
Figure 9C:
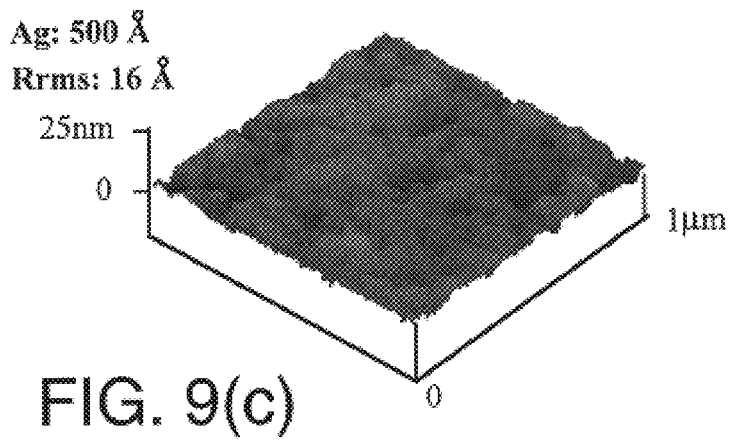

The growth of Ag on Si(001) was proposed by Xu et al. to be in the Stranski-Krastanov, or the layer-plus-island mode, in which after the initial formation of one or several 2D monolayers, the 3D growth of islands begins; or, Ag islands nucleate at specific sites on an imperfect Si surface, then grow in size as additional material is deposited until the islands meet. As shown in FIG. 9(a), a surface topograph of a 50 Å Ag film clearly displays an island structure. The fact that the Ag film is discontinuous at these small thicknesses is most probably due to an incomplete removal of the $SiO_2$. A more complete removal of the oxide would result in a continuous Ag film at thicknesses less than 50 Å. As the film thickness increases, neighboring islands begin to coalesce to form a web-like network at 125 Å, as shown in FIG. 9(b). As the Ag film thickness is increased to 250 Å a more continuous-like film forms. Further increasing the thickness results in almost continuous Ag surfaces which maintain a similar morphology to that of a 500 Å film (FIG. 9(c)), except for a steady expansion in the surface feature size.

Figure 9D:
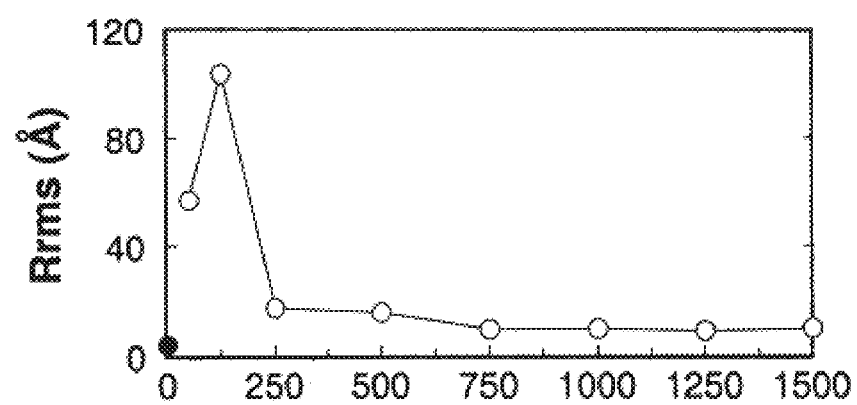

The evolution of the Ag surface morphology is also reflected in FIG. 9(d), which shows the surface root-mean-square roughness ($R_{rms}$) vs. the film thickness, compared to a bare HF-etched Si surface $R_{rms}$ of about 4 Å. For the 50 Å Ag film, a $R_{rms}$ of 57 Å is found to be higher than the nominal film thickness. The surface roughness increases up to 104 Å and becomes smaller as the film thickness on the 125 Å Ag film. When the film thickness is increased to 250 Å, the roughness decreases dramatically ($R_{rms}$=17 Å), coinciding with the formation of the continuous Ag layer, and then stays nearly constant as the Ag film thickness is further increased.

Figure 10A:
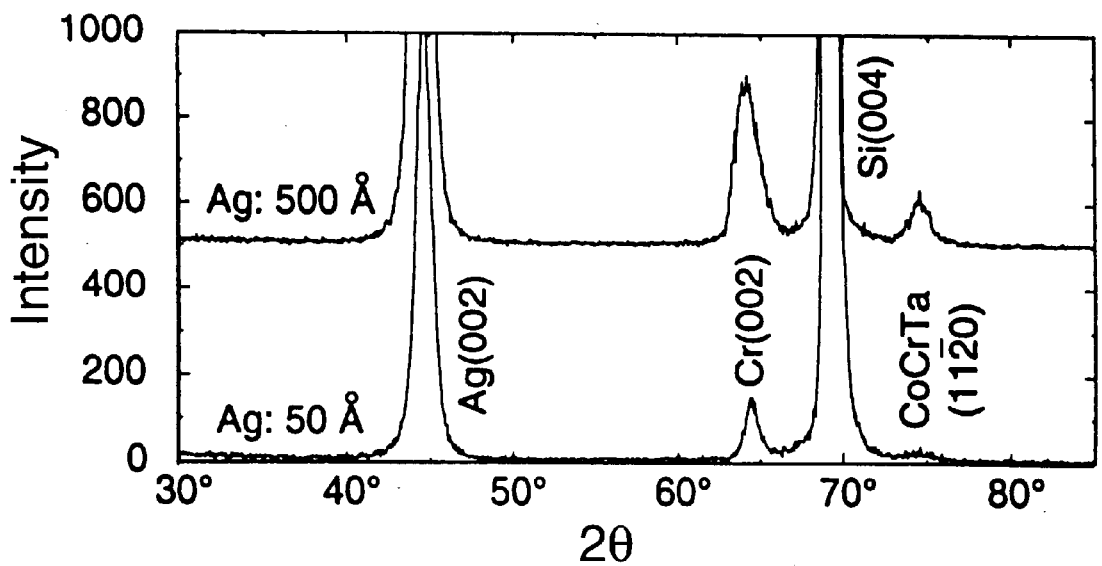
FIGS. 10(a–d) shows AFM images of the surfaces of the Ag/HF-Si films with the Ag thickness at (a)50 Å, (b)125 Å, (c)500 Å, and (d) a plot of Ag surface roughness vs. Ag film thickness, in which the solid circle at the thickness of 0 Å refers to the bare HF-Si.
Figure 10B:
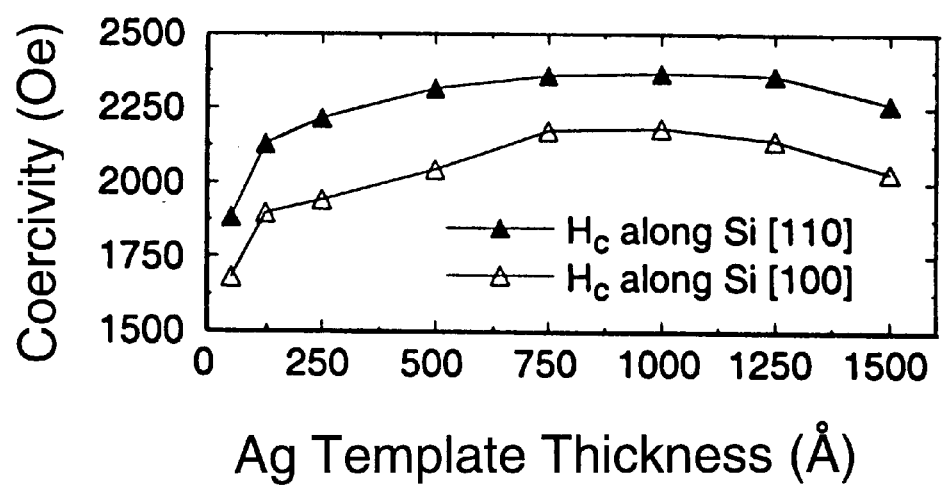
Figure 12A:
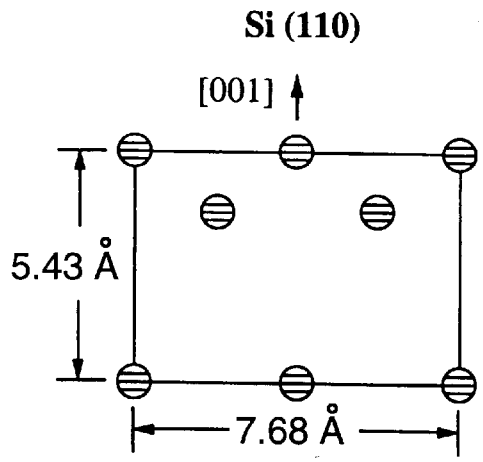
FIG. 12 shows the crystallographic planes for Si(110), Ag(110), Cr(112), and Co(10$\bar{1}$0)
Figure 12B:
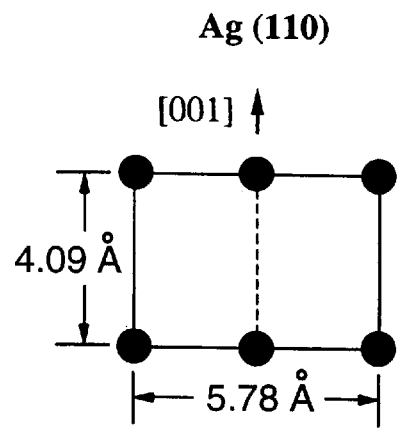
Figure 12C:
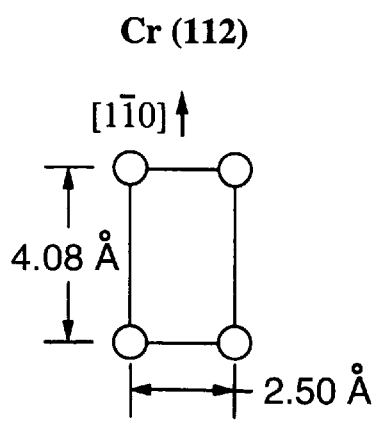
Figure 12D:
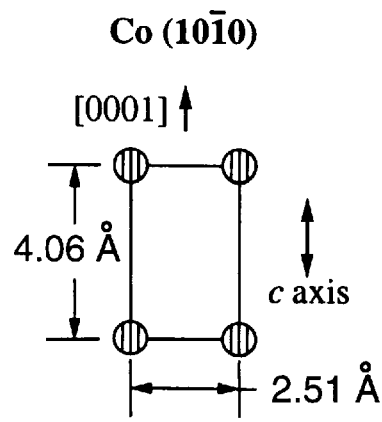

CoCrTa/Cr thin films of the same thicknesses grown on Ag templates of different thicknesses show much larger Cr(002) and CoCrTa(11$\bar{2}$0) diffraction peaks than would normally be observed in the absence of the Ag underlayer template. Although good Ag/Si(001) epitaxy is achieved for all Ag film thicknesses, FIG. 10(a–b), the CoCrTa films deposited on Ag underlayers having a sufficient thickness to provide a continuous Ag template exhibited higher coercivities.

In addition, the surface roughness of a 125 Å thick Ag template is larger than that of a 50 Å Ag film (the ratio of the $R_{rms}$ to the film thickness, however, is smaller), but the connected web-like surface structure seems to enhance the epitaxial growth and the coercivity of a CoCrTa(200 Å)/Cr (300 Å) film when compared to the island structure. The decrease in coercivity on very thick Ag templates is also accompanied by significantly expanded Ag surface features. The growth of the Cr films on the Ag templates with different surface morphologies at different thicknesses appears to play a role in the magnetic properties of CoCrTa films. Clearly, by varying the process conditions, such as substrate cleanliness and roughness, deposition rate, and substrate bias and temperature, of the Ag film, the web-like structure can be made more or less continuous resulting in a corresponding variation in the Co/Cr textures for differing film thicknesses.

FIG. 11(a) shows the Cr[001] zone axis electron diffraction pattern of a CoCrTa/Cr film, which agrees well with the simulated pattern in FIG. 11(b). The periodic variation of the magnetic properties shown in FIG. 11(c) is further evidence of the bicrystal nature of CoCrTa films. Also, a parallel relationship appears to exist between the Cr[100] and Si[110] directions. Furthermore, the periodicity of 90° in the in-plane torque curve (FIG. 11(d)) not only indicates a bicrystal structure, but also that the volume fractions of two CoCrTa orientation variants are almost equal. The thickness of the Ag template required to maximize coercivity and minimize the surface roughness using the current process is approximately 500–1000 Å.

Investigations were continued in an attempt to produce structures in which Co-based materials would be produced in the hcp structure and in the quad-crystal orientation, Co(10$\bar{1}$1)[$\bar{1}$2$\bar{1}$0] ∥ Cr(110)[1$\bar{1}$0] or [$\bar{1}$10]. Thus, a single crystal (110) oriented Si was prepared by the method previously discussed. Again, because of the long range compatability of the crystal lattice spacings in the (110) orientation, the Ag also epitaxially grows when deposited using the Si (110) orientation as a template. Cr and Co layers were sequentially deposited on the Ag (110) oriented layer.

The resulting Cr and Co layers are not respectively (110) and (10$\bar{1}$1), as expected. The Cr epitaxially grows in a (112) orientation when deposited using the (110) orientation of the Ag layer as a template. The Co layer then epitaxially grows when deposited using the Cr (112) orientation as a template to produce a Co layer having the uni-crystal (10$\bar{1}$0) orientation.

An examination of the crystal orientations of the fcc (110) Ag layer and the bcc (110) layer reveals as before that the diagonal lattice face spacing of Cr is nearly identical to that of Ag (4.08 Å to 4.09 Å) and the diagonal lattice face spacing of Ag is twice the atomic spacing of Cr (5.76 Å to 2.88 Å). In view of the mesh fit observed with respect to Si and Ag, it would therefore be expected that the bcc (110) layer would epitaxially grow from the fcc (110) layer template in a 2 to 1 mesh.

In addition, in a bcc structure the orientation having the lowest energy state is the (110) because of its closely packed atomic configuration. However, in the bcc (110) orientation there is a center atom (FIG. 6), whereas in the corresponding (110) fcc orientation there is no center atom (see FIG. 4). The lack of a center atom in the (110) fcc is believed to increase the energy state of the (110) bcc, thereby making it far less favorable when deposited on (110) Ag.

The atomic structure of a bcc lattice is such that an atomic arrangement similar to the fcc (110) orientation is possible in the (112) plane, as shown in FIG. 6. One dimension in the (112) plane is the diagonal lattice face spacing and the other dimension is the closest packed distance between a corner atom and the center atom in the bcc structure, which is twice the atomic radii.

In (112) oriented Cr, the diagonal face and closest packed dimensions are 4.08 Å and 2.50 Å, respectively. Thus, the Cr (112) orientation can also be lattice matched along the Ag[110]∥ Cr[111] direction with the Ag layer in a 7 to 3 mesh within approximately 1%. The spacings of the atoms in the Cr (112) texture with the Ag (110) texture is not nearly as well matched as the Cr (110) unit cell dimensions. However, it is believed that the absence of the center atom in the (112) orientation decrease its lattice energy state at the interface with the (110) fcc template such that it is less than the (110) orientation. Therefore, the bcc will epitaxially grow in the (112) orientation.

As such, it is believed that a bcc (112) or a fcc (110) can be used to induce the (10$\bar{1}$0) texture in a Co-based film, if the atomic spacings are compatible. For example, (10$\bar{1}$0) Co-based material should grow directly on the (110) fcc Ag in view of the similarity of the atomic spacings for (112) Cr and (10$\bar{1}$0) Co. Furthermore, it follows that, since bcc (110) texture is favorable in polycrystalline films, large lattice constant bcc (110) films can be used to induce a (110) texture in fcc films provided atomic spacing compatibility is designed and provided the bcc (110) atomic spacings are such that a there is no center atom to induce the fcc (111) texture. Hence, smaller lattice constant bcc (112) would then grow upon the fcc (110) texture. The resulting film layers and textures would be:

Co (10$\bar{1}$0)/bcc(112)/fcc(110)/bcc(110)/wetting layer.

Another aspect of the present invention is that a new recording media design can be developed using the material structures of the present invention. A controlled orientation recording media and transducer can be produced using a single crystal substrate, such as Si. The single crystal substrate can be used to epitaxially grow nearly ideal underlayers that culminate in a magnetic layer having an orientation of choice.

In one embodiment, a linearly addressed single crystal recording medium can be produced by employing the techniques described herein to produce a nearly ideal (112) bcc layer that will induce epitaxial growth of the (10$\bar{1}$0) uni-crystal. The single crystal substrate propagates the single crystal structure through the underlayer structure to the magnetic layer structure. This combined with uni-directional orientation of the magnetic layer structure results in a recording medium or transducer in which the magnetic axis of each crystallite are parallel. The parallel alignment of the magnetic easy axes provides a linearly addressable recording medium that has little or no signal modulation. In addition, the oriented and aligned structure of the linear addressable recording medium provide the potential for lower media noise and increased coercivities that can theoretically reach $H_k$.

A number of tests were performed using Co/Cr/Ag/Si layers to assess the characteristics of (10$\bar{1}$0) hcp crystal grown from (112) bcc on a (110) fcc structures. The epitaxial orientation relationship of Co(10$\bar{1}$0)[0001]∥ Cr(112)[10$\bar{1}$0] ∥ Ag(110)[001] ∥ Si(110)[001] is shown in FIG. 12. As previously discussed, 4-to-3 lattice match is achieved at the Ag/Si interface having only a small misfit of 0.4% when Ag and Si have a common crystal orientation. The lattice mismatch at the Cr/Ag and Co/Cr interfaces can be calculated from the interatomic spacings: Cr to Ag=−0.2% (along the Ag[001] direction) and 13.5% (perpendicular to the Ag[001] direction) on a one to one basis, pure Co to Cr=−0.5% (along the Co c-axis) and 0.4% (perpendicular to the Co c-axis). As previously noted, the mismatch of Cr to Ag perpendicular to the Ag[001] direction is approximately 1%, when the Cr is meshed with the Ag on a 7 to 3 ratio, or repeat unit.

The (110) oriented Si single crystal substrate was prepared and the Ag, Cr, and Co (pure and alloy) thin films were then deposited sequentially by RF diode sputtering in a Leybold-Heraeus Z-400 sputtering system as previously discussed.

The epitaxial orientation relationship of the layers was investigated using θ/θ and φ-scan XRD with the Rigaku x-ray diffractometer with a Cu Kα radiation. The magnetic properties and torque curves of the Co films were measured using the Digital Measurement Systems vibrating sample/torque magnetometer. From the torque curves of a uni-crystal Co film, the uniaxial anisotropy constants of the material can be determined.

When the uni-crystal sample is rotated in a sufficiently large field H, the torque (T) exerted on the sample is given by $$T = -\frac{\partial E}{\partial \theta} = -\frac{\partial}{\partial \theta}[K_1 \sin^2(\theta - \varphi) + K_2 \sin^4(\theta - \varphi)] \quad (1)$$
$$= -(K_1 + K_2)\sin 2(\theta - \varphi) - \frac{K_2}{2}\sin 4(\theta - \varphi).$$

At the same time, it can also be computed as $$T = -M_s H \sin \varphi, \quad (2)$$

Figure 13:
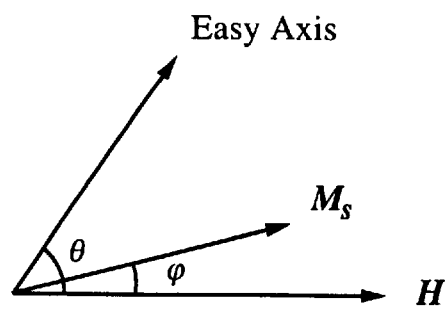
FIG. 13 shows the relative locations and angles between H, $M_s$, and the magnetic easy axis.
Figure 14A:
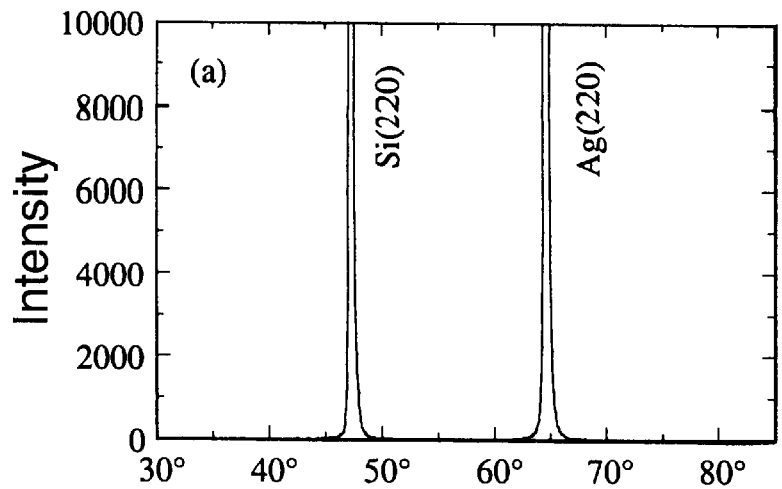
FIGS. 14(a–c) show XRD spectra for (a) Ag/Si, (b) Cr/Ag/Si, and (c) Co/Cr/Ag/Si films.
Figure 14B:
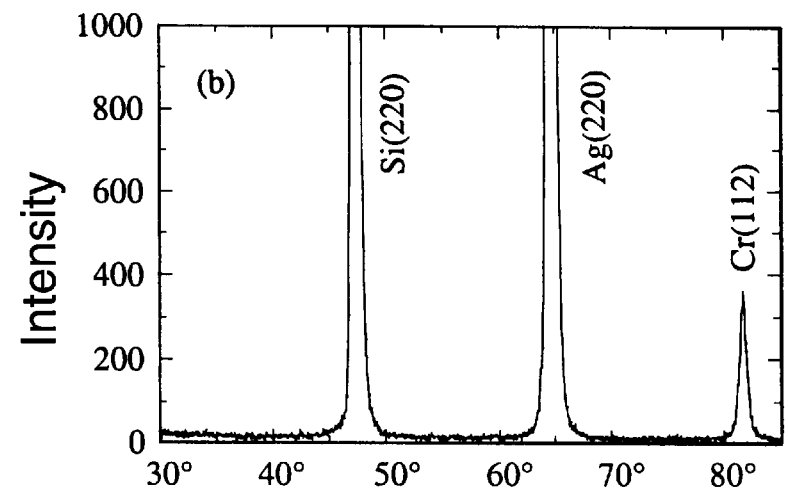
Figure 14C:
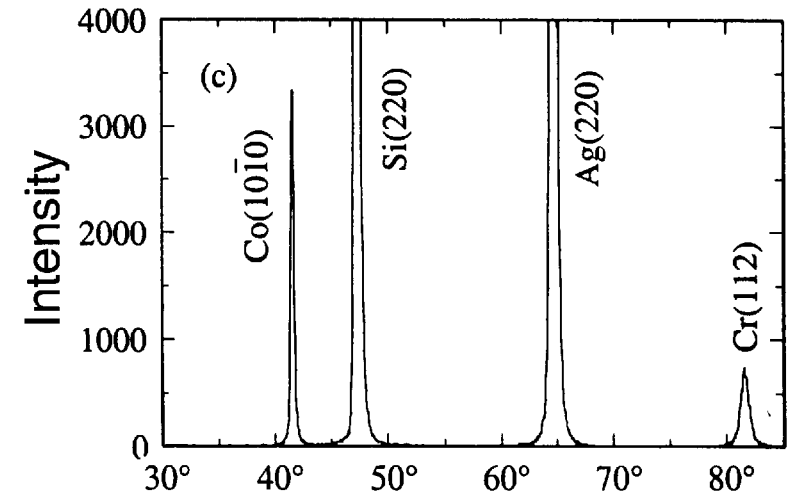

The relative relationship of the vector and angular quantities used in equation (1) are shown in FIG. 13. The θ/θ XRD spectra for representative Ag, Cr/Ag, and Co/Cr/Ag films grown on HF-Si(110) are shown in FIG. 14(*a*–*c*), respectively. Only strong Ag(220), Cr(112) and Co(10$\bar{1}$0) diffraction peaks are observed in these spectra, which strongly implies the epitaxial nature of these films. The φ-scan spectra of the Co/Cr/Ag/HF-Si sample are shown in FIG. 15, along with cubic crystal (110), (112), and Co (10$\bar{1}$0) stereographic projections that are necessary for the interpretation of the spectra. As expected from the cubic crystal (110) stereographic projection, FIG. 15(a'), two diffraction peaks that are 180° apart are found in the Si{004}-pole scan spectrum for the single crystal Si(110) substrate (FIG.

15(*a*)). The two peaks corresponding to the Ag{004} poles are also 180° apart (FIG. 15(*b*)), which is in good agreement with the stereographic projection, FIG. 15(*b*'), and they appear at the same φ positions as the two peaks in Si{004}-pole spectrum, confirming the parallel relationship between the Si[001] and Ag[001] directions. The Cr{110}-pole spectrum (FIG. 15(*c*)) contains two peaks that are again 180° apart in agreement with the projection in FIG. 15(*c*'). The peak locations are shifted by 90° when compared to the two peaks in Ag{110}-pole scan, indicating that the Cr[1$\bar{1}$0] direction is parallel to the Ag[001] direction.

Figure 16A:
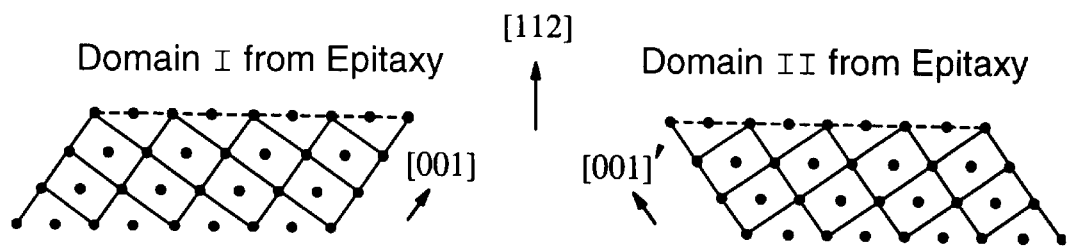
FIG. 16 shows the two twinning domains of the (112) orientation.
Figure 16B:
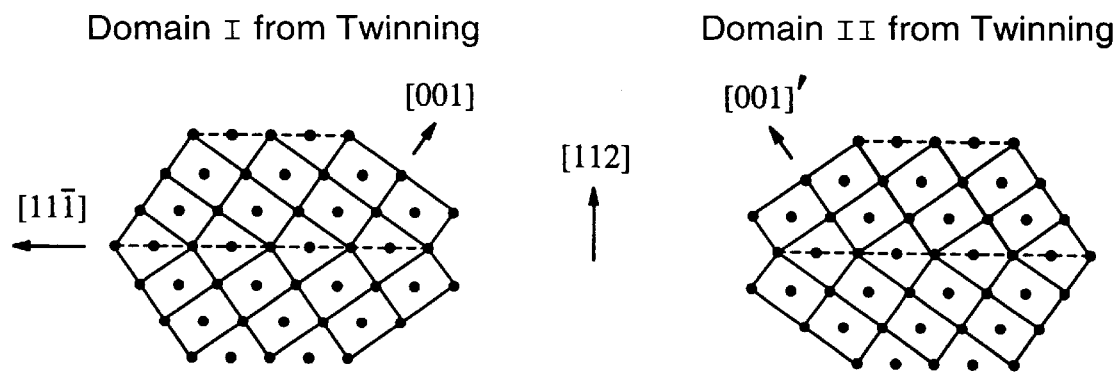

The (112) stereographic projection of the crystal in FIG. 15(*c*') only shows one (001) pole. Two diffraction peaks, however, are observed in the Cr{002}-pole scan, indicating an extra pole as denoted by (001)' in FIG. 15(*c*'). This suggests that there exist two domains of Cr grains in the Cr(112) film, as illustrated in FIG. 16 (the crystallographic planes and directions are all indexed with respect to domain I). The two domains may emerge from the Cr/Ag epitaxial interface when Cr starts to grow with two different atomic configurations that are mirror images of each other. The two domains may also be a result of the Cr growth twinning. In bcc metals, the (112) plane is the most common twinning plane, and the twinning direction is [11$\bar{1}$], as shown in FIG. 16. The resulting two domains of Cr grains have (112) planes parallel with the substrate plane, yet the atomic configurations are mirror images about the plane perpendicular to the twinning direction.

Also, good agreement exists between the Co{10$\bar{1}$0} pole scan (FIG. 15(*d*)) and the Co crystal (10$\bar{1}$0) projection (FIG. 15(*d*')). An orientation relationship of Co[0001]∥ Cr[1$\bar{1}$0] is also determined from the observation that two peaks in the Co spectrum appear at the same positions as those in the Cr spectrum. The small peak width indicates the Co grain easy axes generally have a single orientation.

Figure 17:
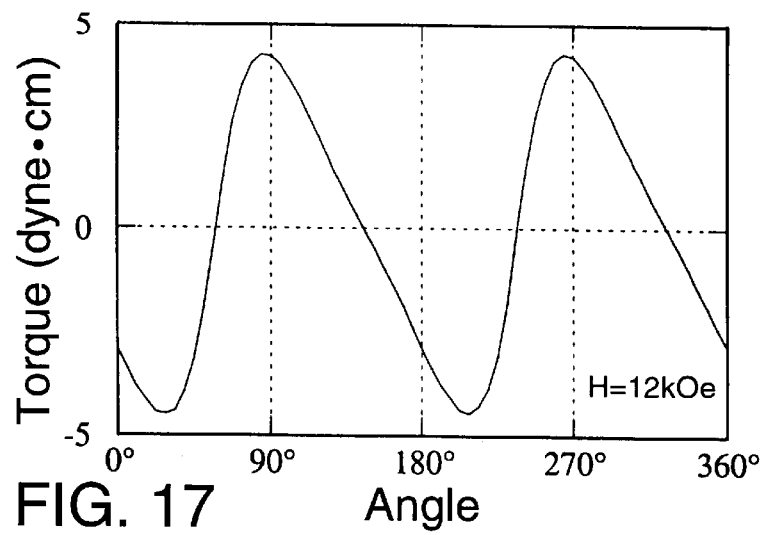
FIG. 17 shows a torque curve for the Co(10$\bar{1}$0) magnetic layer.

The torque curve of the pure Co sample is shown in FIG. 17. It resembles a skewed sinusoidal curve with a period of 180°. The anisotropy constants determined from the curve are smaller than the values reported for bulk Co single crystals (4.2–4.5×10$^6$ ergs/cm$^3$). The amplitude of the torque measurement indicates good alignment of the Co grain easy axes. However, $K_1$ was found to increase in pure Co films prepared at increasing substrate bias, as shown in Table I, which may indicate the presence of fcc stacking faults in an otherwise hcp Co crystalline structure.

Figure 18A:
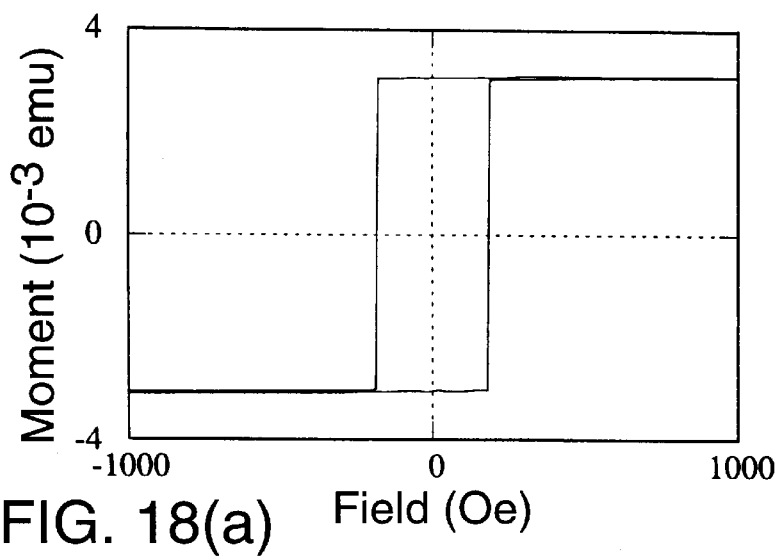
FIGS. 18(a–b) show hysteresis curves for the magnetic easy and hard axes, respectively, of the Co(10$\bar{1}$0) magnetic layer.
Figure 18B:
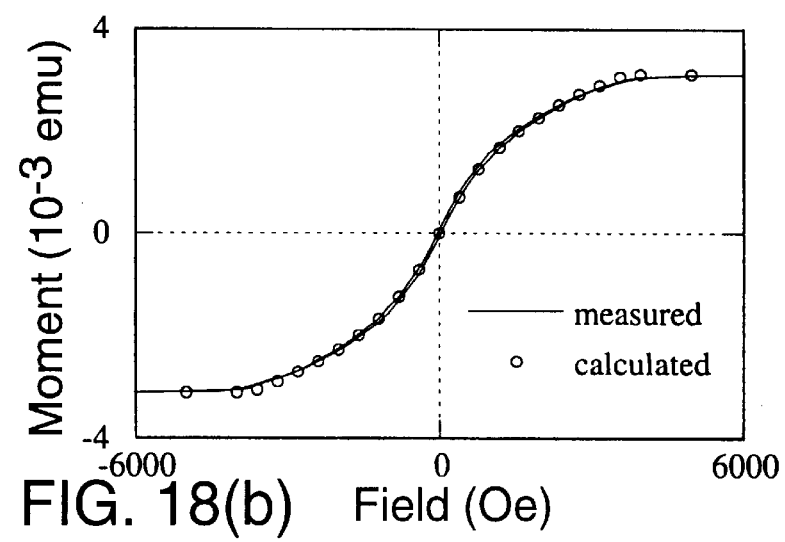

Hysteresis loops for the samples were measured with the applied field along either the easy axis direction or the hard axis direction (see FIG. 18). For the pure Co films, a square shape loop is observed along the easy axis with a coercivity around 200 Oe, indicating a coercivity mechanism associated with wall motion. The hard axis loop shows a curve with virtually zero openness, with a remanence squareness S=0.02. This confirms the good easy axis alignment shown in the φ-scan. The hard axis loop falls almost perfectly on the open circles indicating excellent agreement with the calculated points using the anisotropy constants determined from the torque measurements.

Figure 19:
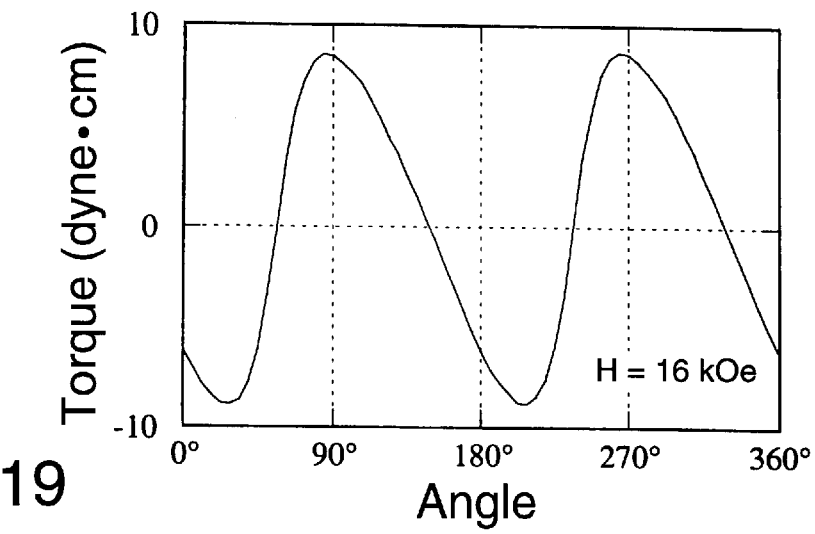
FIG. 19 shows a torque curve for the CoCrTa magnetic layer.
Figure 20A:
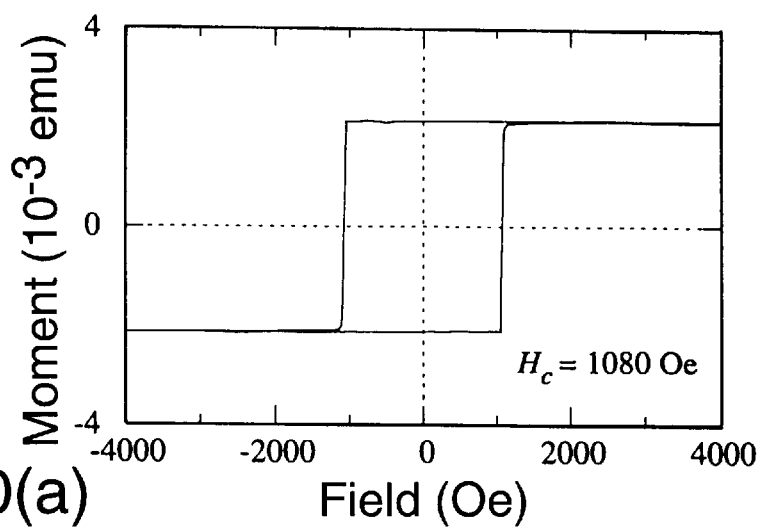
FIGS. 20(a–b) show hysteresis curves for soft and hard magnetic axes, respectively, of the CoCrTa magnetic layer.
Figure 20B:
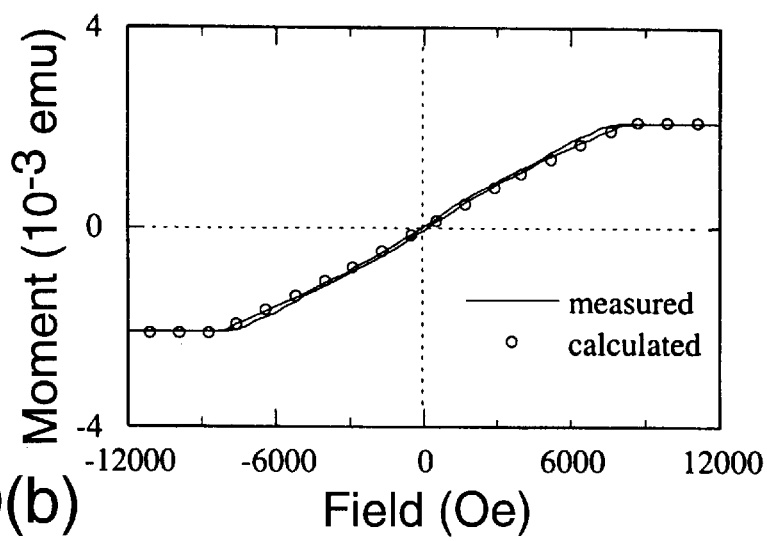

A uni-crystal Co$_{84}$Cr$_{13}$Ta$_3$/Cr/Ag/HF-Si(110) film was also prepared. A substrate bias of −170 V was applied during the deposition of the CoCrTa film. The anisotropy constants determined from the torque curve (see FIG. 19) are also listed in Table I. Hysteresis loops for this sample are shown in FIG. 20. For the very square easy axis hysteresis loop a coercivity of 1080 Oe is obtained while the linear behavior of the hard axis loop implies a reduced $K_2$, in agreement with the torque analysis.

TABLE I

Uniaxial Anisotropy Constants measured from torque curves

|  | Substrate Bias (V) | $K_1$ (10$^6$ erg/cm$^3$) | $K_2$ (10$^6$ erg/cm$^3$) |
| --- | --- | --- | --- |
| Co | 0 | 1.15 | 0.74 |
| Co | −100 | 1.42 | 0.89 |
| Co | −200 | 1.57 | 0.83 |
| Co | −300 | 2.22 | 0.78 |
| Co$_{84}$Cr$_{13}$Ta$_3$ | −170 | 2.11 | 0.10 |

The growth of the uni-crystal Co, Cr (112) and Ag (110) layers is similar to the growth described with respect to the Ag (001), Cr (001), and Co (11$\bar{2}$0) layers described above. Therefore, a continuous Ag template is desired to maximize coercivity and minimize the surface roughness Additional investigations were conducted into the use of (111) oriented Si as a substrate. The use of Ag as a fcc template was further tested and it was also found that (111) oriented Ag could be epitaxially grown on (111) oriented Si.

The (111) fcc provides a face with a triangular atomic structure upon which a subsequent layer can be epitaxially grown. As shown in FIG. 5, the (111) orientation of the bcc layer also provide a triangular atomic structure. However, the bcc layer does not develop a (111) orientation when deposited upon the (111) fcc layer, but instead develops a (110) crystalline texture. The (110) bcc face has a rectangular shaped atomic structure with a center atom. As previously discussed, the (110) orientation represents the lowest energy state for the bcc layer. Therefore, depending upon the relative atomic lattice spacings of the fcc and bcc layers, it is more energetically favorable for a bcc layer to assume a (110) orientation, instead of a (111) orientation. Because the triangular shape of the (111) fcc texture has 3 fold symmetry the <110> directions of the bcc are symmetrically aligned.

The deposition of Co upon the (110) oriented Cr results in a Co layer having a (10$\bar{1}$1), quad-crystal orientation. The development of the hcp quad-crystal orientation of the grains on a nearly ideal crystal provides for a magnetic layer that has the magnetic easy axes pointing in four directions with respect to the Ag epitaxially grown on the single crystal Si. As a result, this structure has 12 possible easy axis directions. In addition, while the demagnetizing fields of the thin film layer tend to somewhat compromise the coercivity the fields also tend to bring the magnetic easy axes into the plane of the film. In this configuration, the magnetic orientation of the medium, while discrete in the twelve possible directions has limited circumferential variation. As such, it is possible to produce longitudinally oriented Co-based magnetic recording media that can be used in rotating storage device applications, such as hard and floppy disk, that should increase the achievable coercivities over the limited coercivities of the somewhat two dimensionally randomly oriented Co-based media currently in use.

Perpendicular recording is a promising candidate for future high density magnetic data storage, and Co-based alloy thin films are, by far, the most widely studied perpendicular media for future hard disks. The perpendicular c axis orientation of Co grains and high coercivity are two of the key factors to achieving a uni-crystal and low noise recording performance at high densities. Because most perpendicular recording transducers have very limited, non-sharp, head field gradients the recorded transition tends to be non-sharp. However, if the perpendicular media is extremely highly oriented with virtually no dispersion in the c axes of the Co crystallites, then this can compensate for the less than ideal record head field gradients. Therefore, it is desirable to produce a highly oriented (0002) perpendicular Co layer for use in perpendicular recording media.

Figure 21A:
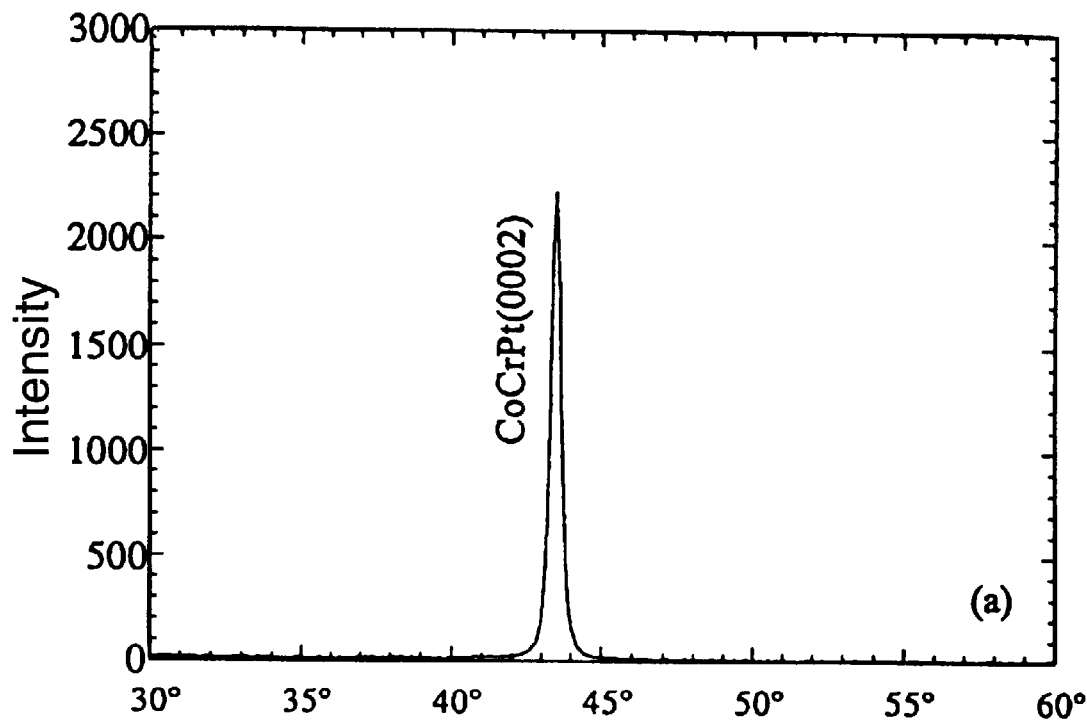
FIGS. 21(a–b) show XRD spectra for (a) CoCrPt/Ti/glass, and (b) CoCrPt/Ti/oxidized Si.
Figure 21B:
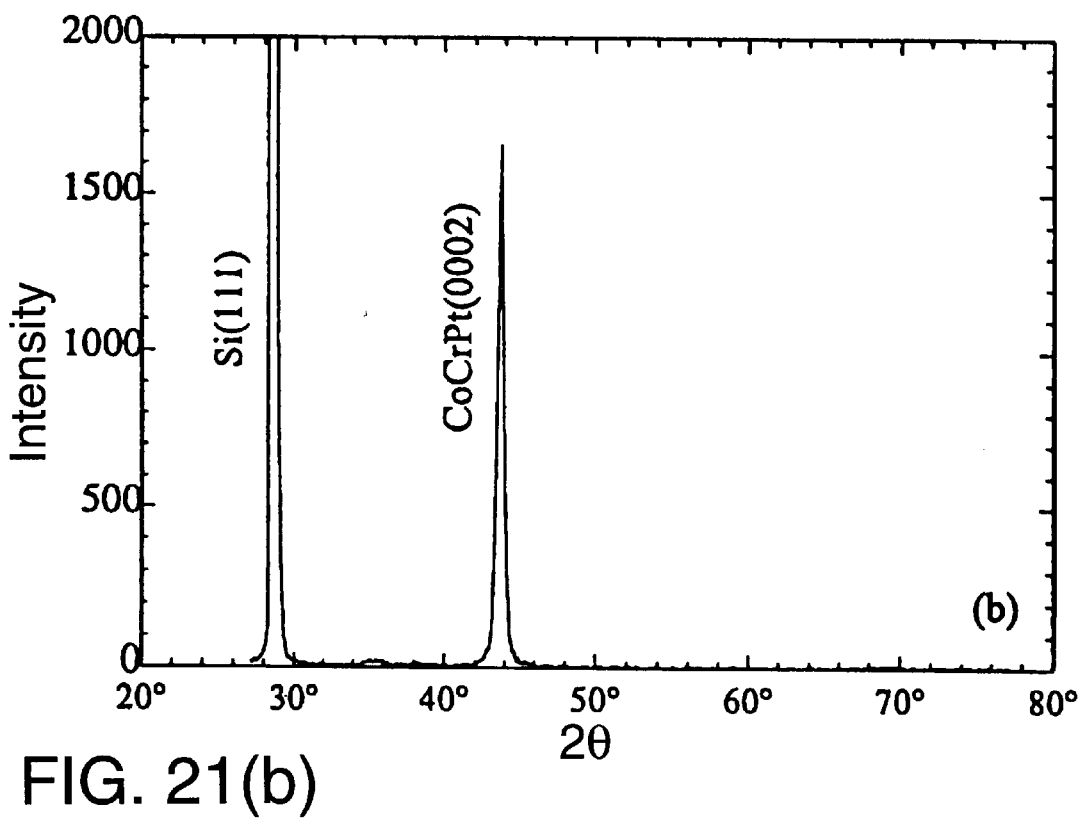
Figure 22A:
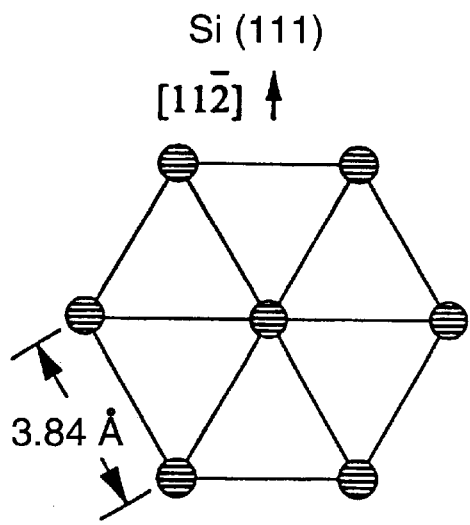
FIG. 22 shows the crystallographic planes for Si(111), Ag(111), Ti(0001), and Co(0001)
Figure 22B:
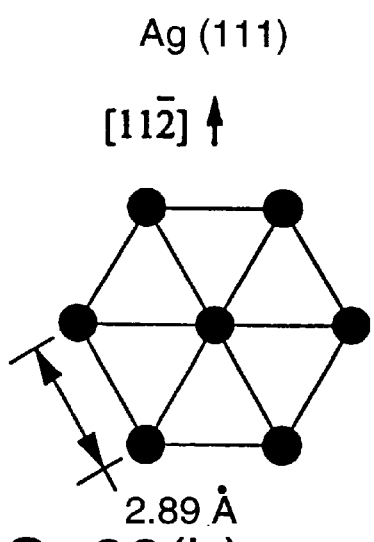
Figure 22C:
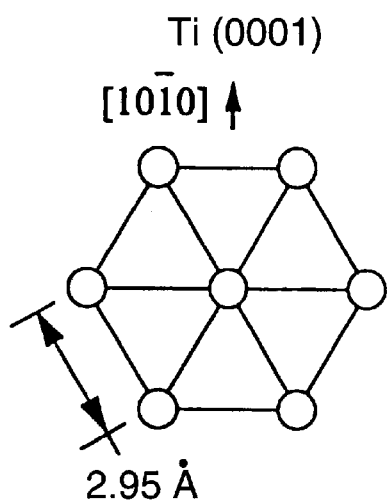
Figure 22D:
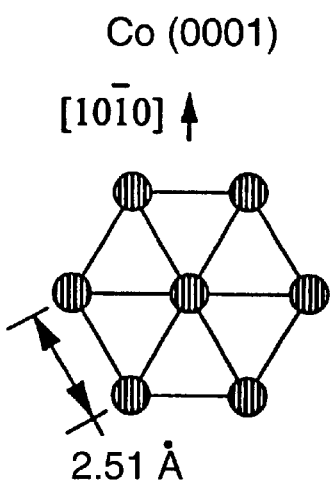

The (0002) orientation provides a close packed atomic surface and is the lowest energy state for the hcp structure. Therefore, Co-based materials tend to naturally grow with a weak (0002) texture if there is no epitaxial interface to induce a different orientation (texture) upon the material. Previous studies have also attempted to use Ti to induce higher quality (0002) texture in the Co layer. However, as shown in the x-ray diffraction patterns for CoCrPt/Ti/glass and CoCrPt/Ti/oxidized-Si, respectively, (FIGS. 21(a) and 21(b)), the Ti layer is generally not well oriented. Thus, it can be inferred that Ti is not acting as a seed layer, but essentially as a wetting layer that eliminates the influence of the orientation of the substrate or previously deposited layer under the Co-based layer.

Also, the deposition of Co-based materials directly upon a fcc structure will generally result in a Co-based material developing a fcc structure and the orientation of the prior fcc layer. In a (111) orientation, fcc structures are in the lowest energy state, therefore, the Co-based layers are likely to develop a strong fcc (111) crystallographic texture, which due to the cubic structure results in a low coercivity magnetic film.

Applicants have found that very well oriented (0002) Co-based layers can be epitaxially grown using (111) fcc as a template through the use of an intermediate hcp template. Specifically, if Ti is deposited on (111) Ag, the Ti will assume a (0002) orientation which has a similar atomic face lattice to the fcc (111) orientation, as shown in FIG. 22. The (0002) orientation of Ti significantly improves the Co-based layer to grow epitaxially in a (0002) orientation to produce a recording media having a nearly ideal perpendicularly oriented recording layer. A comparison of the lattice constants of Ti (a=2.9512, c=4.6845) and Co (a=2.507, c=4.070) reveal a mismatch between the lattices; however, the long range orientation of the Ag and resulting Ti layers provides for the alignment of a 6×6 mesh of Co unit cells with a 5×5 mesh of Ti unit cells.

One skilled in the art will note that the particular compositions used in the fcc and hcp template layers will necessarily depend upon the lattice spacing of the desired magnetic layer. For example, the hcp template layer must have a lattice spacing that is compatible with the fcc layer and should not have a stable fcc phase in the range of deposition temperatures and processing conditions. For example, when different Co alloys are used in the magnetic layer, different composition can be used as the hcp template underlayer to vary the lattice size of the hcp template.

The nearly ideal (111) fcc template can also be used to induce the epitaxial growth of other fcc structures analogous to the growth of the fcc Co layer. Specifically, soft magnetic materials, such as Ni and NiFe permalloys, can be epitaxially grown on the fcc template. In these fcc structures, the magnetic easy axes lie near the (111) plane; therefore, the soft magnetic layer will provide a close to in-plane return path for the magnetic field generated perpendicular to the layer during perpendicular recording. The soft magnetic materials can propagate the (111) orientation for the (0002) hcp template and (0002) hcp Co-based layers.

In addition, a (0002) Co-based layer provides a template that will further induce soft magnetic materials to grow epitaxially in a (111) orientation to form a thin top keeper layer for the perpendicular media. It is noted that the keeper layer will also have the magnetically easy axes predominately in the plane of the layers.

A number of tests were performed to assess the characteristics of the (0002) Co-based magnetic layers. The Si was prepared and Ag, Ti, and $CO_{68}Cr_{20}Pt_{12}$ thin films deposited in the manner previously discussed. As before, the epitaxial orientation relationships were studied with both the θ/θ and φ-scan method on a Rigaku x-ray diffractometer using Cu Kα radiation. The magnetic properties of the CoCrPt films were measured using a Digital Measurement Systems vibrating sample magnetometer. The Cr and Pt content in the Co-alloy effectively decreases the saturation magnetization so that it is more appropriate for perpendicular recording. (i.e. $Ku>2\pi Ms^2$)

Figure 23A:
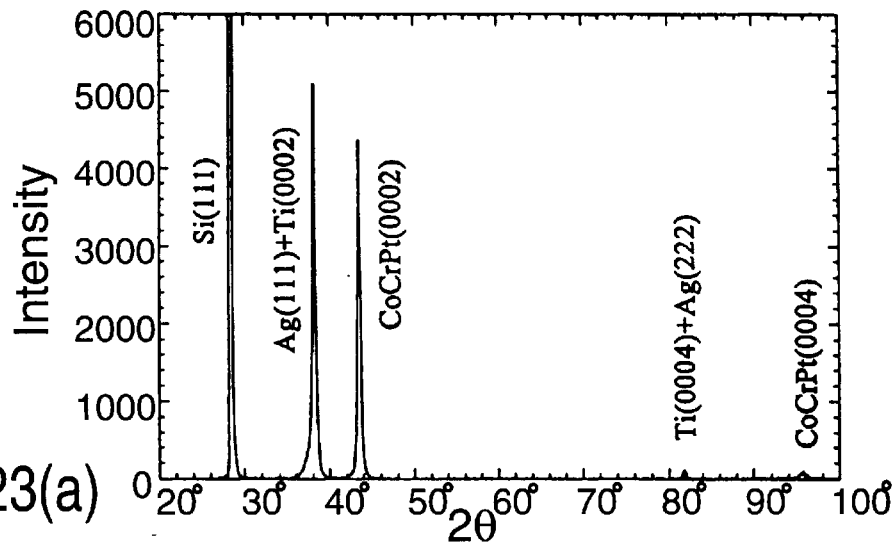
FIGS. 23(a–c) show XRD spectra for (a) CoCrPt(50 nm)/Ti(50 nm)/Ag(12 nm)/HF-S1, (b) CoCrPt(50 nm)/Ti(50 nm)//HF-Si, and CoCrPt(50 nm)/Ag(12 nm)/HF-Si.
Figure 23B:
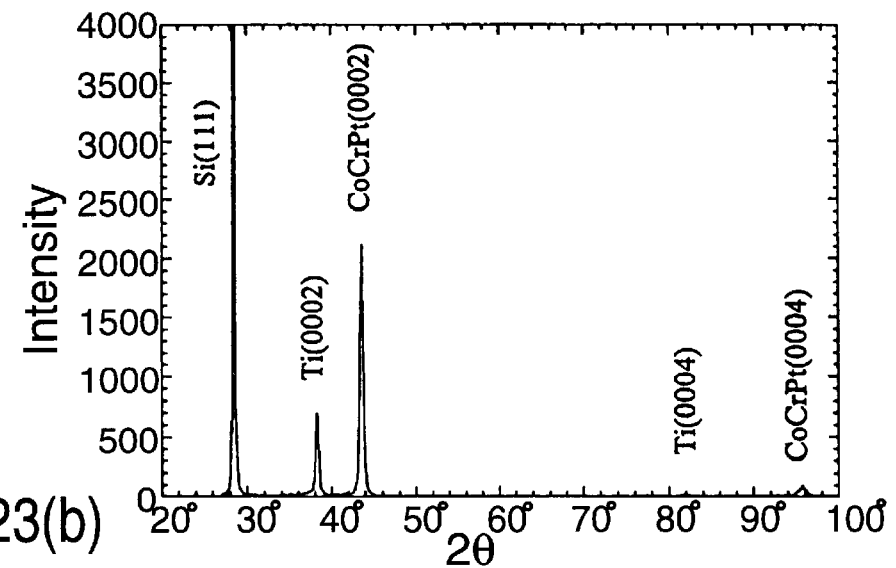
Figure 23C:
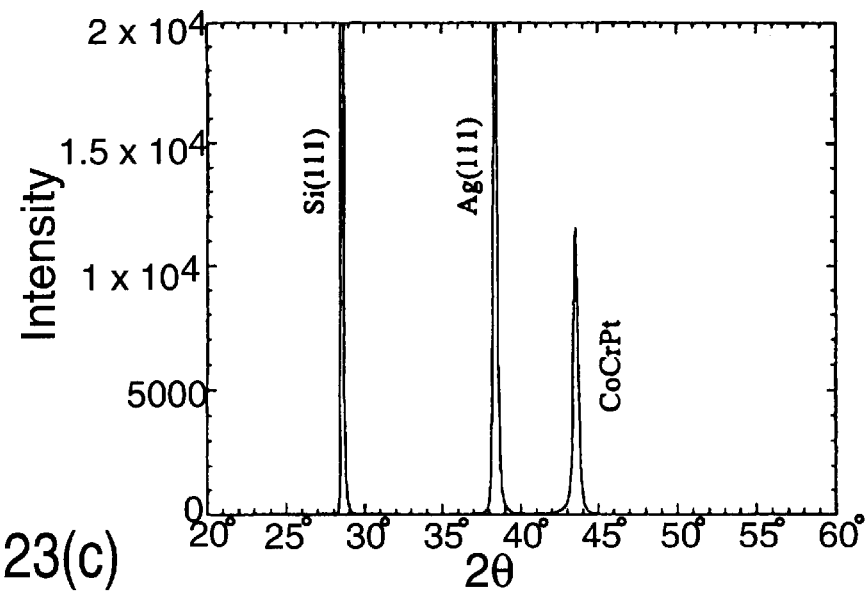

The x-ray diffraction spectra for a representative CoCrPt (50 nm)/Ti(50 nm)/Ag(12 nm) film grown on HF-Si(111) are shown in FIG. 23(a). Only those peaks corresponding to CoCrPt(0002), Ti(0002), and Ag(111) planes are observed in these spectra, indicating a good orientation of the films. As a comparison, CoCrPt(50 nm)/Ti(50 nm) films were also grown directly on HF-Si(111) without the thin Ag template and the x-ray spectrum in FIG. 23(b) shows a good, but weaker Ti(0002) peak. The presence of a thin Ag layer enhances the epitaxial growth of Ti and this results in an enhance CoCrPt (0002) peak. It is noted that the diffraction peak of Ag(111) lies at the same angle as the Ti(0002) peak; however, because a 12 nm Ag film was used the Ag peak should not have substantially contributed to the height of the peak. FIG. 23(c) shows the diffraction peak for CoCrPt/Ag (111)/HF-Si(111), which exhibits an extremely strong texture that will be further considered below.

FIG. 24 shows the φ-scan spectra of the CoCrPt/Ti/Ag/ HF-Si sample and samples with fewer layers, along with cubic crystal (111) and Co (0001) stereographic projections that are necessary for the interpretation of the spectra. As expected from the (111) stereographic projection (FIG. 24(a')), three diffraction peaks that are 120° apart are found in the Si{220}-pole scan spectrum for the single crystal Si(111) substrate (FIG. 24(a)).

The (111) stereographic projection of cubic crystal in FIG. 24(b') (Ag/HF-Si) only shows three (110) poles. Six diffraction peaks, however, are observed in the Ag{220}-pole scan, indicating extra poles as denoted by crosses in FIG. 24(b'). This suggests that there exist two crystallographic domains of Ag grains in the Ag(111) film. The two domains most likely emerge from the Ag/Si epitaxial interface when Ag starts to grow with two different atomic configurations that are mirror images of each other. The two domains may also be a result of the Ag growth twinning. In fcc metals, the (111) plane is the most common twinning plane, and the twinning direction is [11$\bar{2}$]. The resulting two domains of Ag grains have (111) planes parallel with the substrate plane, yet the atomic configurations are mirror images about the plane perpendicular to the twinning direction. The first, third and fifth peaks in the Ag{220}-pole scan spectrum appear at the same locations as the three peaks in Si{220} scan, confirming the parallel relationship between the Si[11$\bar{2}$] and Ag[11$\bar{2}$] directions.

Six peaks are observed in the Ti{10$\bar{1}$1}-pole scan spectrum shown in FIG. 24(c) for the (Ti/Ag/HF-Si) films, which is in good agreement with the stereographic projection (FIG. 24(c')). Also confirmed is the parallel relationship between the Ti[10$\bar{1}$0] and Ag[11$\bar{2}$] directions. Good agreement is also found between the CoCrPt{10$\bar{1}$1}-pole scan [FIG. 24(d)] (Co/Ti/Ag/HF-Si) and the Co crystal (0001) projection [FIG. 24(d')]. An orientation relationship of CoCrPt[10$\bar{1}$0]∥Ti[10$\bar{1}$0] is also determined from the observation that the six peaks in the Co spectrum appear at the same φ positions as those in the Ti spectrum.

The magnetic properties of the CoCrPt/Ti/Ag/HF-Si(111) sample are compared to those of four other samples as listed in Table II. The coercivities ($H_{c\perp}$) were measured with the applied field perpendicular to the film planes.

TABLE II

| Sample | Substrate | $H_c$ (Oe) | S | Mst (memu/cm$^2$) |
|---|---|---|---|---|
| (A) CoCrPt 50 nm/ Ti 50 nm | Glass | 1928 | 0.82 | 2.5 |
| (B) CoCrPt 50 nm/ Ti 50 nm | Non HF-etched Si(111) | 2514 | 0.83 | 2.5 |
| (C) CoCrPt 50 nm/ Ti 50 nm | HF-Si(111) | 3550 | 0.96 | 2.5 |
| (D) CoCrPt 50 nm/ Ti 50 nm/Ag 12 nm | HF-Si(111) | 4580 | 0.85 | 2.5 |
| (E) CoCrPt 50 nm/ Ag 50 nm | HF-Si(111) | 278 | 0.085 | 2.5 |

FIGS. 25(a1–e1) and (a2–e2) show the perpendicular (easy axis) and in-plane(hard axis) hysteresis loops of samples A–E, respectively. A skewed square loop is observed along the perpendicular direction due to the demagnetization field. The openness and the non-zero coercivity in the hard axis in-plane loop may be due to inter-granular interactions or simply that the maximum applied field intensity is insufficient to saturate the samples. The curvature of the hard axis loop is most likely due to the non-zero value of the anisotropy constant $K_2$ as discussed earlier with respect to the Co($10\bar{1}0$) films.

In Table II, samples A and B are CoCrPt/Ti films deposited on a glass substrate and a Si(111) wafer covered with native oxide, respectively. The XRD spectra of the samples (FIGS. 21(a) and 21(b)) do not show a Ti crystal texture in either both samples, as previously discussed. Also, the coercivities of samples A and B are low, presumably because the Co layer did not epitaxially grow in the (0002) orientation, but slowly developed some (0002) texture naturally as the films became thicker, which resulted in dispersion in the c axis orientation. The poorer orientation is also indicated by the shape of the hysteresis loops shown in FIGS. 25(a1–b1) and (a2–b2). Higher coercivities and a more ideal shape of the hysteresis loops were obtained in sample C and D (FIGS. 25(c1–d1) and (c2–d2)), in which the oriented films were grown on HF-etched Si(111), which is consistent with the XRD spectra of samples C and D shown in FIGS. 23 (a–b).

As previously discussed, a 12 nm thin Ag layer introduced before the deposition of the Ti layer in sample D improves the orientation of the Ti and the Co alloy. The XRD spectra (FIG. 23(a)) shows that the Ti(0002) peak was greatly enhanced when compared to the spectra of sample C (FIG. 23(b)). The improved orientation of the Co film was strongly visible for samples with the Ag as thin as 10 nm and remained effective for all greater thickness. It is believed that the improved Co (0002) orientation using a Ag layer persists below 10 nm thick, and presumably as long as a continuous layer is maintained. However, due to test apparatus limitation, the lower limit of this range is not more clearly definable.

The hysteresis curves show that the coercivity of the samples A through D increases with the higher quality of orientation of the films. Consistent with the high degree of orientation, similar coercivity results were obtained for the thicker Ag layers.

Sample E was prepared by depositing a 50nm CoCrPt film directly on a 50 nm Ag underlayer on HF-Si(111) and tested for comparison with the CoCrPt/Ti/Ag/Si films. The hyster-esis curves for Sample E are shown in FIGS. 25(e1 and e2). The XRD spectra (FIG. 23(c)) shows an extremely strong crystal texture for the CoCrPt film. However, the coercivity of sample E is low compared with samples grown on Ti either with or without the Ag indicating that the Co phase is most likely present as an fcc structure.

Additional testing was performed using a pure Co target to test the viability of epitaxial growth of materials with high $4\pi Ms^2$. Highly epitaxial pure Co films, Co/Ag(111)/HF-Si (111) were found to grow on the Ag film; however, because of the high $4\pi Ms^2$ of pure Co, $2\pi Ms^2 > Ku$, the magnetization laid in the substrate plane. The high magnetization may result in the pure Co perpendicular films having a large $K_2$ value similar to those for the longitudinal uni-crystal pure Co films discussed earlier. The inclusion of Cr or other magnetic diluent in the Co film may be necessary to produce layers to be used in magnetic field sensing devices. If the coercivity is found to be sufficiently low magnetic bubble films may even be possible.

Figure 26A:
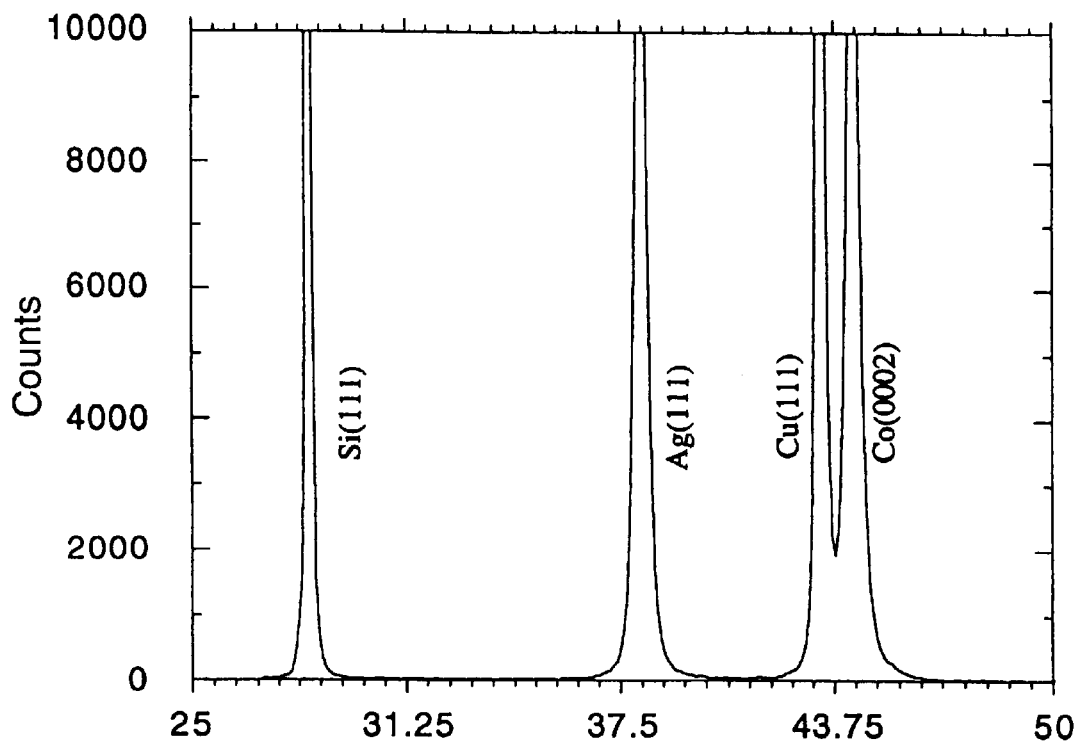
FIGS. 26(a–b) show XRD spectra for (a) Co (1000 Å)/Cu(500 Å)/Ag(300 Å)/HF-Si (111), and (b) Co (1000 Å)/Cu(500 Å)/ HF-Si (111)
Figure 26B:
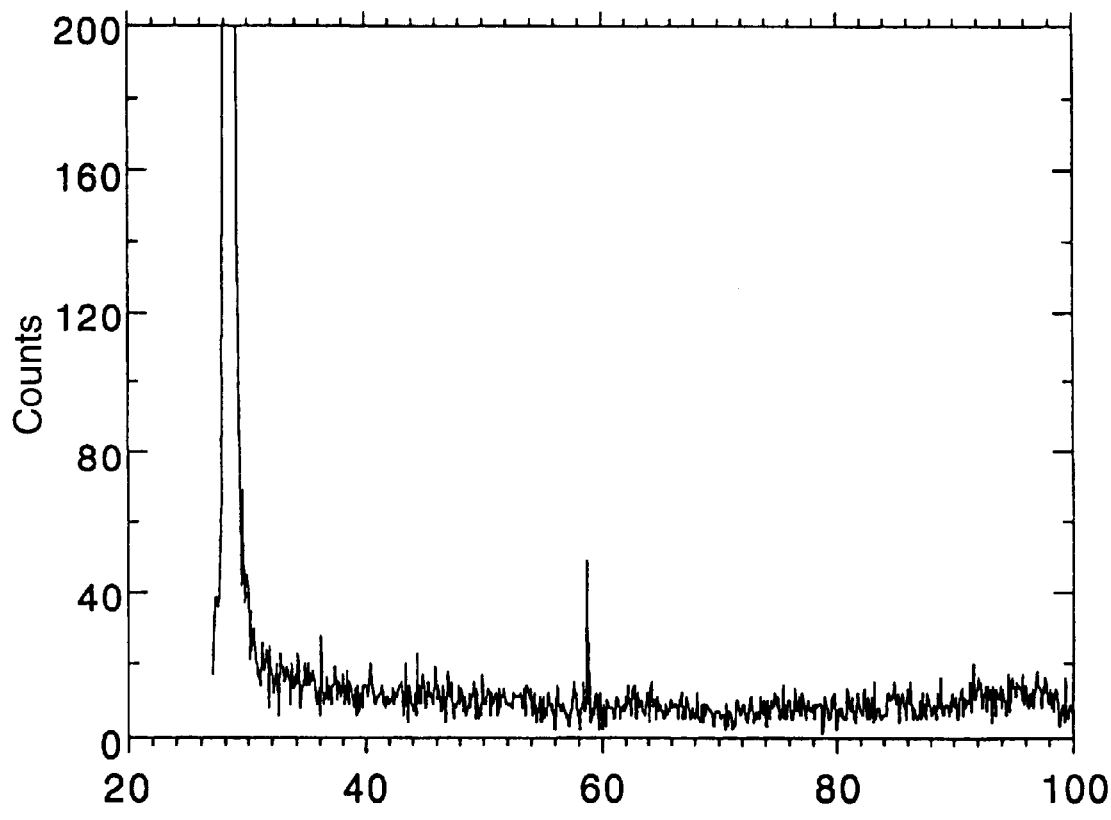
Figure 27A:
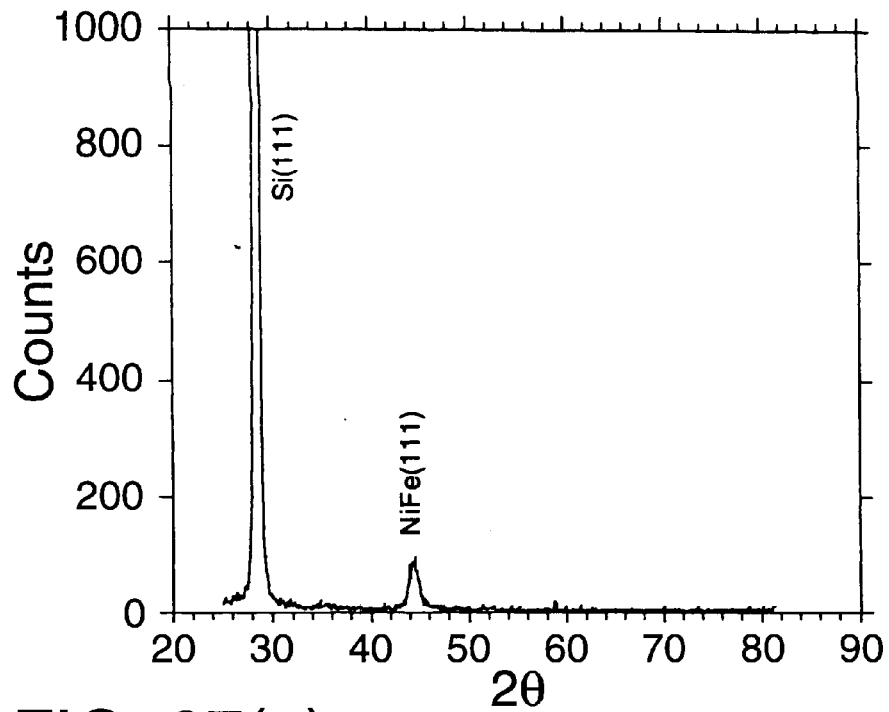
FIGS. 27(a–f) show XRD spectra for Samples A–F in Table III.
Figure 27B:
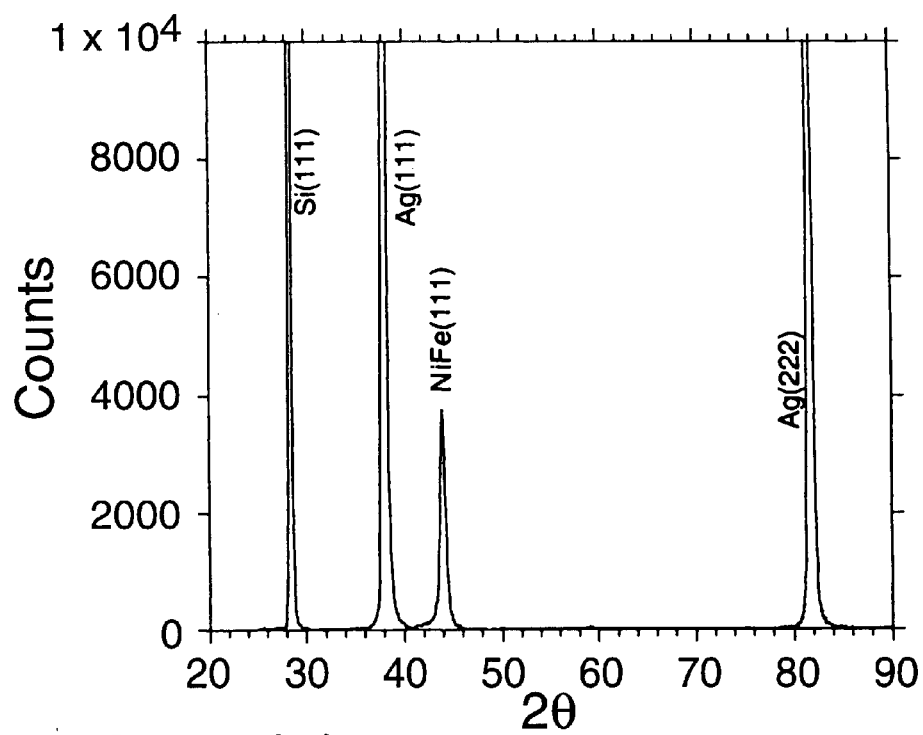
Figure 27C:
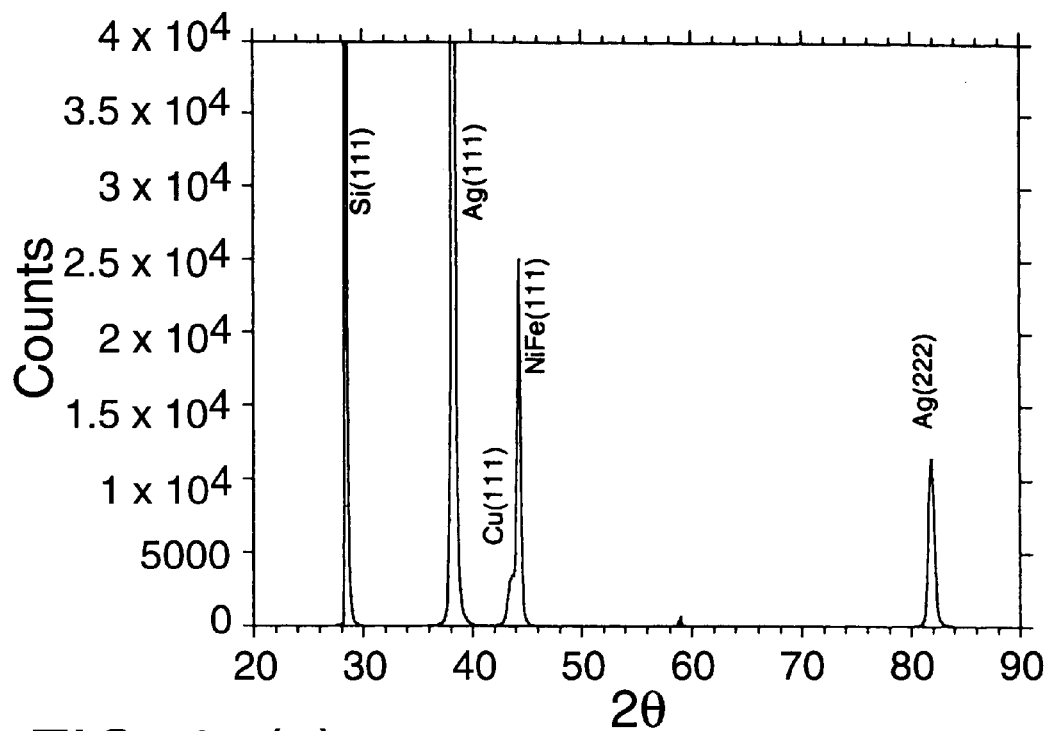
Figure 27D:
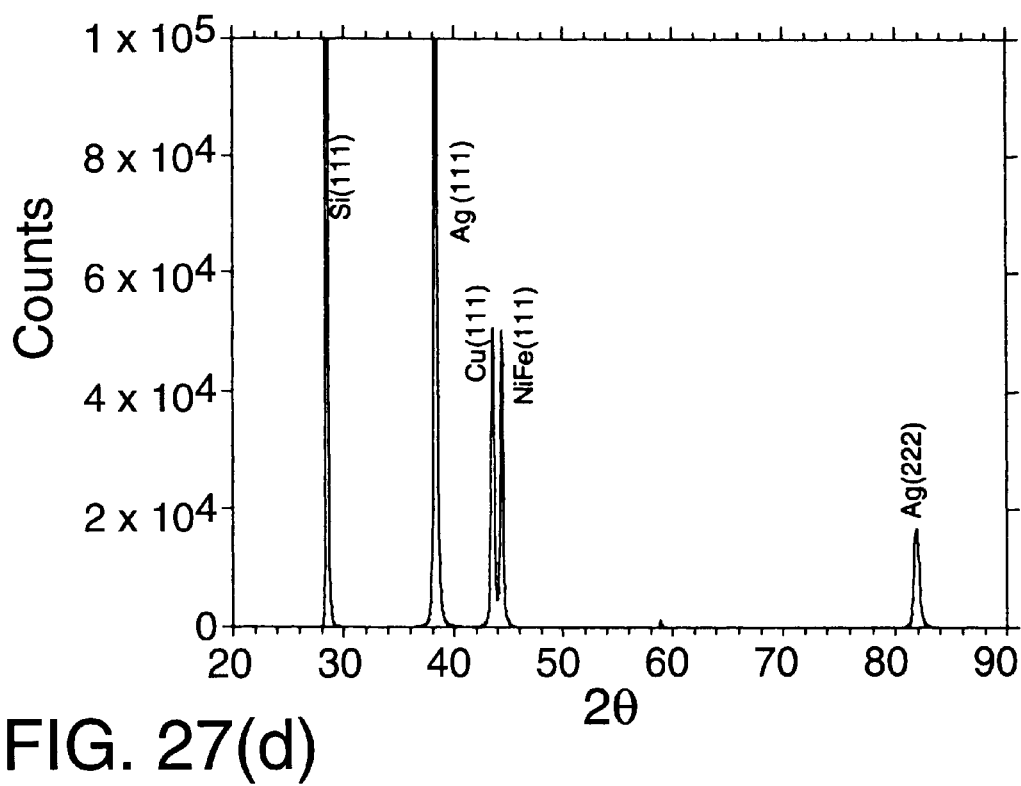
Figure 27E:
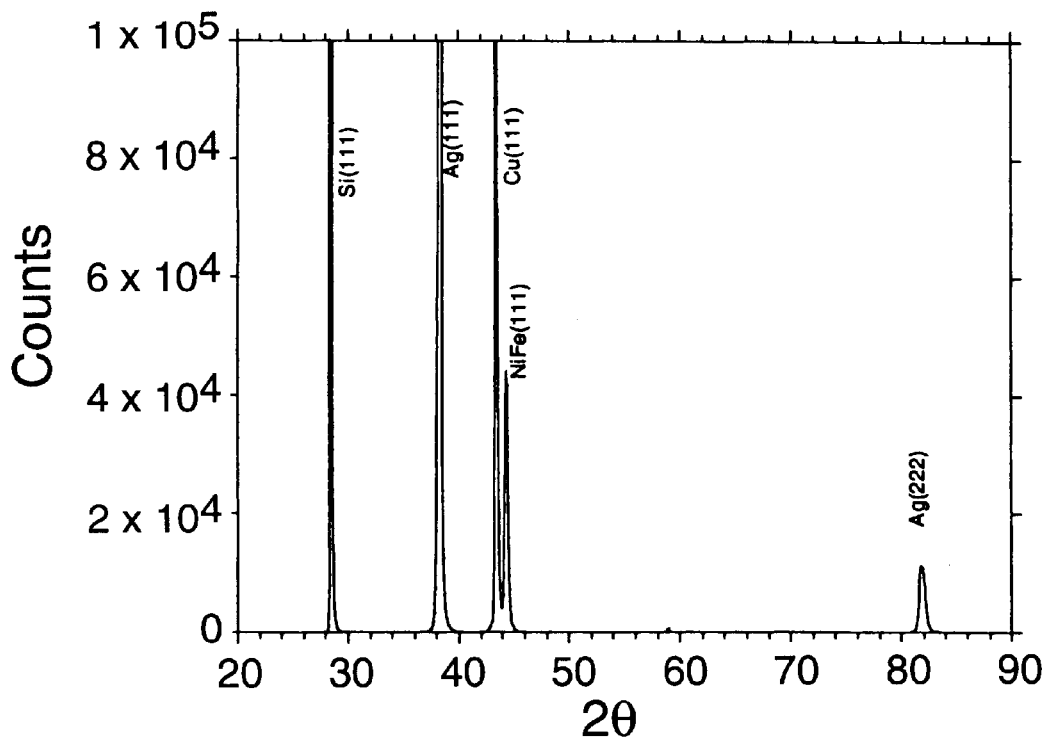
Figure 27F:
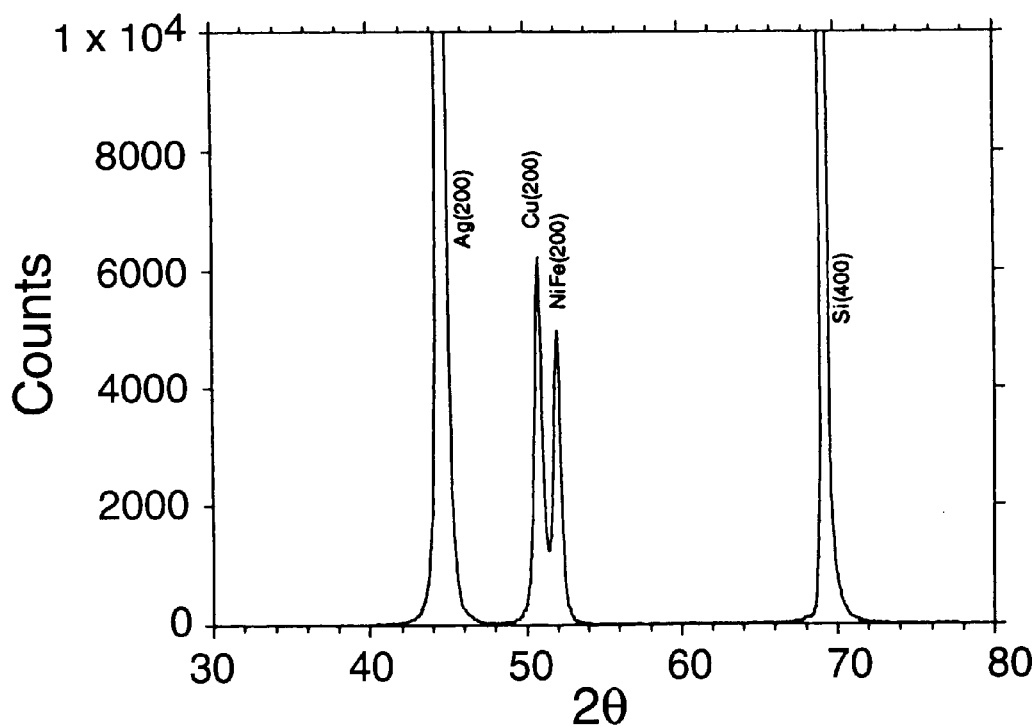

Other fcc templates and underlayers can also be used to improve the lattice matching of the films. Cu has an atomic lattice spacing that is compatible with the lattice spacing of Co and to a lesser extent with Ag. A Co(1000 Å)/Cu (500 Å)/Ag(300 Å)/Si (111) film was prepared and tested. As shown in FIG. 26(a), both the Cu (111) and the Co (0002) layer show exceptionally strong epitaxial growth from the Ag (111) template. In contrast, the Cu atomic lattice spacing is generally less compatible with that of the Si. Thus, a Co(1000 Å)/Cu (500 Å)/Si (111) film does not result in a strong texture in either the Cu or the Co layer, as shown in FIG. 26(b).

In magnetic field transducers such as magnetic recording heads and playback magnetoresistive and spin valve heads, it is generally desirable to prepare NiFe with a (111) texture to enable very soft magnetic properties. Ideally, permalloys and other soft magnetic material can be produced in (111) orientation that will result in three fold oriented, magnetic easy (111) axes lying near the substrate plane.

In addition to the beneficial use of oriented soft magnetic materials for sensor devices, it is believed that perpendicular media can be produced with a soft magnetic underlayer and/or even a soft overlayer (keepered media).

For example: CoCrPtTa(0002)/Ti(0002)/Ag(111)/NiFe (111)/Cu(111)/Ag(111)/HF-Si(111l) would provide both an oriented soft magnetic underlayer with a highly oriented perpendicular hard magnetic layer.

Permalloy (Ni 79 wt %, Fe 21 wt %) films were sputter deposited on different underlayers on HF cleaned Si (111) substrates using the techniques previously described, except that the films were heated to 260° C. prior to deposition. The composition of the permalloy film are shown below in Table III:

TABLE III

| Sample | Configuration |
|---|---|
| A | NiFe 50 nm/Si(111)-HF |
| B | NiFe 50 nm/Ag 100 nm/Si(111)-HF |
| C | NiFe 50 nm/Cu 10 nm/Ag 100 nm/Si(111)-HF |
| D | NiFe 50 nm/Cu 50 nm/Ag 100 nm/Si(111)-HF |
| E | NiFe 50 nm/Cu 100 nm/Ag 100 nm/Si(111)-HF |
| F | NiFe 50 nm/Cu 100 nm/Ag 100 nm/Si(100)-HF |

The XRD spectra for each film is shown in FIGS. 27(a–f). As shown in FIG. 27(a), the NiFe develops only weak (111) texture when deposited on (111) Si. However, the deposition of a fcc (111) Ag template underlayer on the (111) Si prior to the deposition of the permalloy produces strong (111)

texture development in the NiFe layer, as evidenced by the factor of 20 increase in the counts detected during XRD testing.

In addition, the (111) texture of the NiFe (Ni(fcc), a=3.52 Å; Fe(fcc), a=3.65 Å) can be further increased through the use of a (111) fcc, such as Cu (a=3.61 Å), that has a better lattice match than Ag (a=4.08 Å). As shown in FIGS. 27(c–e), the Cu underlayer further increases the (111) texture of the NiFe film.

Similarly, NiFe(100) has also been deposited on Cu/Ag/Si(100)-HF single crystal template for comparison with the NiFe (111) texture. The magnetic properties have been characterized with BH loop tracer. The in-plane coercivity of samples E and F were determined and are shown below:

| Sample | Maximum in-plane Hc | Minimum in-plane Hc |
| --- | --- | --- |
| E | 2.64 Oe | 1.65 Oe |
| F | 26.5 Oe | 18.6 Oe |

The coercivity of NiFe(111) along an easy axis of the Cu/Ag/Si(111) template is less than 3 Oe, whereas, the in-plane coercivity of NiFe(100) film on Cu/Ag/Si(100) template is nearly 30 Oe. This indicates that the easy axis of this NiFe alloy is in <111> direction and the anisotropy constant $K_1$ of the material is negative, further demonstrating that very soft magnetic properties can be achieved in these highly oriented (111) NiFe films. Furthermore, by performing this deposition in the presence of an applied magnetic field the coercivity will be further reduced.

One of the problems that has always existed for perpendicular media with a soft magnetic underlayer is a media noise associated with the soft underlayer. For traditional, non-oriented NiFe soft films Barkhausen noise associated with the NiFe domain walls being stuck at grain boundaries has been a problem. It is believed that the three fold in-plane orientation that results from the epitaxial growth on (111) single crystal Si may help to reduce this noise source. Likewise, it may be possible to put a soft magnetic keeper layer on top of the Co-alloy, such as NiFe(111)/Cu(111)/Ag(111)/CoCrPtTa(0002)/Ti(0002)/Ag(111)/NiFe(111)/Cu(111)/Ag(111)/HF-Si(111).

In addition, super-lattice like multilayers of Co/Pt and Co/Pd prepared on conventional substrates have been investigated for several years. It should be possible to grow much more oriented films of these types by using the structures described on the single crystal Si(111) substrates. An underlayer/substrate structure such as Ag(111)/Si(111), Ti(0002)/Ag(111)/Si(111), or Ti(0002)/Si(111) may be appropriate. It is believed that Al(111)/Ag(111)/HF-Si(111) films may also be anodized to produce a highly self ordered porous structure into which Co alloys can be electroplated to form self-assembled ordered magnetic arrays (SOMA).

In another aspect of the invention, Applicants have found that (111) fcc structure can also be produced using a lattice matched (110) bcc structure, in lieu of the nearly ideal (111) single crystal Si. In the absence of the single crystal, the strength of the (111) texture will depend upon the strength of the (110) texture. Thus, the Ag (111) can be grown on a (110) textured Cr or CrMn with a strong (111) texture, which, in turn, can be used to grow strongly textured (111) NiFe or (110) bcc, (0002) or (10$\bar{1}$1) Co-based layers as previously described. Furthermore, because reasonable quality (110) bcc textures can be obtained due to the atomic close packed surface structures, several high quality textures can be obtained upon these layers. For example, polycrystalline uni-crystal cobalt can be induced via proper lattice compatibility of the Co(10$\bar{1}$0)/bcc(112) /fcc(110)/bcc(110) layers, or even Co(10$\bar{1}$0)/bcc(112)/bcc(110). In particular, (110) bcc and bcc derivatives with unit cell lattice parameters of a≈5.0 (Ba, BaCa, etc.), a≈3.5 (La, β-Zr) or a≈3.75 (LaZn, LaAg, NdAl, CeAg) are suitable matches to a fcc (110) structures, such as Ni, Co, and Cu, and (110) bcc structures with a≈5.7 (Rb) match reasonably to Ag(110) to yield:

Co(10$\bar{1}$0)/Cr(112)[111]/Ag(110)[110]/Rb(110)[100];
Co(1010)/Cr(112)[111]/Ba(110) [100]; and,
Co(1010)/Cr(112)[111]/Ni(110)[110]/Ba(110)[100].

Figure 28A:
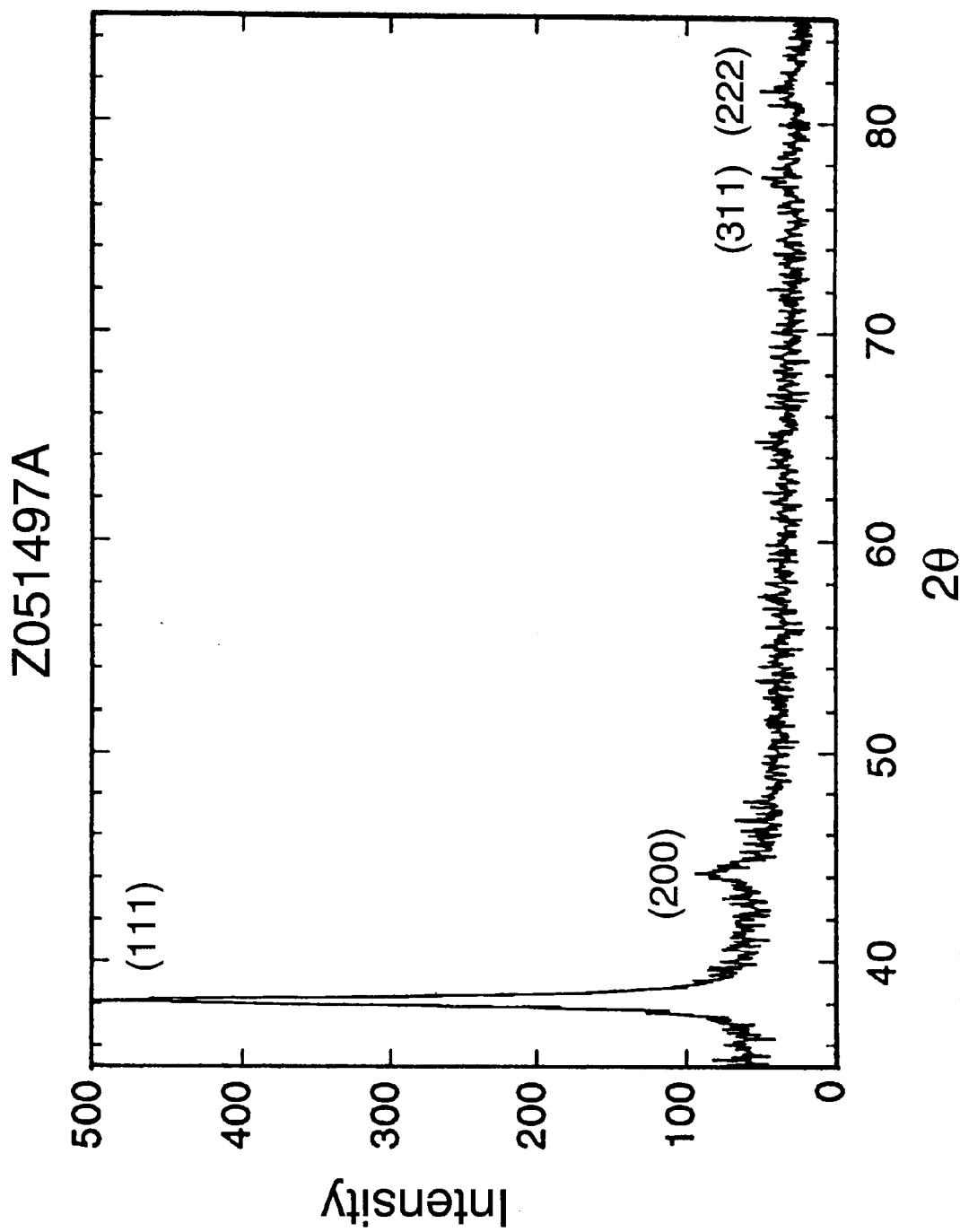
FIGS. 28(a–b) show XRD spectra for (a) Ag(500 Å)/glass, and (b) Ag(500 Å)/CrMn(500 Å)/glass.
Figure 28B:
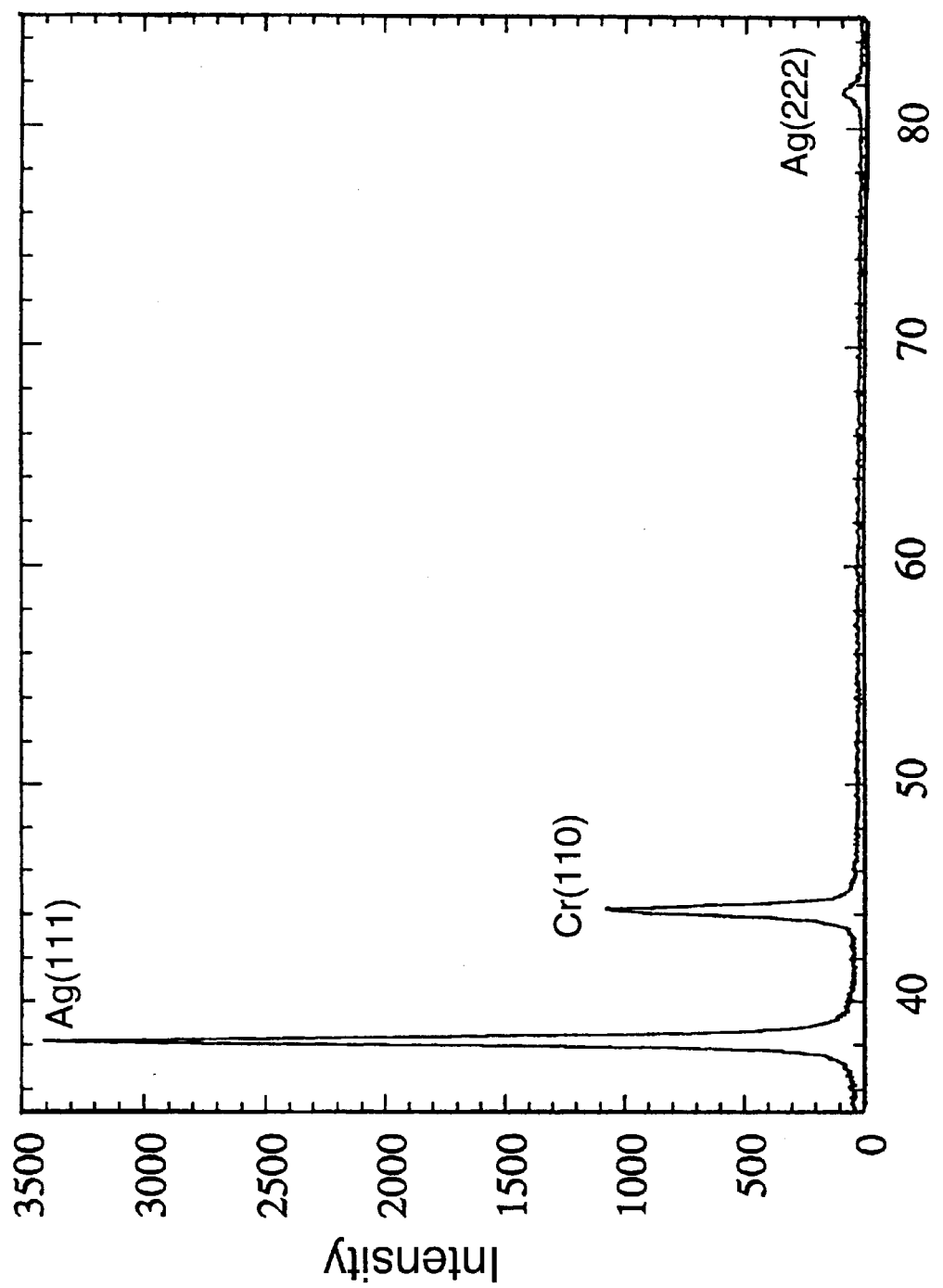

FIGS. 28(a–b) show x-ray diffraction spectra of various Ag(111) underlayer films grown on glass substrates without and with a (110) CrMn underlayer. In FIG. 28(a), the low energy (111) orientation of the fcc structure is the predominant orientation, but the (111) texture is weak and other orientations are also observed in the spectra. In contrast, FIG. 28(b) shows the Ag(111) texture on the CrMn layer to be strongly developed, nearly seven times the intensity of the (111) texture without the bcc layer.

Figure 29A:
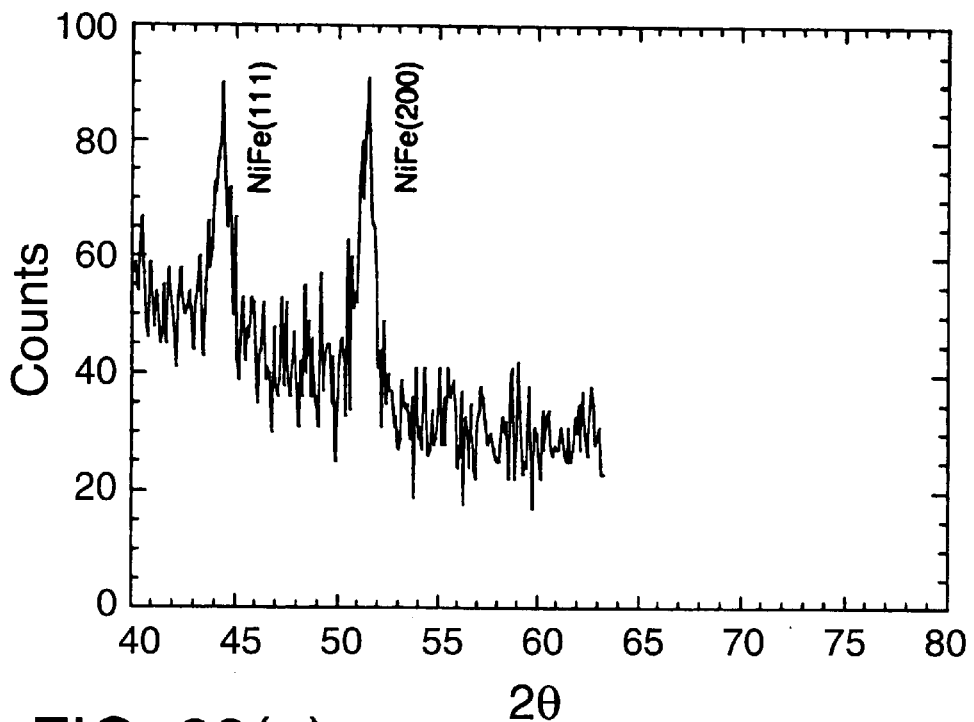
FIGS. 29(a–b) show XRD spectra for (a) NiFe(500 Å)/glass, (b) NiFe(500 Å)/Cu(1000 Å)/glass, (b) Cu(1000 Å)/Cr(300 Å)/glass, and Cu(1000 Å)/Ag(1000 Å)/Cr(300 Å)/glass; and, FIG. 30 shows the XRD scans of typical Cr films of various thicknesses prepared by RF diode sputtering on to glass substrates.
Figure 29B:
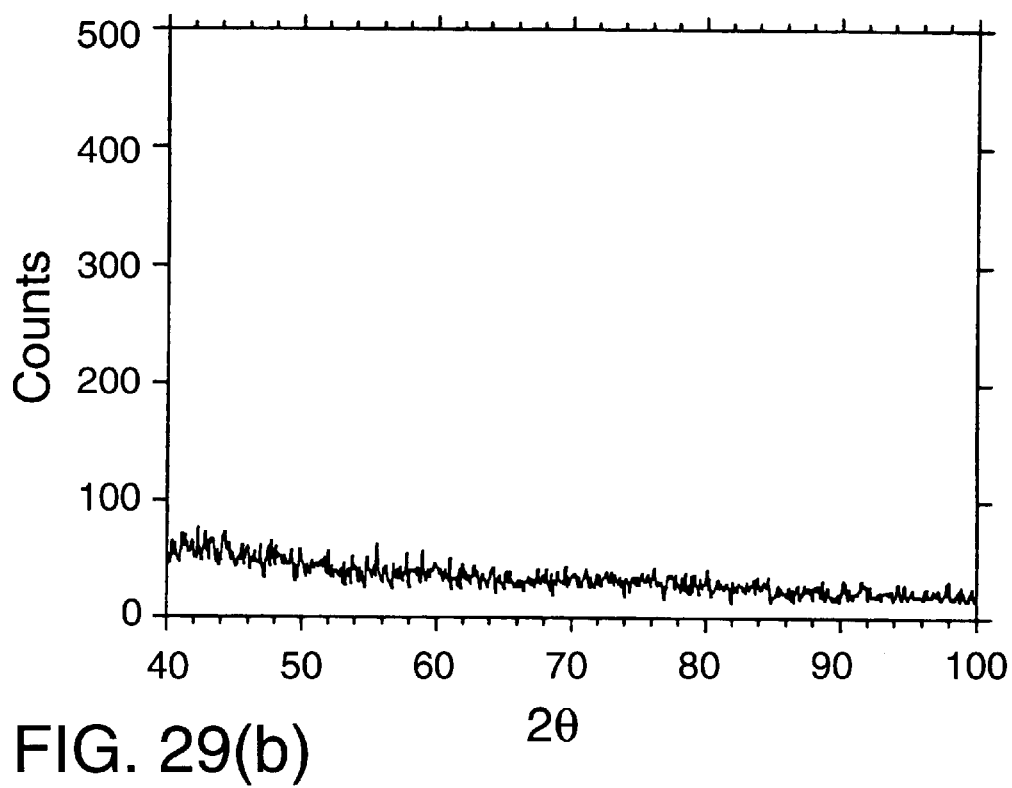
Figure 29C:
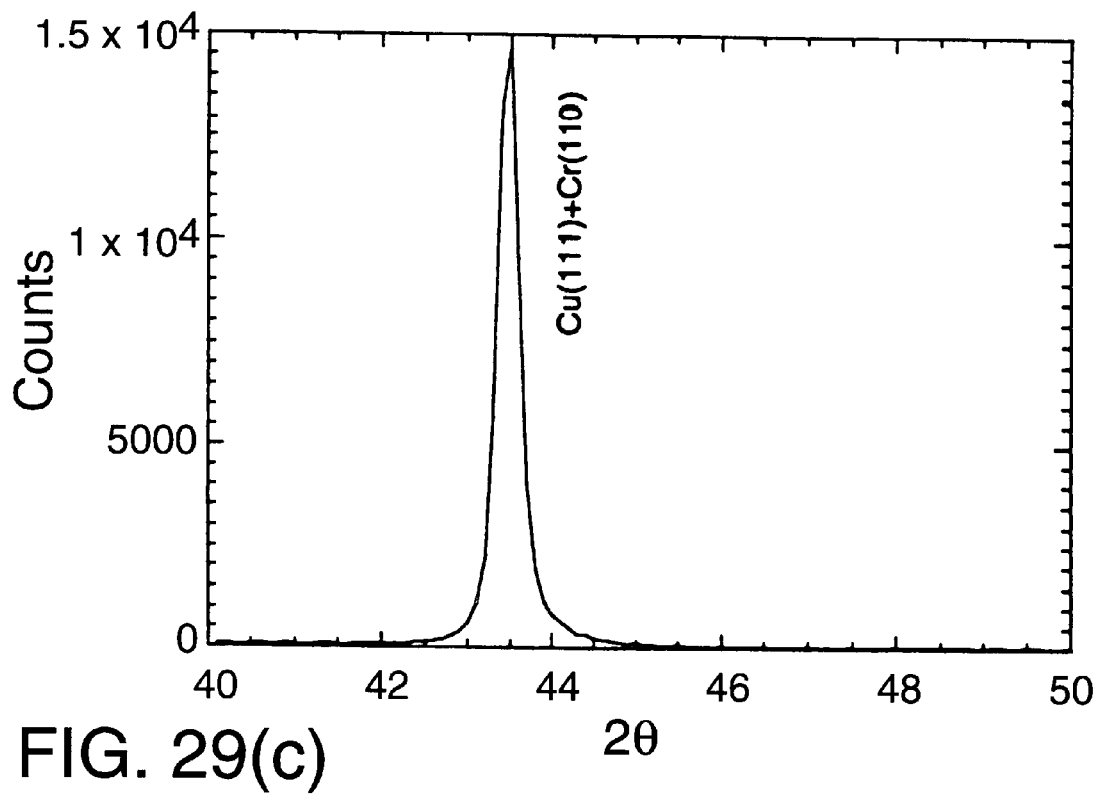
Figure 29D:
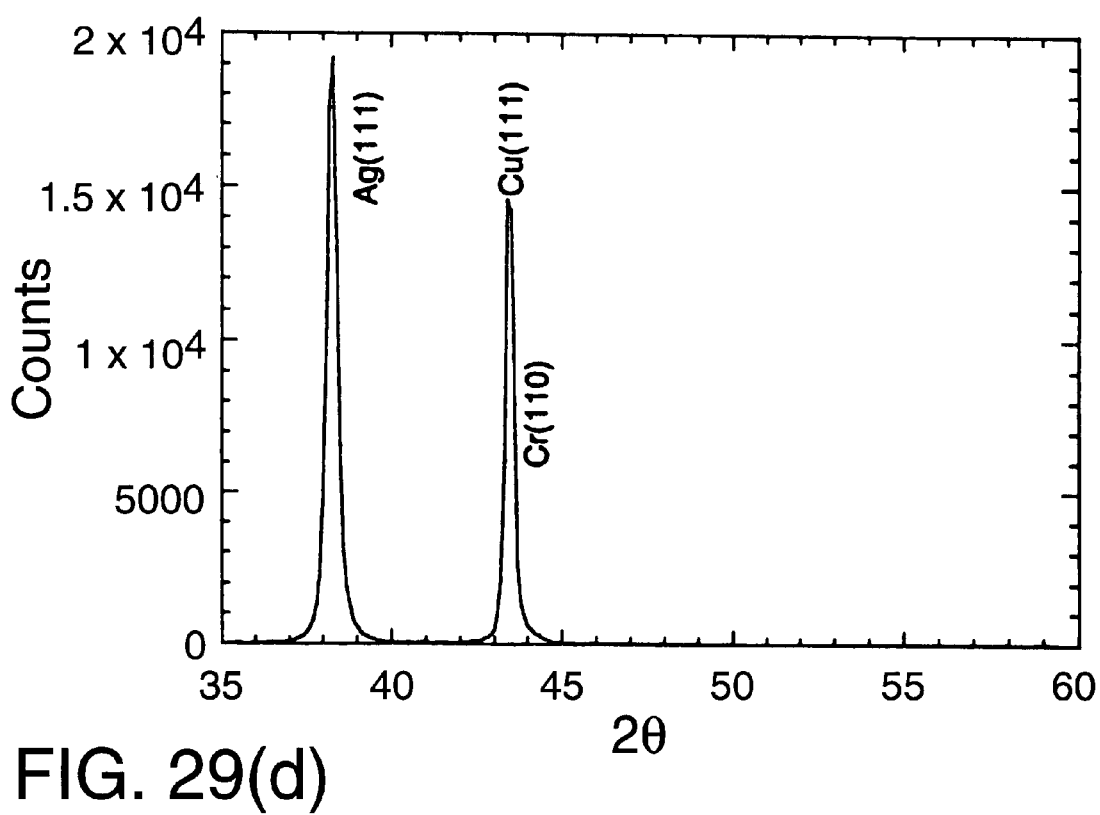

FIGS. 29(a) and (b) show XRD spectra for a NiFe 50 nm film deposited directly on a glass substrate and on a Cu film deposited on a glass substrate at 260° C. As expected, neither film develops a strong texture and for the NiFe/glass film weak peaks are observed for both the (111) and (200) NiFe orientations. In contrast, FIGS. 29(c–d) show XRD spectra of a Cu(100 nm)/Ag(100 nm)/Cr(30 nm)/glass and Cu(100 nm)/Cr(30 nm)/glass deposited at room temperature, which exhibit strong peaks indicative of a stong (111) texture in the films.

As might be expected, the strength of the (111) texture in the Ag layer on the Cr/glass layers is less than on the single crystal Si (111). However, the use of the lattice matched bcc layer provides for increased flexibility in substrate selection and provides for a polycrystalline layer that can be used to induce extremely strong (111) texture. For example, Co-based layers that have a quad-crystalline (10$\bar{1}$1) or (0002) perpendicular orientation can be produced on a conventional rotating recording medium, in which the crystals are random in the plane of the medium and have quad-crystalline or perpendicular order within the crystal.

Figure 30:
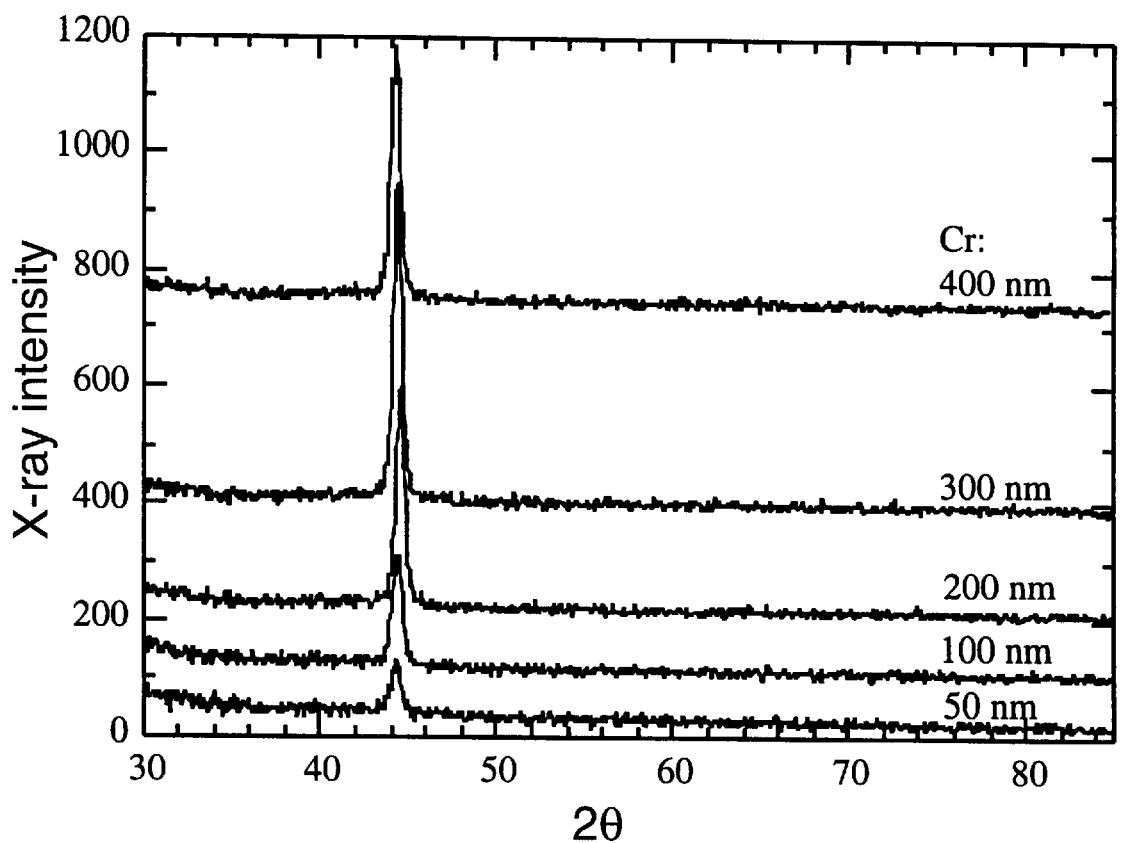

FIG. 30 shows the XRD scans of typical Cr films of various thicknesses prepared by RF diode sputtering on to glass substrates. The (110) peaks increase somewhat linearly with film thickness as more of the x-rays are diffracted from the thicker films as oppose to being transmitted. On the other hand the peak to peak fluctuations or noise of the background signal is relatively constant. Comparing the (110) signal peak height of the 50 nm thick film to the peak to peak noise to one can see that the ratio is less than 10. Likewise if one takes the signal peaks for the thicker films and divides by ratio of the film thickness to 50 nm one obtains about the same peak signal to noise ratio. Hence, we see that for 50 nm films typical signal to noise ratios of the x-ray diffraction peaks are less than one. In general however, these signal to noise ratios may be somewhat improved by processing with bias at low deposition rates or depositing on wetting layers. However, these improved peaks are not nearly as strong as has been exhibit in films of the present invention. The deposition of fcc Ag onto (110) Cr and then deposition of Cr onto the Ag results in far stonger texture as exhibited by the results in FIGS. 28 and 29 where the texture of Ag is significantly improved by the Cr (110) layer.

The performance of the highly oriented layers of the present invention increases with increasing crystal texture of the films. Therefore, it is preferred that the films of the present invention have XRD signal to noise ratios of at least 10 to 1 per 50 nm of film thickness as determined using the thin film XRD method described herein. While the present invention can be practiced using films having lower signal to noise ratios, the benefit of the invention will most likely not be realized to the same extent as for those films having higher ratios.

The use of the bcc (110) layer to induce the (111) fcc layer provides for Co-based layers having a strong (0002) orientation that can be incorporated into conventional magnetic media for use in perpendicular recording applications employing straight forward underlayer and magnetic structures, such as CoCrPtTa(0002)/Ti(0002)/Ag(111)/Cr(110)/glass). These layers should be useful in both magneto-optic media and perpendicular magnetic media with and without the soft underlayer structures and the keeper media overlayers.

The Cr alloy films with (110) texture are generally easy to achieve because the (110) texture surface is the lowest energy, close packed, surface for the bcc crystal. It has been shown that Cr(110) can be prepare by depositing very thick layers, depositing at room temperature, using low deposition rates, or most preferably by using substrate bias voltage during sputter deposition.

Those of ordinary skill in the art will appreciate that a number of modifications and variations can be made to specific aspects of the method and apparatus of the present invention without departing from the scope of the present invention. Such modifications and variations are intended to be covered by the foregoing specification and the following claims.

What is claimed is:

1. A recording medium comprising:
    a substrate;
    a Co or Co alloy film having a $(10\bar{1}0)$ crystal texture forming a magnetic recording layer;
    an underlayer structure having (i) at least one first underlayer having a face centered cubic structure and a (110) crystal texture disposed between said substrate and said magnetic layer and (ii) at least one second underlayer having a body centered cubic structure and a (112) crystal texture disposed between said first underlayer and said magnetic layer.

2. The recording medium of claim 1 wherein said second underlayer comprises Cr alloy solid solutions.

3. The recording medium of claim 1 wherein said second underlayer comprises a material selected from the group consisting of B2, DO3, and L2$_1$ body centered cubic derivative structures.

4. The recording medium of claim 1 wherein said second underlayer is comprised of a material selected from the group consisting of Cr, Cr alloys and a material having a B2-ordered structure and a lattice constant substantially comparable to Cr.

5. The recording medium of claim 1 wherein said second underlayer is comprised of a material selected from the group consisting of Cr, CrV, CrMo, CrW, CrTi, CrMn, NiAl, AlCo, FeAl, FeTi, CoFe, CoTi, CoHf, CoZr, NiTi, CuBe, CuZn, AlMn, AlRe, AgMg, Al$_2$FeMn$_2$, AlNi$_2$Ta, AlNi$_2$Nb, AlNi$_2$Ti, Fe$_3$Al, and combination thereof.

6. The recording medium of claim 1 wherein said first underlayer includes L1$_0$ and L1$_2$ face center cubic derivative structures.

7. The recording medium of claim 1 wherein said first underlayer is comprised of a material selected from the group comprising Ag, Au, Cu, Al, and combinations thereof.

8. The recording medium of claim 1 wherein said first underlayer is comprised of Ag.

9. The recording medium of claim 1 wherein:
    said first underlayer is comprised of Ag;
    said second underlayer is comprised of Cr; and,
    said substrate comprises a Si(110) single crystal.

10. The recording medium of claim 1 further comprising a seed layer disposed between said substrate and said magnetic recording layer.

11. The recording medium of claim 1 further comprising a wetting layer disposed between said substrate and said magnetic recording layer.

12. The recording medium of claim 11 wherein said substrate is a polycrystalline substrate or a single crystalline substrate with a polycrystalline surface having said wetting layer disposed thereon and further comprising a third underlayer having a body centered cubic structure and a (110) crystal texture disposed between said wetting layer and said first underlayer.

13. The recording medium of claim 1 wherein said substrate comprises a non-oxidized Si(110) single crystal.

14. The recording medium of claim 1 wherein said magnetic layer includes a Co alloy selected from the group consisting of CoCr, CoSm, CoPr, CoP, CoNi, CoPt, CoNiCr, CoNiZr, CoPtNi, CoCrTa, CoCrPt, CoCrP, CoCrTaSi, CoCrPtSi, CoCrPtB, CoCrPtTa, CoCrPtTaB, CoCrPtTaNb, and combinations thereof.

15. The recording medium of claim 1 further comprising an intermediate layer between said second underlayer and said magnetic recording layer.

16. The recording medium of claim 1 further comprising a second magnetic recording layer comprised of Co or Co-alloy and an inner layer between said second first and second magnetic recording layers.

17. The recording medium of claim 1 wherein the crystal textures of said medium have at least a 10 to 1 XRD signal to noise ratio per 50 nm thickness as determined by the thin film XRD method.

18. An apparatus for data storage comprising:
    a recording medium comprising,
        a substrate,
        a Co or Co alloy film having a $(10\bar{1}0)$ crystal texture forming a magnetic recording layer,
        an underlayer structure having (i) at least one first underlayer having a face centered cubic structure and a (110) crystal texture disposed between said substrate and said magnetic layer, and (ii) at least one second underlayer having a body centered cubic structure and a (112) crystal texture disposed between said first underlayer and said magnetic layer; and,
    a magnetic transducer positioned in close proximity to said medium to record and read data to and from said medium.

19. A method of producing a Co or Co alloy magnetic layer having a $(10\bar{1}0)$ crystal texture on a substrate, said method comprising:
    providing an underlayer structure characterized by providing at least one first underlayer having a face centered cubic structure and a (110) crystal texture on a substrate and
    growing at least one second underlayer having a body centered cubic structure and a (112) crystal texture from the first underlayer; and,
    depositing a Co or Co alloy magnetic layer on the second underlayer.

20. The method of claim 19 wherein:

said method further comprises providing a substrate having a (110) crystal texture; and, said providing a first underlayer comprises growing a first underlayer having a (110) crystal texture on the substrate.

21. The method of claim 19 wherein:

said method further comprises providing a non-oxidized single crystal Si substrate having a (110) crystal texture;

said providing a first underlayer comprises growing a first underlayer comprised of Ag having a (110) crystal texture on the substrate; and, said providing a second underlayer comprises growing a second underlayer comprised of Cr having a (112) crystal texture on the substrate, said second underlayer being comprised of Cr. Cr alloys or a material having a B2-ordered structure and a lattice constant substantially comparable to Cr.

22. A recording medium comprising:

a substrate;

a Co or Co alloy film having a (11$\bar{2}$0) crystal texture forming a magnetic recording layer; and, a first underlayer having a face centered cubic structure and a (001) crystal texture disposed between said substrate and said magnetic layer.

23. The recording medium of claim 22 further comprising a second underlayer having a body centered cubic structure and a (001) crystal texture disposed between said first underlayer and said magnetic recording layer.

24. The recording medium of claim 23 wherein:

said first underlayer is comprised of Ag;

said second underlayer is comprised of Cr or a Cr alloy; and, said substrate comprises a Si(001) single crystal.

25. A recording medium comprising:

a substrate;

a Co or Co alloy film having a (0002) crystal texture forming a magnetic recording layer;

a first underlayer structure having (i) at least one first underlayer having a face centered cubic structure and a (111) crystal texture disposed between said substrate and said magnetic layer and (ii) at least one second underlayer disposed between said first underlayer and said magnetic layer to induce the (0002) crystal texture in said magnetic layer.

26. The recording medium of claim 25, wherein said second underlayer comprises a hexagonal close packed structure and a (0002) crystal texture.

27. The recording medium of claim 25, wherein said second underlayer comprises a face centered cubic structure having a (111) crystal texture and an atomic spacing comparable to said magnetic recording layer.

28. The recording medium of claim 25, further comprising a soft magnetic layer and having a face centered cubic structure and a (111) crystal texture disposed between said magnetic recording layer and said first underlayer.

29. The recording medium of claim 25, wherein said substrate comprises:

a substrate material selected from the group consisting of glass, NiP coated Al, glass ceramic, ceramic, and SiC; and, a third underlayer having a body centered cubic structure and a (110) crystal texture disposed on said substrate material.

30. The recording media of claim 29 wherein said third underlayer is comprised of Cr, Cr alloys or a material having a B2-ordered structure.

31. The recording medium of claim 25 wherein:

said first underlayer is comprised of Ag;

said second underlayer is comprised of Ti; and, said substrate comprises a Si(111) single crystal.

32. A magneto-optic data storage device including the recording medium of claim 25.

33. A transducer comprising:

a substrate;

a soft magnetic layer having a face centered cubic structure and a (111) crystal texture;

a first underlayer having one of a face centered cubic structure and a (111) crystal texture or a body centered cubic structure and a (110) crystal texture disposed between said substrate and said soft magnetic layer; and, a second underlayer having a face centered cubic structure and a (111) crystal texture disposed between said first underlayer and said soft magnetic layer.

34. The transducer of claim 33 wherein:

said first underlayer is comprised of Cr;

said second underlayer is comprised of Ag or Cu; and, said soft magnetic layer is comprised Ni or a NiFe alloy.

35. The transducer of claim 33 further comprising a hard magnetic layer in contact with said soft magnetic layer, wherein said hard magnetic layer comprises a Co-based material having a hexagonal close packed crystal structure.

36. A recording medium comprising:

a substrate;

a Co or Co alloy film having a (10$\bar{1}$1) or a (10$\bar{1}$0) crystal texture forming a magnetic recording layer;

an underlayer structure having (i) at least one first underlayer having a face centered cubic structure and a (111) crystal texture disposed between said substrate and said magnetic recording layer and (ii) at least one second underlayer having a body centered cubic structure and a (110) crystal texture disposed between said first underlayer and said magnetic recording layer.

37. The recording medium of claim 25 further comprising a third underlayer having a body centered cubic structure and a (110) crystal texture positioned between said first and second underlayers.

38. The recording medium of claim 25 further comprising:

a soft magnetic layer and having a face centered cubic structure and a (111) crystal texture disposed between said first and said second underlayer structures.

39. The recording medium of claim 38 further comprising a second underlayer structure having (i) a first underlayer having a face centered cubic structure and a (111) crystal texture and (ii) a second underlayer having a hexagonal close packed structure and a (0002) crystal texture; and, said second underlayer of said first underlayer structure is a face centered cubic structure having a (111) crystal texture.

40. The recording medium of claim 39 wherein:

said soft magnetic layer is comprised of NiFe;

said first underlayer of each of said first and second underlayer structures is Ag;

said second underlayer of said first underlayer structure is Cu;

said second underlayer of said second underlayer structure is Ti; and, said substrate comprises a Si(111) single crystal.

41. A magneto-optic data storage device including the recording medium of claim 25.

42. The transducer of claim 33 wherein said substrate is a Si(111) single crystal and said first underlayer has a (111) crystal texture.

43. The transducer of claim 33 wherein said magnetic layer is comprised of Ni, NiFe or a FCC Co or Co alloy.

44. The recording medium of claim 36 wherein said substrate is a Si(111) single crystal.

45. The recording medium of claim 36 further comprising a third underlayer having a polycrystalline body centered cubic structure and a (110) crystal texture disposed on said substrate.

46. An apparatus for data storage comprising:

the recording medium recited in claim 36, and, a magnetic transducer positioned in close proximity to said medium to record and read data to and from said medium.

47. A recording medium comprising:

a substrate;

an underlayer structure having at least first and second layers; and a magnetic layer structure disposed on the underlayer structure;

wherein the substrate is a single crystal Si having one of a (111) crystal texture or a (110) crystal texture or a (001) crystal texture which is in contact with and induces the epitaxial growth of the first layer of the underlayer structure from the substrate.

48. The recording medium of claim 47 wherein said magnetic layer structure is comprised of ordered magnetic arrays.

49. A recording medium comprising:

a substrate;

an underlayer structure epitaxially grown on the substrate; and a magnetic layer structure disposed on the underlayer structure comprising a Co or Co alloy based material having a (0002) crystal texture;

wherein the substrate is a single crystal Si having one of a (111) crystal texture or a (110) crystal texture or a (001) crystal texture;

wherein said underlayer structure is comprised of at least one first underlayer having a face centered cubic structure and a (111) crystal texture disposed between said substrate and said magnetic layer;

at least one second underlayer disposed between said first underlayer and said magnetic layer structure; and, a third underlayer comprised of a hexagonal close packed structure having a (0002) crystal texture disposed between said second underlayer and said magnetic layer structure.

50. The recording medium of claim 49 wherein said magnetic layer structure is comprised of ordered magnetic arrays.

51. A recording medium comprising:

a substrate;

an underlayer structure epitaxially grown on the substrate; and a magnetic layer structure disposed on the underlayer structure;

wherein the substrate is a single crystal Si having a (110) crystal texture and the underlayer structure is comprised of at least one first underlayer having a face centered cubic structure and a (110) crystal texture disposed between said substrate and said magnetic layer; and, at least one second underlayer having a body centered cubic structure and a (112) crystal texture disposed between said first underlayer and said magnetic layer structure.

52. The recording medium of claim 51 wherein said magnetic layer structure is comprised of ordered magnetic arrays.

53. The recording medium recited in claim 51 further comprising a soft magnetic keeper layer disposed on said magnetic layer structure.

54. A recording medium comprising:

a substrate comprised of a single crystal Si having one of a (111) crystal texture or a (110) crystal texture or a (001) crystal texture;

an underlayer structure epitaxially grown on the substrate; and a magnetic layer structure comprised of a Co or Co alloy based material having a (11$\bar{2}$0) crystal texture disposed on the underlayer structure;

wherein said underlayer structure is characterized by at least one first underlayer disposed between said substrate and said magnetic layer and at least one second underlayer disposed between said first underlayer and said magnetic layer structure, said second underlayer having a body centered cubic structure and a (002) crystal texture.

55. A recording medium comprising:

a substrate comprised of a single crystal Si having a (001) crystal texture;

an underlayer structure epitaxially grown on the substrate; and a magnetic layer structure disposed on the underlayer structure;

wherein the underlayer structure is comprised of at least one first underlayer having a face centered cubic structure and a (002) crystal texture disposed between said substrate and said magnetic layer; and, at least one second underlayer disposed between said first underlayer and said magnetic layer structure.

56. The recording medium recited in claim 55 wherein the magnetic layer structure comprises a Co or Co alloy based materials having a (11$\bar{2}$0) crystal texture.

57. The recording medium recited in claim 56 wherein said second underlayer is a body centered cubic structure having a (001) crystal texture.

58. An apparatus for data storage comprising:

the recording medium recited in claim 47, and, a magnetic transducer positioned in close proximity to said medium to record and read data to and from said medium.

59. A transducer comprising:

an underlayer structure having at least first and second layers;

a magnetic layer structure disposed on the underlayer structure; and, a substrate disposed beneath the underlayer structure wherein the substrate is a single crystal Si having one of a (111) crystal texture or a (110) crystal texture or a (001) crystal texture and is in contact with and induces the epitaxial growth of the first layer of the underlayer structure from the substrate.

60. A recording medium comprising:

an underlayer structure; and a super lattice multilayer magnetic layer structure disposed on the underlayer structure; and, a substrate disposed beneath the underlayer structure, the recording medium characterized in that the substrate is a single crystal Si having one of a (111) crystal texture or a (110) crystal texture or a (001) crystal texture;

wherein the underlayer structure is characterized by (i) at least one first underlayer having a face centered cubic structure and a (111) crystal texture, (ii) at least one second underlayer disposed on said first underlayer and having a face centered cubic structure and a (111) crystal texture, (iii) a soft magnetic layer disposed on said second underlayer, and (iv) at least one third underlayer disposed on said soft magnetic layer and having one of a hexagonal close packed structure with a (0002) crystal texture or a face centered cubic structure with a (111) crystal texture.

61. The recording medium of claim 60 wherein said first underlayer is Ag, said second underlayer is Cu, said soft magnetic layer is NiFe, said third underlayer is one of Ti, a non-magnetic CoCr alloy or Ag, said substrate is Si(111) and said magnetic layer is selected from the group consisting of a Co and Pt multilayer, a Co and Pd multilayer and combinations thereof.

62. A recording medium comprising:

a substrate;

an underlayer structure epitaxially grown on the substrate; and a magnetic layer structure disposed on the underlayer structure;

wherein the substrate is a single crystal Si having one of a (111) crystal texture or a (110) crystal texture or a (001) crystal texture;

wherein the magnetic layer structure is Co or a Co alloy and the underlayer structure is characterized by (i) at least one first underlayer having a face centered cubic structure and a (111) crystal texture, (ii) at least one second underlayer disposed on said first underlayer and having a face centered cubic structure and a (111) crystal texture, (iii) at least one soft magnetic layer disposed on said second underlayer, and (iv) at least one third underlayer disposed on said soft magnetic layer and having one of a hexagonal close packed structure with a (0002) crystal texture or a face centered cubic structure with a (111) crystal texture.

63. The recording medium of claim 62 wherein said first underlayer is Ag, said second underlayer is Cu, said soft magnetic layer is selected from the group consisting of NiFe, a face centered cubic Co or Co alloy and combinations thereof, said third underlayer is one of Ti, a non-magnetic CoCr alloy or Ag, and said substrate is Si(111).

64. The recording medium of claim 62 wherein said magnetic layer is comprised of ordered magnetic arrays.

65. A recording medium comprising:

a substrate;

an underlayer structure; and a magnetic layer structure disposed on the underlayer structure, said magnetic layer structure comprised of Co, a Co alloy or a superlattice structure;

wherein the underlayer structure is characterized by (i) at least one first nonmagnetic underlayer having a face centered cubic structure and a (111) crystal texture, (ii) a soft magnetic layer disposed on said first underlayer and having a face centered cubic structure and a (111) crystal texture, (iii) at least one second underlayer disposed on said soft magnetic layer and having a hexagonal close packed structure and a (0002) crystal texture.

66. The recording medium recited in claim 65 wherein said at least one first underlayer is formed of Cu, said soft magnetic layer is formed of one of Co, a Co alloy or a NiFe alloy, said at least one second underlayer is formed of Ti.

67. The recording medium recited in claim 65 wherein said substrate is formed of Si having a (111) crystal texture and said at least one first underlayer is epitaxially grown on said substrate.

68. The recording medium recited in claim 65 wherein the second underlayer has a body centered cubic structure and a (110) crystal texture.

69. The recording medium recited in claim 68 wherein the magnetic layer is a Co or Co alloy film having a (1011) crystal texture.

70. A recording medium comprising:

a substrate;

a first underlayer of a face centered cubic structure and a (111) crystal texture disposed on the substrate;

a second underlayer having a body centered cubic structure and a (112) crystal texture disposed on the first underlayer; and a magnetic layer structure disposed on the second underlayer and made of a Co or Co alloy based material and a (10$\bar{1}$0) crystal texture.

* * * * *

UNITED STATES PATENT AND TRADEMARK OFFICE
CERTIFICATE OF CORRECTION

PATENT NO.    : 6,248,416 B1
DATED         : June 19, 2001
INVENTOR(S)   : David N. Lambeth, David E. Laughlin, Wei Yang, Heng Gong and Jie Zou It is certified that error appears in the above-identified patent and that said Letters Patent is hereby corrected as shown below:

<u>Title page,</u>
Item [75], delete "Jie Ziou" and replace with -- Jie Zou --

<u>Column 7,</u>
Line 34, delete "In order to meet to this need" and replace with -- In order to meet this need --.

<u>Column 8,</u>
Line 56, delete "can used" and replace with -- can be used --.

<u>Column 14,</u>
Line 47, delete "Si(1110)" and replace with -- Si[110] --.

<u>Column 15,</u>
Line 7, delete "-L" and replace with -- L --.

<u>Column 17,</u>
Line 48, delete "a there" and replace with -- there --.

<u>Column 22,</u>
Line 23, delete "enhance" and replace with -- enchanced --.

<u>Column 23,</u>
Line 34, add -- or -- after "either".

UNITED STATES PATENT AND TRADEMARK OFFICE
CERTIFICATE OF CORRECTION

PATENT NO. : 6,248,416 B1
DATED : June 19, 2001
INVENTOR(S) : David N. Lambeth, David E. Laughlin, Wei Yang, Heng Gong and Jie Zou It is certified that error appears in the above-identified patent and that said Letters Patent is hereby corrected as shown below:

<u>Column 26,</u>
Line 48, delete "oppose" and replace with -- opposed --.
Line 61, delete "exhibit" and replace with -- exhibited. --

Signed and Sealed this

Twenty-seventh Day of August, 2002

*Attest:*

JAMES E. ROGAN
*Director of the United States Patent and Trademark Office*

*Attesting Officer*